US012812445B2

(12) United States Patent
Zhang et al.

(10) Patent No.: US 12,812,445 B2
(45) Date of Patent: Nov. 24, 2026

(54) METHOD AND APPARATUS FOR RATE CONTROL

(71) Applicant: Telefonaktiebolaget LM Ericsson (publ), Stockholm (SE)

(72) Inventors: Zhang Zhang, Beijing (CN); Zhang Fu, Stockholm (SE); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 446 days.

(21) Appl. No.: 18/549,096

(22) PCT Filed: Feb. 24, 2022

(86) PCT No.: PCT/CN2022/077695

§ 371 (c)(1),
(2) Date: Sep. 5, 2023

(87) PCT Pub. No.: WO2022/188633

PCT Pub. Date: Sep. 15, 2022

(65) Prior Publication Data

US 2024/0172033 A1 May 23, 2024

(30) Foreign Application Priority Data

Mar. 12, 2021 (WO) ................ PCT/CN2021/080505
Mar. 19, 2021 (WO) ................ PCT/CN2021/081879

(51) Int. Cl.
*H04W 28/02* (2009.01)
*H04W 76/20* (2018.01)
*H04W 92/18* (2009.01)

(52) U.S. Cl.
CPC ... *H04W 28/0257* (2013.01); *H04W 28/0268* (2013.01); *H04W 76/20* (2018.02); *H04W 92/18* (2013.01)

(58) Field of Classification Search
None
See application file for complete search history.

(56) References Cited

U.S. PATENT DOCUMENTS

2019/0124015 A1 4/2019 Loehr et al.
2020/0336258 A1* 10/2020 Zhu ...................... H04L 1/0076

FOREIGN PATENT DOCUMENTS

CN 101795472 A * 8/2010
CN 110495212 A 11/2019
(Continued)

OTHER PUBLICATIONS

3GPP, "3GPP TS 23.401 V16.9.0", 3rd Generation Partnership Project; Technical Specification Group Services and System Aspects; General Packet Radio Service (GPRS) enhancements for Evolved Universal Terrestrial Radio Access Network (E-UTRAN) access (Release 16), Dec. 2020, 1-440.
(Continued)

*Primary Examiner* — Gerald A Smarth
(74) *Attorney, Agent, or Firm* — Murphy, Bilak & Homiller, PLLC

(57) ABSTRACT

Embodiments of the present disclosure provide method and apparatus for rate control. A method performed by a first terminal device comprises receiving at least one bit rate limitation from a network device. The method further comprises applying the at least one bit rate limitation. A relay terminal device is used to relay communication between the first terminal device and a data network.

15 Claims, 31 Drawing Sheets

(56) References Cited

FOREIGN PATENT DOCUMENTS

| | | | | | |
|---|---|---|---|---|---|
| CN | 111512579 | A | * | 8/2020 | ........... H04L 1/1642 |
| EP | 2106076 | B1 | * | 1/2012 | ............. H04L 47/17 |
| EP | 3815450 | B1 | * | 4/2025 | ............ H01M 4/366 |
| WO | WO-2017202334 | A1 | * | 11/2017 | ............ H04W 72/12 |
| WO | WO-2019128764 | A1 | * | 7/2019 | ........... H04L 47/215 |
| WO | 2020023167 | A1 | | 1/2020 | |
| WO | 2020229274 | A1 | | 11/2020 | |
| WO | WO-2021164017 | A1 | * | 8/2021 | ........ H04W 28/0268 |

OTHER PUBLICATIONS

3GPP , "3rd Generation Partnership Project; Technical Specification Group Radio Access Network; NR; Medium Access Control (MAC) protocol specification (Release 16)", 3GPP TS 38.321 V16.2.1, Sep. 2020, 1-154.

3GPP , "3rd Generation Partnership Project; Technical Specification Group Radio Access Network; NR; Radio Resource Control (RRC) protocol specification (Release 16)", 3GPP TS 38.331 V16.2.0, Sep. 2020, 1-921.

"3rd Generation Partnership Project; Technical Specification Group Services and System Aspects; Architecture Enhancements for 5G System (5GS) to support Vehicle-to-Everything (V2X) services (Release 16)", 3GPP TS 23.287 V0.3.0, Apr. 2019, 40 pages.

"3rd Generation Partnership Project; Technical Specification Group Services and System Aspects; Architecture enhancements for 5G System (5GS) to support Vehicle-to-Everything (V2X) services (Release 16)", 3GPP TS 23.287 V16.5.0, Dec. 2020, 58 pages.

"3rd Generation Partnership Project; Technical Specification Group Services and System Aspects; Common functional architecture to support mission critical services; Stage 2 (Release 17)", 3GPP TS 23.280 V17.5.0, Dec. 2020, 272 pages.

"3rd Generation Partnership Project; Technical Specification Group Services and System Aspects; IP Multimedia Subsystem (IMS) Service Continuity; Stage 2 (Release 16)", 3GPP TS 23.237 V16.4.0, Jul. 2020, 190 pages.

"3rd Generation Partnership Project; Technical Specification Group Services and System Aspects; Service requirements for the 5G system; Stage 1 (Release 18)", 3GPP TS 22.261 V18.1.1, Jan. 2021, 85 pages.

"3rd Generation Partnership Project; Technical Specification Group Services and System Aspects; Study on system enhancement for Proximity based Services (ProSe) in the 5G System (5GS) (Release 17)", 3GPP TR 23.752 V1.1.0, Mar. 2021, 183 pages.

"3rd Generation Partnership Project; Technical Specification Group Services and System Aspects; Study on system enhancement for Proximity based Services (ProSe) in the 5G System (5GS) (Release 17)", 3GPP TR 23.752 V1.0.0, Nov. 2020, 181 pages.

3GPP, "3GPP TS 23.502 V16.7.1", 3rd Generation Partnership Project; Technical Specification Group Services and System Aspects; Procedures for the 5G System (5GS); Stage 2 (Release 16), Jan. 2021, 1-603.

3GPP , "3rd Generation Partnership Project; Technical Specification Group Services and System Aspects; Architecture enhancements to facilitate communications with packet data networks and applications (Release 16)", 3GPP TS 23.682 V16.8.0, Sep. 2020, 1-135.

3GPP , "3rd Generation Partnership Project; Technical Specification Group Services and System Aspects; Proximity-based services (ProSe); Stage 2 (Release 16)", 3GPP TS 23.303 V16.0.0, Jul. 2020, 1-130.

3GPP , "3rd Generation Partnership Project; Technical Specification Group Services and System Aspects; System architecture for the 5G System (5GS); Stage 2 (Release 16)", 3GPP TS 23.501 V16.7.0, Dec. 2020, 1-450.

* cited by examiner

METHOD AND APPARATUS FOR RATE CONTROL

TECHNICAL FIELD

The non-limiting and exemplary embodiments of the present disclosure generally relate to the technical field of communications, and specifically to methods and apparatuses for rate control, such as the AMBR control for Layer-3 User Equipment (UE)-to-network relay and rate control for Layer-2 UE-to-network relay.

BACKGROUND

This section introduces aspects that may facilitate a better understanding of the disclosure. Accordingly, the statements of this section are to be read in this light and are not to be understood as admissions about what is in the prior art or what is not in the prior art.

In communication networks for example LTE (Long Term Evolution) and NR (new radio) as defined by 3rd Generation Partnership Project (3GPP), the rate of user data sent to and from a user equipment (UE) can be controlled in various ways.

As described in clause 5.7.2.6 of 3GPP TS 23.501 V16.7.0, the disclosure of which is incorporated by reference herein in its entirety, each protocol data unit (PDU) session of a UE is associated with the following aggregate rate limit QoS (Quality of Service) parameter:

per Session Aggregate Maximum Bit Rate (Session-AMBR).

The Session-AMBR is signalled to the appropriate UPF (User plane Function) entity/ies to the UE and to the (R)AN ((Radio) Access Network) (to enable the calculation of the UE-AMBR). The Session-AMBR limits the aggregate bit rate that can be expected to be provided across all Non-GBR (Guaranteed Bit Rate) QoS Flows for a specific PDU Session. The Session-AMBR is measured over an AMBR averaging window which is a standardized value. The Session-AMBR is not applicable to GBR QoS Flows. The subscribed Session-AMBR is a subscription parameter which is retrieved by the SMF (Session Management Function) from UDM (Unified Data Management). SMF may use the subscribed Session-AMBR or modify it based on a local policy or use the authorized Session-AMBR received from PCF (Policy Control Function) to get the Session-AMBR. UL (uplink) and DL (downlink) Session-AMBR shall be enforced in the UPF.

Each UE is associated with the following aggregate rate limit QoS parameter:

per UE Aggregate Maximum Bit Rate (UE-AMBR).

The UE-AMBR limits the aggregate bit rate that can be expected to be provided across all Non-GBR QoS Flows of a UE. Each (R)AN shall set its UE-AMBR to the sum of the Session-AMBR of all PDU Sessions with active user plane to this (R)AN up to the value of the received UE-AMBR from AMF. The UE-AMBR is a parameter provided to the (R)AN by the AMF based on the value of the subscribed UE-AMBR retrieved from UDM or the dynamic serving network UE-AMBR retrieved from PCF (e.g. for roaming subscriber). The AMF provides the UE-AMBR provided by PCF to (R)AN if available. The UE-AMBR is measured over an AMBR averaging window which is a standardized value. The UE-AMBR is not applicable to GBR QoS Flows.

The (R)AN shall enforce UE-AMBR in UL and DL per UE (via scheduling) for Non-GBR QoS Flows.

Sidelink

3GPP specified the LTE D2D (device-to-device) technology, also known as sidelink (SL) or the PC5 interface. The target use case (UC) are Proximity Services (communication and discovery). The LTE sidelink was extensively redesigned to support vehicular communications (commonly referred to as V2X (Vehicle-to-Everything) or V2V (Vehicle-to-Vehicle). From the point of view of the lowest radio layers, the LTE SL uses broadcast communication. That is, transmission from a UE targets any receiver in a transmission range.

ProSe (Proximity Services) are specified by 3GPP. LTE V2X related enhancements targeting the specific characteristics of vehicular communications are specified by 3GPP specifications. In LTE V2X, only broadcast is supported over sidelink.

3GPP has introduced the sidelink for the 5G new radio (NR). The driving UC were vehicular communications with more stringent requirements than those typically served using the LTE SL. To meet these requirements, the NR SL is capable of broadcast, groupcast, and unicast communications. In groupcast communication, the intended receivers of a message are typically a subset of the vehicles near the transmitter, whereas in unicast communication, there is a single intended receiver.

Both the LTE SL and the NR SL can operate with and without network coverage and with varying degrees of interaction between the UEs and the NW (network), including support for standalone, network-less operation.

3GPP will specify enhancements related to National Security and Public Safety (NSPS) use case taking NR sidelink as a baseline. Besides, in some scenarios, NSPS services need to operate with partial or w/o NW (network) coverage, such as indoor firefighting, forest firefighting, earthquake rescue, sea rescue, etc. where the infrastructure is (partially) destroyed or not available, therefore, coverage extension is a crucial enabler for NSPS, for both NSPS services communicated between UE and cellular NW and that communicated between UEs over sidelink. NR sidelink relay aims to further explore coverage extension for sidelink-based communication, including both UE to NW relay for cellular coverage extension and UE to UE relay for sidelink coverage extension.

Sidelink Resource Allocation

There are at least two resource allocation modes in NR sidelink: Mode 1 and Mode 2. Mode 1 refers to network-scheduled sidelink transmissions while Mode 2 refers to the scenario in which each UE autonomously selects resources for its sidelink transmissions. In Mode 1, the gNB (next generation Node B) schedules a UE via dynamic grants or configured grants.

There are two types of configured grant for NR sidelink:

- Configured grant Type 1: where an sidelink grant is provided by radio resource control (RRC) signalling, and stored as configured sidelink grant;
- Configured grant Type 2: where an sidelink grant is provided by Physical Downlink Control Channel (PDCCH), and stored or cleared as configured sidelink grant based on L1 (layer 1) signalling indicating configured sidelink grant activation or deactivation.

Mode 2 resource allocation is based on sensing of radio resources. A resource selection protocol performed by a UE comprises three parts: sensing within a sensing window, excluding resources reserved by other UEs to find a set of candidate resources, and selecting transmission resources among the candidate resources within a selection window. Additionally, shortly before transmitting in a reserved resource, the UE can re-evaluate the set of reserved resources to take into account the latest status of resource usage (e.g., some of the resources might have been occupied by aperiodic transmission after the resource reservation). If the reserved resources would not be part of the set for selection at this time, then new resources are selected from an updated resource selection window. In addition to the re-evaluation, pre-emption is also introduced such that a UE selects new resources even after it announces the resource reservation when it observes resource collision with a higher priority transmission from another UE.

ProSe Layer-2 (L2) UE-to-Network

The background about NR Layer-2 UE-to-Network relaying is based on solution described in clause 6.7 of TR 23.752 v1.1.0, the disclosure of which is incorporated by reference herein in its entirety, The L2 UE to NW Relay UE provides the functionality to support connectivity to the 5GS (fifth generation system) for remote UEs. FIG. 1 shows a protocol stack of a user plane for L2 (layer 2) UE to NW (network) relay UE according to an embodiment of the present disclosure. FIG. 2*a* shows a protocol stack of a control plane for L2 UE to NW relay UE according to an embodiment of the present disclosure. APP denotes application. PDU denotes Protocol Data Unit. SDAP denotes Service Data Adaptation Protocol. RLC denotes Radio Link Control. MAC denotes Medium Access Control. PHY denotes physical. UDP denotes User Datagram Protocol. GTP-U denotes GPRS (General Packet Radio Service) Tunnelling Protocol for User Plane. IP denotes Internet protocol. L1 denotes layer 1. NAS denotes Non-Access Stratum. SM denotes Session Management. MM denotes Mobility Management. It is important to note that the two endpoints of the Packet Data Convergence Protocol (PDCP) link are the remote UE and the gNB, which means the remote UE has its own context in Radio Access Network (RAN) and core NW. The remote UE has its own radio bearer, RRC connection and PDU session. The relay function is performed below PDCP, e.g. the adaptation layer. The remote UE's traffic (both control plane and user plane) is transparently transferred between the remote UE and gNB over the L2 UE to NW Relay UE without any modifications.

The adaptation layer between the L2 UE to NW Relay UE and the gNB is able to differentiate between Uu bearers of a particular remote UE. Different remote UEs and different Uu bearers of the remote UE are indicated by additional information (e.g. UE IDs and bearer IDs) included in adaptation layer header which is added to PDCP PDU. The adaptation layer can be considered as part of PDCP sublayer or a separate new layer between PDCP sublayer and RLC sublayer.

UE-PC5-AMBR

LTE UE-PC5-AMBR and NR UE-PC5-AMBR has been described in 3GPP TS 23.502 V16.7.1, the disclosure of which is incorporated by reference herein in its entirety. For example, when network scheduled operation mode is used, the UE-PC5-AMBR for NR based PC5 applies to all types of communication modes (e.g. applies to unicast, groupcast and also broadcast communication, and in case of UE-to-NW relay case, applies to PC5 communication carrying traffic to the relay UE and Uu traffic to the NW), and is used by NG-RAN for capping the UE's NR based PC5 transmission in the resources management.

The AMF includes the UE-PC5-AMBR, and cross-RAT (Radio Access Technology) PC5 control authorization in the Next Generation Application Protocol (NGAP) message to the NG-RAN as part of the UE context and NG-RAN use it in resource management of UE's PC5 transmission in network scheduled mode.

ProSe (Proximity Services) Layer-3 UE-to-Network

The background about 5G (5th Generation) Layer-3 UE-to-Network relaying is based on solution in clause 6.6 TR 23.752 v1.0.0.

FIG. 2*b* illustrates an architecture model using a ProSe 5G UE-to-Network Relay. As shown in FIG. 2*b*, the ProSe 5G UE-to-Network Relay entity provides the functionality to support connectivity to the network for Remote UEs. It can be used for both public safety services and commercial services (e.g. interactive services).

A UE is considered to be a Remote UE for a certain ProSe UE-to-Network relay if it has successfully established a PC5 link to this ProSe 5G UE-to-Network Relay. A Remote UE may be located within NG-RAN (Next Generation-Radio Access Network) coverage or outside of NG-RAN coverage.

A Remote UE may perform communication path selection between a direct Uu path and an indirect Uu path based on the link quality and the configured threshold (pre-configured or provided by NG-RAN). For example, if Uu link quality exceeds the configured threshold, the direct Uu path is selected. Otherwise, the indirect Uu path is selected by performing the UE-to-Network Relay discovery and selection.

The ProSe 5G UE-to-Network Relay shall relay unicast traffic (UL (uplink) and DL (downlink)) between the Remote UE and the network. The ProSe UE-to-Network Relay shall provide a generic function that can relay any IP, Ethernet or Unstructured traffic.

Specifically, for IP traffic over PC5 reference point, the ProSe UE-to-Network Relay uses IP type Protocol Data Unit (PDU) Session towards 5GC. For Ethernet traffic over PC5 reference point, the ProSe UE-to-Network Relay can use Ethernet type PDU Session or IP type PDU Session towards 5GC. For Unstructured traffic over PC5 reference point, the ProSe UE-to-Network Relay can use Unstructured type PDU Session or IP type PDU Session (i.e. IP encapsulation/de-capsulation by UE-to-Network Relay) towards 5GC.

The type of traffic supported over PC5 reference point is indicated by the ProSe UE-to-Network Relay, e.g. using the corresponding Relay Service Code. The UE-to-Network Relay determines the PDU Session Type based on, e.g., ProSe policy/parameters, URSP rule, Relay Service Code, etc.

It should be noted that a manner for the UE-to-NW relay to determine the PDU session type should be evaluated independently from other parts of this solution while considering other PDU session parameters, e.g. Data Network Name (DNN), Session and Service Continuity (SSC) mode.

IP type PDU Session and Ethernet type PDU Session may be used to support more than one Remote UE while Unstructured type PDU Session may be used to support only one Remote UE.

It should be noted that the maximum number of PDU Sessions may affect the maximum number of Remote UEs that can be supported by the UE-to-Network Relay.

It should also be noted that support of non-unicast mode communication (i.e. one-to-many communication/broadcast or multicast) between the network and the UE-to-Network Relay UE and between the UE-to-Network Relay and the Remote UE(s) depends on the result of FS_5MBS work.

One-to-one Direct Communication is used between Remote UEs and ProSe 5G UE-to-Network Relays for unicast traffic as specified in solutions for Key Issue #2.

A protocol stack for Layer-3 UE-to-Network Relays is illustrated in FIG. 2*c*.

Hop-by-hop security is supported in the PC5 link and the Uu link. If there are requirements beyond the hop-by-hop security for protection of Remote UE's traffic, security over the PDU layer needs to be applied.

Further security details (integrity and privacy protection for remote UE-Network communication) will be specified in SA WG3.

According to the definition of service continuity in TS 22.261 and TS 23.501, it can be seen that "service continuity" is different from "session continuity" by definition, and service continuity can be achieved at the application layer regardless of IP address preservation.

Specifically, for Mission Critical Service in Public Safety, service continuity may be achieved by the application layer mechanism, e.g. as described in Annex B in TS 23.280. For commercial IMS use cases, service continuity may be achieved using mechanisms described in TS 23.237. For commercial use cases with the application layer out of 3GPP scope (e.g. non IMS), service continuity may be achieved using a similar way, e.g. Quick UDP (User Datagram Protocol) Internet Connection (QUIC).

It is noted that all of the above application layer mechanisms may be reused for Layer-3 UE-to-Network Relay without any enhancements in this study item.

A ProSe 5G UE-to-Network Relay capable UE may register to the network (if not already registered) and establish a PDU session enabling necessary relay traffic, or it may need to connect to additional PDU session(s) or modify the existing PDU session in order to provide relay traffic towards Remote UE(s). PDU session(s) supporting UE-to-Network Relay shall only be used for Remote ProSe UE(s) relay traffic.

FIG. 2*d* illustrates a procedure for the ProSe 5G UE-to-Network Relay.

At step 0, during the registration procedure, authorization and provisioning are performed for the ProSe UE-to-NW relay (substep 0*a*) and the Remote UE (substep 0*b*). The authorization and provisioning procedure may be any solution for key issues #1 and #3.

At step 1, the ProSe 5G UE-to-Network Relay may establish a PDU session for relaying with default PDU session parameters received in step 0 or pre-configured in the UE-to-NW relay, e.g. Single Network Slice Selection Assistance Information (S-NSSAI), DNN, SSC mode or PDU Session Type. In the case of Internet Protocol (IP) PDU Session Type and IPv6, the ProSe UE-to-Network Relay obtains the IPv6 prefix via the prefix delegation function from the network as defined in TS 23.501.

At step 2, based on the authorization and provisioning in step 0, the Remote UE performs discovery of a ProSe 5G UE-to-Network Relay using any solution for key issues #1 and #3. As part of the discovery procedure, the Remote UE learns about the connectivity service provided by the ProSe UE-to-Network Relay.

At step 3, the Remote UE selects a ProSe 5G UE-to-Network Relay and establishes a connection for One-to-one ProSe Direct Communication as described in TS 23.287.

If there is no PDU session satisfying the requirements of the PC5 connection with the remote UE, e.g. S-NSSAI, DNN, Quality of Service (QoS), the ProSe 5G UE-to-Network Relay initiates a new PDU session establishment or modification procedure for relaying.

According to the PDU Session Type for relaying, the ProSe 5G UE-to-Network Relay performs a relaying function at the corresponding layer, e.g. acts as an IP router when the traffic type is IP, acts as an Ethernet switch when the traffic type is Ethernet, and performs generic forwarding for Unstructured traffic.

When the ProSe 5G UE-to-Network Relay uses an Unstructured PDU session type for Unstructured traffic over PC5 reference point, it creates a mapping between the PC5 Link Identifier and the PDU Session ID, and a mapping between Packet Flow ID (PFI) for PC5 L2 link and the QoS Flow ID (QFI) for the PDU Session.

When the ProSe 5G UE-to-Network Relay uses IP PDU session type for Ethernet or Unstructured traffic over PC5 reference point, it locally assigns an IP address/prefix for the Remote UE and uses that to encapsulate the data from the Remote UE. For downlink traffic, the ProSe 5G UE-to-Network Relay decapsulates the traffic from the IP headers and forwards it to the corresponding Remote UE via PC5 reference point.

The ProSe 5G UE-to-Network Relay's subscription, and if applicable the Remote UE's subscription, may be considered for QoS decision. If the ProSe 5G UE-to-Network Relay reports Remote UE's SUbscription Concealed Identifier (SUCI) to the network, as described in sol #47 steps 3,5,7, Relay UE's Access and Mobility Management Function (AMF) gets Remote UE's SUbscription Permanent Identifier (SUPI) from Remote UE's AUthentication Server Function (AUSF). Then Relay UE's AMF retrieves Remote UE's subscribed UE-AMBR from Remote UE's Unified Data Manager (UDM) using Remote UE's SUPI. Relay UE's AMF could also provide Remote UE's SUPI together with N1 SM container (PDU Session Establishment Request) to Relay UE's SMF, and then Relay UE's SMF retrieves Remote UE's subscribed QoS profile and Subscribed Session-AMBR from Remote UE's UDM. Relay UE's AMF and SMF then provides Remote UE's subscription to Policy Control Function (PCF) for QoS decision.

The UE-to-Network Relay distinguishes and performs a rate limitation for the traffic of a specific Remote UE, if the configuration from PCF supports to do that.

It should be noted that a manner for the ProSe UE-to-NW relay to determine the requirement of PC5 Connection, e.g. S-NSSAI, DNN, QoS will be specified in other solutions for KI #3.

It should also be noted that a manner for supporting an end-to-end QoS requirement of Remote UE, including QoS enforcement for PC5 and PDU session for relaying, is addressed in other solutions.

At step 4, for IP PDU Session Type and IP traffic over PC5 reference point, an IPv6 prefix or an IPv4 address is allocated for the remote UE as it is defined in TS 23.303 clauses 5.4.4.2 and 5.4.4.3. From this point, the uplink and downlink relaying may start. For downlink traffic forwarding, the PC5 QoS Rule is used to map the downlink IP packet to the PC5 QoS Flow. For uplink traffic forwarding, the 5G QoS Rule is used to map the uplink IP packet to the Uu QoS Flow.

It should be noted that general functionality for IPv6 prefix delegation as defined in TS 23.401 clause 5.3.1.2.6 needs to be added in 5G System (5GS) and reference to TS 23.501 may be added above.

At step 5, the ProSe 5G UE-to-Network Relay sends a Remote UE Report (Remote User ID, Remote UE info) message to the Session Management Function (SMF) for the PDU session associated with the relay. The Remote User ID is an identity of the Remote UE user (provided via User Info) that was successfully connected in step 3. The Remote UE info is used to assist identifying the Remote UE in the 5G Core (5GC). For IP PDU Session Type, the Remote UE info is Remote UE IP info. For Ethernet PDU Session Type, the Remote UE info is Remote UE Medium Access Control (MAC) address which is detected by the UE-to-Network Relay. For Unstructured PDU Session Type, the Remote UE info contains the PDU session ID. The SMF stores the Remote User IDs and the related Remote UE info (if available) in the ProSe 5G UE-to-Network Relay's SM context for this PDU session associated with the relay.

For IP info, the following principles apply:

for IPv4, the UE-to-network Relay shall report Transmission Control Protocol (TCP)/User Datagram Protocol (UDP) port ranges assigned to individual Remote UE(s) (along with the Remote User ID);

for IPv6, the UE-to-network Relay shall report IPv6 prefix(es) assigned to individual Remote UE(s) (along with the Remote User ID).

It should be noted that the privacy protection for Remote User ID depends on SA WG3 design.

The Remote UE Report message shall be sent when the Remote UE disconnects from the ProSe 5G UE-to-Network Relay (e.g. upon explicit layer-2 link release or based on the absence of keep alive messages over PC5) to inform the SMF that the Remote UE(s) has left.

In the case of Registration Update procedure involving SMF change, the Remote User IDs and related Remote UE info corresponding to the connected Remote UEs are transferred to the new SMF as part of SM context transfer for the ProSe 5G UE-to-Network Relay.

It should be noted that in order for the SMF to have the Remote UE(s) information, the Home Public Land Mobile Network (HPLMN) and the Visited Public Land Mobile Network (VPLMN) where the ProSe 5G UE-to-Network Relay is authorised to operate need to support the transfer of the Remote UE related parameters in case the SMF is in the HPLMN.

It should be noted that when Remote UE(s) disconnects from the ProSe UE-to-Network Relay, it is up to implementation how relaying PDU sessions are cleared/disconnected by the ProSe 5G UE-to-Network Relay.

After being connected to the ProSe 5G UE-to-Network Relay, the Remote UE keeps performing the measurement of the signal strength of PC5 unicast link with the ProSe 5G UE-to-Network Relay for relay reselection.

The solution can also work when the ProSe 5G UE-to-Network Relay UE connects in Evolved Packet System (EPS) using Long Term Evolution (LTE). In this case, for the Remote UE report, the procedures defined in TS 23.303 may be used.

The SMF needs to support procedures for the Remote UE report and the UE needs to support procedures for the Remote UE and the ProSe 5G UE-to-Network Relay.

Session-AMBR

As defined in clause 5.7.2.6 of TS 23.501, Session-AMBR is per Session Aggregate Maximum Bit Rate. The subscribed Session-AMBR is a subscription parameter which is retrieved by SMF from UDM. SMF may use the subscribed Session-AMBR or modify it based on a local policy or use the authorized Session-AMBR received from PCF to get the Session-AMBR, which is signalled to the appropriate User Plane Function (UPF) entity(ies) for the UE and to the (R)AN (to enable calculation of the UE-AMBR). The Session-AMBR limits the aggregate bit rate that can be expected to be provided across all Non-GBR (Guaranteed Bit Rate) QoS Flows for a specific PDU Session. The Session-AMBR is measured over an AMBR averaging window which is a standardized value. The Session-AMBR is not applicable to GBR QoS Flows.

PC5 Link Aggregated Bit Rates

As defined in clause 5.4.2.3 of TS 23.387, a PC5 unicast link is associated with the following aggregate rate limit QoS parameter:

per link Aggregate Maximum Bit Rate (PC5 LINK-AMBR).

The PC5 LINK-AMBR limits the aggregate bit rate that can be expected to be provided across all Non-GBR QoS Flows with a peer UE over PC5 unicast link. The PC5 LINK-AMBR is measured over an AMBR averaging window which is a standardized value. The PC5 LINK-AMBR is not applicable to GBR QoS Flows. PC5 LINK-AMBR is applied to one PC5 unicast link, which means that the aggregate bit rate of one PC5 unicast link should not exceed PC5 LINK-AMBR.

It should be noted that the AMBR averaging window is only applied to PC5 LINK-AMBR measurement.

UE-AMBR

As defined in clause 5.7.2.6 of TS 23.501, each UE is associated with the following aggregate rate limit QoS parameter: per UE Aggregate Maximum Bit Rate (UE-AMBR). The UE-AMBR limits the aggregate bit rate that can be expected to be provided across all Non-GBR QoS Flows of a UE. Each (R)AN shall set its UE-AMBR to the sum of the Session-AMBR of all PDU Sessions with active user plane to this (R)AN up to the value of the received UE-AMBR from AMF. The UE-AMBR is a parameter provided to the (R)AN by the AMF based on the value of the subscribed UE-AMBR retrieved from UDM or the dynamic serving network UE-AMBR retrieved from PCF (e.g. for a roaming subscriber). The AMF provides the UE-AMBR provided by PCF to (R)AN if available. The UE-AMBR is measured over an AMBR averaging window which is a standardized value. The UE-AMBR is not applicable to GBR QoS Flows.

The (R)AN shall enforce UE-AMBR in UL and DL per UE (via scheduling) for Non-GBR QoS Flows.

UE-PC5-AMBR

As described in clause 5.4.1.1.1 of TS 23.287, when a network scheduled operation mode is used, the UE-PC5-AMBR for New Radio (NR) based PC5 applies to all types of communication modes (e.g. applies to unicast, groupcast and also broadcast communication, and in the case of UE-to-NW relay case, applies to PC5 communication carrying traffic to the relay UE and Uu traffic to the NW), and is used by NG-RAN for capping the UE's NR based PC5 transmission in the resources management.

The AMF includes the UE-PC5-AMBR, and cross-RAT (Radio Access Technology) PC5 control authorization in the Next Generation Application Protocol (NGAP) message to the NG-RAN as part of the UE context and NG-RAN uses it in resource management of UE's PC5 transmission in network scheduled mode.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In Uu interface, UE-AMBR enforcement for a UE is ensured by (R)AN primarily via scheduling proper grants to the UE. In the scenario of Layer-2 UE-to-NW relay, however, the SL resource may be autonomously selected by the remote UE (for example in case of Mode 2 resource allocation) rather than being scheduled by the network device such as gNB. In this case, neither the rate limitation for traffic between the remote UE and the data network (such as UE-AMBR) nor the rate limitation for traffic between the remote UE and the relay UE (such as UE-PC5-AMBR limitation) can be enforced by the network device and the UE (such as remote UE and relay UE) may use more resources than the resources that should be limited by the rate limitation for the remote UE (such as UE-AMBR and/or UE-PC5-AMBR). As a result, another UE sharing the same resource pool may not get sufficient resources for its transmission. Even for mode 1 resource allocation, only UE-PC5-AMBR is considered by NG-RAN for capping the UE's NR based PC5 transmission, i.e., UE-AMBR is not considered and thus cannot be enforced for the remote UE.

In the scenario of Layer-3 UE-to-Network relay, since there is no UE context in NG-RAN for the remote UE, it is challenging to enforce the session-AMBR and the PC5 LINK-AMBR for the remote UE.

In Sol #6 in TR 23.752 as shown in section 2.1.1, it is proposed that the relay UE's AMF gets the session-AMBR of the remote UE from remote UE's UDM and share the info with SMF and PCF of the relay UE, then the PCF may make a QoS decision based on the relay UE session-AMBR and remote UE session-AMBR. This may work if the relay UE creates a new PDU session for each remote UE. If multiple remote UEs share the same PDU session of the relay UE, then the proposed solution is not scalable. Furthermore, the sol #6 does not deal with enforcement of the PC5-LINK-AMBR.

In addition, sol #6 is a semi-static solution for session-AMBR fulfillment. Since there is no UE context in the gNB, the gNB is not able to schedule or assign grants to remote UE so that remote UE's transmissions on PC5 link and the subsequent relay transmissions on Uu altogether to fulfil the session-AMBR in a short term time period. In addition, there is no solution to enforce remote UE's PC5 link AMBR and also other PC5 QoS parameters such as flow level bit rate etc.

To overcome or mitigate at least one of above mentioned problems or other problems, the embodiments of the present disclosure propose an improved solution for rate control.

In a first aspect of the disclosure, there is provided a method performed by a first terminal device. The method comprises receiving at least one bit rate limitation from a network device. The method further comprises applying the at least one bit rate limitation. A relay terminal device is used to relay communication between the first terminal device and a data network.

In an embodiment, the at least one bit rate limitation comprises at least one of a bit rate limitation for traffic transmitted from the first terminal device, a bit rate limitation for traffic received by the first terminal device, a bit rate limitation for traffic from the first terminal device to the data network, a bit rate limitation for traffic from the data network to the first terminal device, a bit rate limitation for traffic from the first terminal device to the relay terminal device, or a bit rate limitation for traffic from the relay terminal device to the first terminal device.

In an embodiment, a bit rate limitation for traffic between the data network and the first terminal device comprises at least one of aggregate maximum bit rate (AMBR) for a session of the first terminal device, aggregate AMBR for all non-guaranteed bit rate (GBR) quality of service (QoS) flows of a user equipment (UE) of the first terminal device, guaranteed flow bit rate (GFBR) of the first terminal device, maximum flow bit rate (MFBR) of the first terminal device, or maximum data burst volume (MDBV) of the first terminal device.

In an embodiment, a bit rate limitation for traffic between the relay terminal device and the first terminal device comprises at least one of UE-PC5-AMBR of the first terminal device or PC5 link AMBR of the link between the first terminal device and the relay terminal device.

In an embodiment, the network device comprises at least one of an access network device or access management function.

In an embodiment, the at least one bit rate limitation is received from the network device via at least one of a non-access stratum (NAS) signaling, or a radio resource control (RRC) signaling.

In an embodiment, applying the at least one bit rate limitation comprises maintaining at least one queue for traffic of the first terminal related to a corresponding bit rate limitation, and applying the corresponding bit rate limitation for the at least one queue such that aggregated data rate over the at least one queue does not exceed the corresponding bit rate limitation.

In an embodiment, the method further comprises transmitting queue status information to the relay terminal device. In an embodiment, the method further comprises receiving queue status information from the relay terminal device.

In an embodiment, the queue status information comprises at least one of a buffer size, a queuing delay, a packet loss, a number of transmitted packets, a number of received packets, a number of transmitted bits, a number of received bits, or an indication of which packets or protocol data units (PDU) have been received successfully.

In an embodiment, the queue status information comprises at least one of queue status information for a terminal device, queue status information for a session, queue status information for a bearer, or queue status information for a flow.

In an embodiment, the queue status information is exchanged between the first terminal device and the relay terminal device via at least one of PC5-RRC signaling, or control PDUs in an adaptation layer.

In an embodiment, the method further comprises receiving a measurement configuration on data rate and/or resource utilization from the network device or a controlling terminal device. In an embodiment, the method further comprises performing measurement based on the measurement configuration.

In an embodiment, the method further comprises transmitting assistance information on data rate and/or resource utilization measured or calculated by the first terminal device to the network device or the relay terminal device.

In an embodiment, the assistance information on data rate and/or resource utilization measured or calculated by the first terminal device comprises at least one of a measured or calculated data rate or data volume, a percentage of PC5 resources that are used to carry uplink traffic among all consumed PC5 resources, or a percentage of resources allocated by a resource allocation mode among all consumed resources used to carry uplink traffic on a PC5 link.

In an embodiment, the resource allocation mode comprises at least one of network-scheduled sidelink transmission, or terminal device autonomously selected sidelink transmission.

In an embodiment, the measured or calculated data rate or data volume comprises at least one of measured or calculated data rate or data volume for a flow, measured or calculated data rate or data volume for a radio bearer, measured or calculated data rate or data volume for a PC5 link, measured or calculated data rate or data volume for relayed Uu traffic, measured or calculated data rate or data volume for PC5 traffic, measured or calculated data rate or data volume for relayed non-GBR Uu traffic, or measured or calculated data rate or data volume for relayed GBR Uu traffic.

In an embodiment, relayed Uu traffic and PC5 traffic are not multiplexed in a same medium access control (MAC) service data unit (SDU) or in a same MAC PDU.

In an embodiment, the method further comprises receiving an upper bound and an averaging window from the network device. The upper bound is used to ensure an aggregate size of all PC5 MAC SDUs that carry uplink or downlink traffic of the first terminal device in the averaging window does not exceed the upper bound. In an embodiment, the method further comprises applying the upper bound and the averaging window.

In an embodiment, the upper bound is decreased when an uplink or downlink bit rate of the first terminal device is higher than an uplink or downlink bit rate limitation.

In an embodiment, the upper bound is increased when the uplink or downlink bit rate of the first terminal device is lower than the uplink or downlink bit rate limitation.

In a second aspect of the disclosure, there is provided a method performed by a relay terminal device. The method comprises receiving at least one bit rate limitation for a first terminal device from a network device. The method further comprises applying the at least one bit rate limitation for the first terminal device. The relay terminal device is used to relay communication between the first terminal device and a data network.

In an embodiment, the method further comprises receiving at least one bit rate limitation for the relay terminal device from a network device. The method further comprises applying the at least one bit rate limitation for the relay terminal device.

In an embodiment, the at least one bit rate limitation for the first terminal device comprises at least one of a bit rate limitation for traffic transmitted from the first terminal device, a bit rate limitation for traffic received by the first terminal device, a bit rate limitation for traffic from the first terminal device to the data network; a bit rate limitation for traffic from the data network to the first terminal device; a bit rate limitation for traffic from the first terminal device to the relay terminal device; or a bit rate limitation for traffic from the relay terminal device to the first terminal device.

In an embodiment, the at least one bit rate limitation for the first terminal device and/or the relay terminal device is received from the network device via at least one of a non-access stratum (NAS) signaling; or a radio resource control (RRC) signaling.

In an embodiment, applying the at least one bit rate limitation for the first terminal device comprises maintaining at least one queue for traffic of the first terminal related to a corresponding bit rate limitation, and applying the corresponding bit rate limitation for the at least one queue such that aggregated data rate over the at least one queue does not exceed the corresponding bit rate limitation.

In an embodiment, the method further comprises transmitting queue status information to the first terminal device. In an embodiment, the method further comprises receiving queue status information from the first terminal device.

In an embodiment, the method further comprises receiving a measurement configuration on data rate and/or resource utilization from the network device or a controlling terminal device. In an embodiment, the method further comprises performing measurement based on the measurement configuration.

In an embodiment, the method further comprises transmitting assistance information on data rate and/or resource utilization measured or calculated by the relay terminal device to the network device.

In an embodiment, the assistance information on data rate and/or resource utilization measured or calculated by the relay terminal device comprises at least one of a measured or calculated data rate or data volume for the first terminal device, a percentage of PC5 resources that are used to carry downlink traffic among all consumed PC5 resources for the first terminal device, or a percentage of resources allocated by a resource allocation mode among all consumed resources used to carry downlink traffic for the first terminal device on a PC5 link.

In an embodiment, the measured or calculated data rate or data volume for the first terminal device comprises at least one of measured or calculated data rate or data volume for a flow for the first terminal device, measured or calculated data rate or data volume for a radio bearer for the first terminal device, measured or calculated data rate or data volume for a PC5 link for the first terminal device, measured or calculated data rate or data volume for relayed Uu traffic for the first terminal device, measured or calculated data rate or data volume for PC5 traffic for the first terminal device, measured or calculated data rate or data volume for relayed non-GBR Uu traffic for the first terminal device, or measured or calculated data rate or data volume for relayed GBR Uu traffic for the first terminal device.

In an embodiment, the method further comprises receiving assistance information on data rate and/or resource utilization measured or calculated by the first terminal device from the first terminal device. In an embodiment, the method further comprises transmitting the assistance information on data rate and/or resource utilization measured or calculated by the first terminal device to the network device.

In an embodiment, the method further comprises receiving an upper bound and an averaging window from the network device. The upper bound is used to ensure an aggregate size of all PC5 MAC SDUs that carry uplink or downlink traffic of the first terminal device in the averaging window does not exceed the upper bound. In an embodiment, the method further comprises applying the upper bound and the averaging window.

In an embodiment, a bit rate limitation for traffic between the relay terminal device and the first terminal device comprises at least one of UE-PC5-AMBR of the relay terminal device, UE-PC5-AMBR of the first terminal device, or PC5 link AMBR of the link between the relay terminal device and the first terminal device.

In a third aspect of the disclosure, there is provided a method performed by a network device. The method comprises transmitting at least one bit rate limitation for a first terminal device to the first terminal device. A relay terminal device is used to relay communication between the first terminal device and a data network.

In an embodiment, the at least one bit rate limitation is transmitted to the first terminal device via at least one of a non-access stratum (NAS) signaling, or a radio resource control (RRC) signaling.

In an embodiment, the method further comprises transmitting the at least one bit rate limitation for the first terminal device to the relay terminal device. In an embodiment, the method further comprises transmitting a measurement configuration on data rate and/or resource utilization to the first terminal device and/or the relay terminal device.

In an embodiment, the method further comprises receiving assistance information on data rate and/or resource utilization from the first terminal device and/or the relay terminal device. In an embodiment, the method further comprises performing data rate control and/or resource assignment based on the assistance information on data rate and/or resource utilization.

In an embodiment, performing data rate control and/or resource assignment based on the assistance information comprises at least one of: increasing sidelink (SL) resource assignment to the first terminal device and/or prioritized bit rate (PBR) of the first terminal device's SL logical channel carrying non-GBR traffic when the assistance information indicates that aggregate date rate limitation for both relayed Uu uplink traffic and PC5 traffic of the first terminal device is not exceeded, decreasing SL resource assignment to the first terminal device and/or PBR of the first terminal device's SL logical channel carrying non-GBR traffic when the assistance information indicates that aggregate date rate limitation for both relayed Uu uplink traffic and PC5 traffic of the first terminal device is exceeded, increasing SL resource assignments to the relay terminal device and/or PBR of the relay terminal device's SL logical channel carrying non-GBR traffic if the assistance information indicates that the aggregate date rate limitation for both relayed Uu traffic to each first terminal device connected to the relay terminal device and PC5 traffic of the relay terminal device is not exceeded, decreasing SL resource assignments to the relay terminal device and/or PBR of the relay terminal device's SL logical channel carrying non-GBR traffic if the assistance information indicates that the aggregate date rate limitation for both relayed Uu downlink traffic to each first terminal device connected to the relay terminal device and PC5 traffic of the relay terminal device is exceeded, increasing PBR of the first terminal device's SL logical channel carrying relayed non-GBR uplink traffic when the assistance information indicates that aggregate AMBR limitation for all non-GBR QoS flows of the UE and uplink MFBR limitation of all flows carrying the relayed non-GBR uplink traffic and mapped to the SL logical channel are not exceeded, decreasing PBR of the first terminal device's SL logical channel carrying relayed non-GBR uplink traffic when the assistance information indicates that aggregate AMBR limitation for all non-GBR QoS flows of the UE or uplink MFBR limitation of any flow carrying the relayed non-GBR uplink traffic and mapped to the SL logical channel is exceeded, increasing PBR of the first terminal device's SL logical channel carrying relayed GBR uplink traffic if the assistance information indicates that MFBR limitation of all flows carrying the relayed GBR uplink traffic and mapped to the SL logical channel is not exceeded, decreasing PBR of the first terminal device's SL logical channel carrying relayed GBR uplink traffic if the assistance information indicates that MFBR limitation of any flows carrying the relayed GBR uplink traffic and mapped to the SL logical channel is exceeded, increasing PBR of the first terminal device or the relay terminal device's SL logical channel carrying PC5 traffic when the assistance information indicates that date rate limitation on PC5 traffic is not exceeded, or decreasing PBR of the first terminal device or the relay terminal device's SL logical channel carrying PC5 traffic when the assistance information indicates that date rate limitation on PC5 traffic is exceeded.

In an embodiment, the resource assignment comprises at least one of a resource assignment for a dynamic grant for network-scheduled sidelink transmission, a resource assignment for a configured grant for network-scheduled sidelink transmission, or a resource assignment for a maximum allowed grant size for terminal device autonomously selected sidelink transmission.

In an embodiment, the method further comprises transmitting an upper bound and an averaging window to the first terminal device and/or the relay terminal device. The upper bound is used to ensure an aggregate size of all PC5 MAC SDUs that carry uplink or downlink traffic of the first terminal device in the averaging window does not exceed the upper bound.

In a fourth aspect of the disclosure, there is provided a first terminal device. The first terminal device comprises a processor and a memory coupled to the processor. Said memory contains instructions executable by said processor. Said first terminal device is operative to receive at least one bit rate limitation from a network device. Said first terminal device is further operative to apply the at least one bit rate limitation. A relay terminal device is used to relay communication between the first terminal device and a data network.

In a fifth aspect of the disclosure, there is provided a relay terminal device. The relay terminal device comprises a processor and a memory coupled to the processor. Said memory contains instructions executable by said processor. Said relay terminal device is operative to receive at least one bit rate limitation for a first terminal device from a network device. Said relay terminal device is further operative to apply the at least one bit rate limitation for the first terminal device. The relay terminal device is used to relay communication between the first terminal device and a data network.

In a sixth aspect of the disclosure, there is provided a network device. The network device comprises a processor and a memory coupled to the processor. Said memory contains instructions executable by said processor. Said network device is operative to transmit at least one bit rate limitation for a first terminal device to the first terminal device. A relay terminal device is used to relay communication between the first terminal device and a data network.

In a seventh aspect of the disclosure, there is provided a first terminal device. The first terminal device comprises a first receiving module and a first applying module. The first receiving module may be configured to receive at least one bit rate limitation from a network device. The first applying module may be configured to apply the at least one bit rate limitation. A relay terminal device is used to relay communication between the first terminal device and a data network.

In an embodiment, the first terminal device may further comprise a first transmitting module configured to transmit queue status information to the relay terminal device.

In an embodiment, the first terminal device may further comprise a second receiving module configured to receive queue status information from the relay terminal device.

In an embodiment, the first terminal device may further comprise a third receiving module configured to receive a measurement configuration on data rate and/or resource utilization from the network device or a controlling terminal device.

In an embodiment, the first terminal device may further comprise a measurement module configured to perform measurement based on the measurement configuration.

In an embodiment, the first terminal device may further comprise a second transmitting module configured to transmit assistance information on data rate and/or resource utilization measured or calculated by the first terminal device to the network device or the relay terminal device.

In an embodiment, the first terminal device may further comprise a fourth receiving module configured to receive an upper bound and an averaging window from the network device. The upper bound is used to ensure an aggregate size of all PC5 MAC SDUs that carry uplink or downlink traffic of the first terminal device in the averaging window does not exceed the upper bound.

In an embodiment, the first terminal device may further comprise a second applying module configured to apply the upper bound and the averaging window.

In an eighth aspect of the disclosure, there is provided a relay terminal device. The relay terminal device comprises a first receiving module and a first applying module. The first receiving module may be configured to receive at least one bit rate limitation for a first terminal device from a network device. The first applying module may be configured to apply the at least one bit rate limitation for the first terminal device. A relay terminal device is used to relay communication between the first terminal device and a data network.

In an embodiment, the relay terminal device may further comprise a first transmitting module configured to transmit queue status information to the first terminal device.

In an embodiment, the relay terminal device may further comprise a second receiving module configured to receive queue status information from the first terminal device.

In an embodiment, the relay terminal device may further comprise a third receiving module configured to receive a measurement configuration on data rate and/or resource utilization from the network device or a controlling terminal device.

In an embodiment, the relay terminal device may further comprise a measurement module configured to perform measurement based on the measurement configuration.

In an embodiment, the relay terminal device may further comprise a second transmitting module configured to transmit assistance information on data rate and/or resource utilization measured or calculated by the relay terminal device to the network device.

In an embodiment, the relay terminal device may further comprise a fourth receiving module configured to receive assistance information on data rate and/or resource utilization measured or calculated by the first terminal device from the first terminal device.

In an embodiment, the relay terminal device may further comprise a third transmitting module configured to transmit the assistance information on data rate and/or resource utilization measured or calculated by the first terminal device to the network device.

In an embodiment, the relay terminal device may further comprise a fifth receiving module configured to receive an upper bound and an averaging window from the network device. The upper bound is used to ensure an aggregate size of all PC5 MAC SDUs that carry uplink or downlink traffic of the first terminal device in the averaging window does not exceed the upper bound.

In an embodiment, the relay terminal device may further comprise a second applying module configured to apply the upper bound and the averaging window.

In an embodiment, the relay terminal device further comprises a sixth receiving module configured to receive at least one bit rate limitation for the relay terminal device from the network device.

In an embodiment, the relay terminal device further comprises a third applying module configured to apply the at least one bit rate limitation for the relay terminal device.

In a ninth aspect of the disclosure, there is provided a network device. The network device comprises a first transmitting module. The first transmitting module may be configured to transmit at least one bit rate limitation for a first terminal device to the first terminal device. A relay terminal device is used to relay communication between the first terminal device and a data network.

In an embodiment, the network device may further comprise a second transmitting module may be configured to transmit the at least one bit rate limitation for the first terminal device to the relay terminal device.

In an embodiment, the network device may further comprise a third transmitting module may be configured to transmit a measurement configuration on data rate and/or resource utilization to the first terminal device and/or the relay terminal device.

In an embodiment, the network device may further comprise a receiving module may be configured to receive assistance information on data rate and/or resource utilization from the first terminal device and/or the relay terminal device.

In an embodiment, the network device may further comprise a performing module may be configured to perform data rate control and/or resource assignment based on the assistance information on data rate and/or resource utilization.

In an embodiment, the network device may further comprise a fourth transmitting module may be configured to transmit an upper bound and an averaging window to the first terminal device and/or the relay terminal device. The upper bound is used to ensure an aggregate size of all PC5 MAC SDUs that carry uplink or downlink traffic of the first terminal device in the averaging window does not exceed the upper bound.

In a tenth aspect of the disclosure, a method implemented by a first terminal device is provided. The method comprises: operating a queue management, QM, function, controlling queues for each flow; and receiving, by the QM function, QoS requirements for PC5 transmissions and/or subsequent relay transmissions for controlling the queues for each flow.

In an alternative embodiment of the tenth aspect, the method may further comprise: receiving, by the QM function, indicators of link radio channel quality, data volume of flows or services, and/or indicators of link congestion or load.

In another alternative embodiment of the tenth aspect, the first terminal device may be a remote terminal device.

In another alternative embodiment of the tenth aspect, the first terminal device may be a relay terminal device.

In an eleventh aspect of the disclosure, a method implemented by a control node is provided. The method comprises: transmitting remote terminal device information and a corresponding session aggregate maximum bit rate, AMBR, to a user plane function for a relay terminal device associated with the control node.

In a twelfth aspect of the disclosure, a first terminal device is provided. The first terminal device comprises a processor and a memory communicatively coupled to the processor. The memory is adapted to store instructions which, when executed by the processor, cause the first terminal device to perform operations of the method according to the above tenth aspect.

In a thirteenth aspect of the present disclosure, a first terminal device is provided. The first terminal device is adapted to perform the method of the above tenth aspect.

In a fourteenth aspect of the present disclosure, a control node is provided. The control node comprises a processor and a memory communicatively coupled to the processor. The memory is adapted to store instructions which, when executed by the processor, cause the control node to perform operations of the method according to the above eleventh aspect.

In a fifteenth aspect of the present disclosure, a control node is provided. The control node is adapted to perform the method of the above eleventh aspect.

In a sixteenth aspect of the present disclosure, a wireless communication system is provided. The wireless communication system comprises: a first terminal device of the above twelfth or thirteenth aspect; and a control node of the above fourteenth or fifteenth aspect, communicating with at least the first terminal device.

In a seventeenth aspect of the present disclosure, a non-transitory computer readable medium having a computer program stored thereon is provided. When the computer program is executed by a set of one or more processors of a first terminal device, the computer program causes the first terminal device to perform operations of the method according to the above tenth aspect.

In an eighteenth aspect of the present disclosure, a non-transitory computer readable medium having a computer program stored thereon is provided. When the computer program is executed by a set of one or more processors of a control node, the computer program causes the control node to perform operations of the method according to the above eleventh aspect.

In another aspect of the disclosure, there is provided a computer program product comprising instructions which when executed by at least one processor, cause the at least one processor to perform the method according to any one of the first, second and third aspects.

In another aspect of the disclosure, there is provided a computer-readable storage medium storing instructions which when executed by at least one processor, cause the at least one processor to perform the method according to any one of the first, second and third aspects.

In another aspect of the disclosure, there is provided a communication system including a host computer. The host computer includes processing circuitry configured to provide user data and a communication interface configured to forward the user data to a cellular network for transmission to a terminal device. The cellular network includes the network device above mentioned, and/or the terminal device (such as the first terminal device and the relay terminal device) above mentioned.

In embodiments of the present disclosure, the system further includes the terminal device. The terminal device is configured to communicate with the network device.

In embodiments of the present disclosure, the processing circuitry of the host computer is configured to execute a host application, thereby providing the user data; and the terminal device includes processing circuitry configured to execute a client application associated with the host application.

In another aspect of the disclosure, there is provided a communication system including a host computer and a network device. The host computer includes a communication interface configured to receive user data originating from a transmission from a terminal device. The transmission is from the terminal device to the network device. The network device is above mentioned, and/or the terminal device is above mentioned.

In embodiments of the present disclosure, the processing circuitry of the host computer is configured to execute a host application. The terminal device is configured to execute a client application associated with the host application, thereby providing the user data to be received by the host computer.

In another aspect of the disclosure, there is provided a method implemented in a communication system which may include a host computer, a network device and a terminal device. The method may comprise providing user data at the host computer. Optionally, the method may comprise, at the host computer, initiating a transmission carrying the user data to the terminal device via a cellular network comprising the network device which may perform any step of the method according to the third aspect of the present disclosure.

In another aspect of the disclosure, there is provided a communication system including a host computer. The host computer may comprise processing circuitry configured to provide user data, and a communication interface configured to forward the user data to a cellular network for transmission to a terminal device. The cellular network may comprise a network device having a radio interface and processing circuitry. The network device's processing circuitry may be configured to perform any step of the method according to the third aspect of the present disclosure.

In another aspect of the disclosure, there is provided a method implemented in a communication system which may include a host computer, a network device and a terminal device. The method may comprise providing user data at the host computer. Optionally, the method may comprise, at the host computer, initiating a transmission carrying the user data to the terminal device via a cellular network comprising the network device. The terminal device may perform any step of the method according to the first and second aspects of the present disclosure.

In another aspect of the disclosure, there is provided a communication system including a host computer. The host computer may comprise processing circuitry configured to provide user data, and a communication interface configured to forward user data to a cellular network for transmission to a terminal device. The terminal device may comprise a radio interface and processing circuitry. The terminal device's processing circuitry may be configured to perform any step of the method according to the first and second aspects of the present disclosure.

In another aspect of the disclosure, there is provided a method implemented in a communication system which may include a host computer, a network device and a terminal device. The method may comprise, at the host computer, receiving user data transmitted to the network device from the terminal device which may perform any step of the method according to the first and second aspects of the present disclosure.

In another aspect of the disclosure, there is provided a communication system including a host computer. The host computer may comprise a communication interface configured to receive user data originating from a transmission from a terminal device to a network device. The terminal device may comprise a radio interface and processing circuitry. The terminal device's processing circuitry may be configured to perform any step of the method according to the first and second aspects of the present disclosure.

In another aspect of the disclosure, there is provided a method implemented in a communication system which may include a host computer, a network device and a terminal device. The method may comprise, at the host computer, receiving, from the network device, user data originating from a transmission which the network device has received from the terminal device. The network device may perform any step of the method according to the third aspect of the present disclosure.

In another aspect of the disclosure, there is provided a communication system which may include a host computer. The host computer may comprise a communication interface configured to receive user data originating from a transmission from a terminal device to a network device. The network device may comprise a radio interface and processing circuitry. The network device's processing circuitry may be configured to perform any step of the method according to the third aspect of the present disclosure.

Embodiments herein may provide many advantages, of which a non-exhaustive list of examples follows. In some embodiments herein, the rate limitation such as UE-AMBR of remote UE and UE-PC5-AMBR of remote UE and relay UE could be enforced properly. In some embodiments herein, the system resource could be used more efficiently and properly. In some embodiments herein, the system performance could be improved. With the methods and devices of the present disclosure, the session-AMBR and the PC5 LINK-AMBR of the remote UE can be enforced by the L3 UE-to-Network relay. Thus, better traffic control can be achieved in the L3 UE-to-Network relay scenario. Moreover, the methods and devices of the present disclosure have little impact on the current operations of the gNB and the core network. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
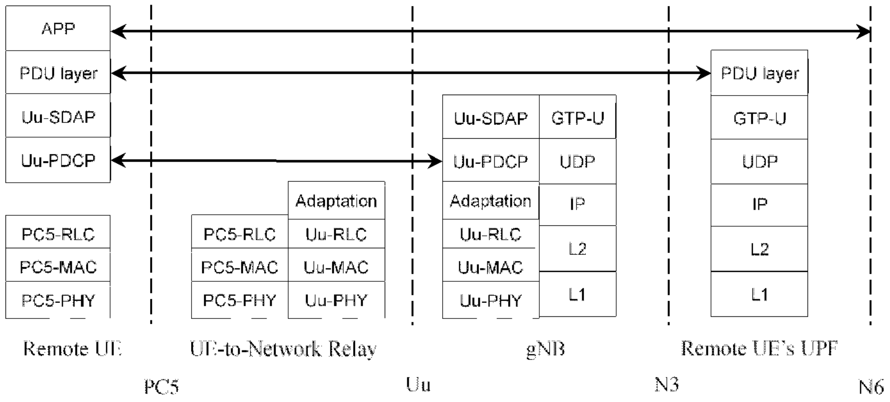
FIG. 1 shows a protocol stack of a user plane for L2 (layer 2) UE to NW (network) relay UE according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3GPP. For example, the communication protocols may comprise the first generation (1G), 2G, 3G, 4G, 4.5G, 5G communication protocols, and/or any other protocols either currently known or to be developed in the future.

The term "network device" refers to any suitable network function (NF) which can be implemented in a network entity (physical or virtual) of a communication network. For example, the network function can be implemented either as a network element on a dedicated hardware, as a software instance running on a dedicated hardware, or as a virtualized function instantiated on an appropriate platform, e.g. on a cloud infrastructure. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service communication proxy), NWDAF (network data analytics function), NSSF (Network Slice Selection Function), NSSAAF (Network Slice-Specific Authentication and Authorization Function), etc. For example, the 4G system (such as LTE) may include MME (Mobile Management Entity), HSS (home subscriber server), Policy and Charging Rules Function (PCRF), Packet Data Network Gateway (PGW), PGW control plane (PGW-C), Serving gateway (SGW), SGW control plane (SGW-C), E-UTRAN Node B (eNB), etc. In other embodiments, the network function may comprise different types of NFs for example depending on a specific network.

The network device may be an access network device with accessing function in a communication network via which a terminal device accesses to the network and receives services therefrom. The access network device may include a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), an Integrated Access and Backhaul (IAB) node, a remote radio head (RRH), a relay, a low power node such as a femto, a pico, and so forth.

Yet further examples of the access network device comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP (3rd Generation Partnership Project), such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" or "at least one of A or B" should be understood to mean "only A, only B, or both A and B." The phrase "A and/or B" should be understood to mean "only A, only B, or both A and B".

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

Figure 3A:
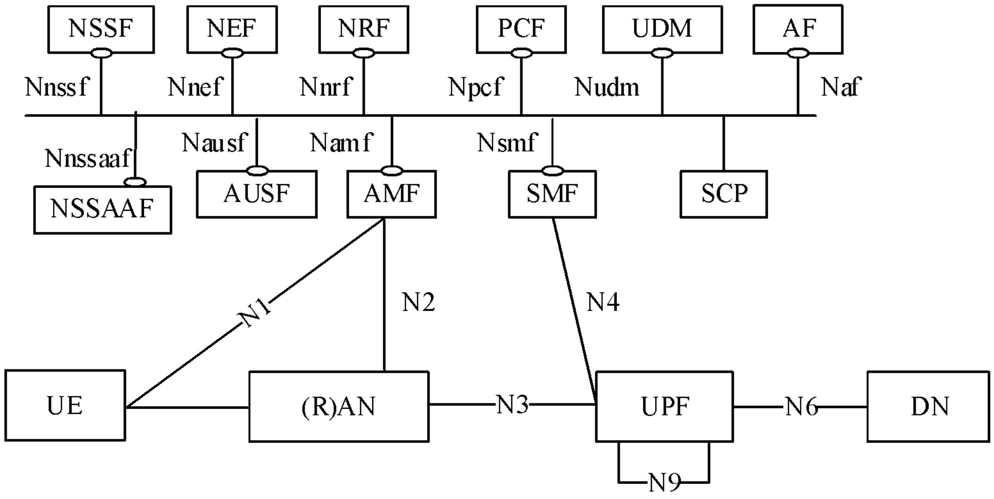
FIG. 3*a* schematically shows a high level architecture in the fifth generation network according to an embodiment of the present disclosure.
Figure 3B:
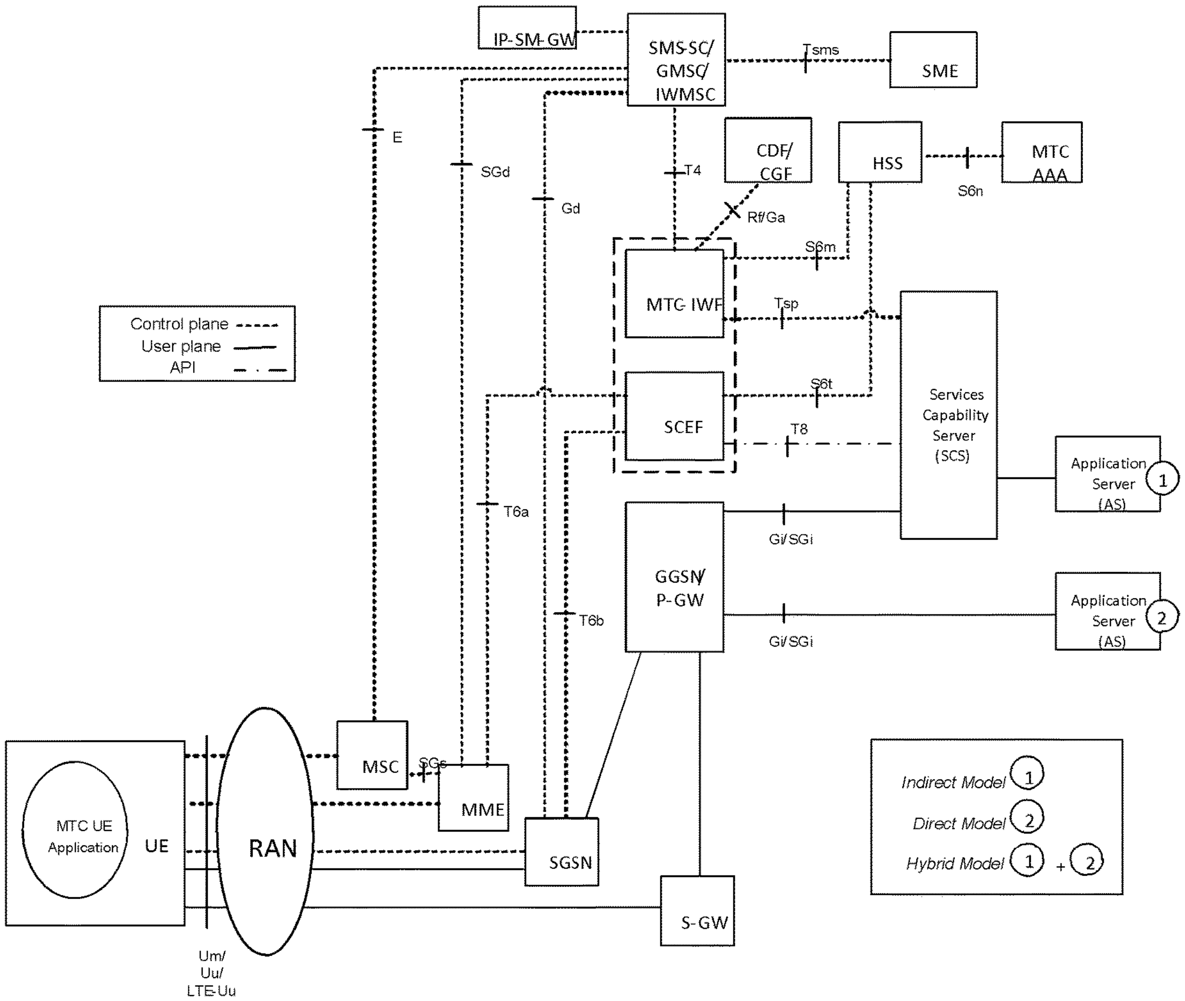
FIG. 3*b* schematically shows a system architecture in a 4G network according to an embodiment of the present disclosure.

Although the subject matter described herein may be implemented in any appropriate type of system using any suitable components, the embodiments disclosed herein are described in relation to a communication system complied with the exemplary system architectures illustrated in FIGS. 3*a*-3*b*. For simplicity, the system architectures of FIGS. 3*a*-3*b* only depict some exemplary elements. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

FIG. 3*a* schematically shows a high level architecture in the fifth generation network according to an embodiment of the present disclosure. For example, the fifth generation network may be 5GS. The architecture of FIG. 3*a* is same as Figure 4.2.3-1 as described in 3GPP TS 23.501 V16.7.0, the disclosure of which is incorporated by reference herein in its entirety. The system architecture of FIG. 3*a* may comprise some exemplary elements such as AUSF, AMF, DN (data network), NEF, NRF, NSSF, PCF, SMF, UDM, UPF, AF, UE, (R)AN, SCP (Service Communication Proxy), NSSAAF (Network Slice-Specific Authentication and Authorization Function), etc.

In accordance with an exemplary embodiment, the UE can establish a signaling connection with the AMF over the reference point N1, as illustrated in FIG. 3*a*. This signaling connection may enable NAS (Non-access stratum) signaling exchange between the UE and the core network, comprising a signaling connection between the UE and the (R)AN and the N2 connection for this UE between the (R)AN and the AMF. The (R)AN can communicate with the UPF over the reference point N3. The UE can establish a protocol data unit (PDU) session to the DN (data network, e.g. an operator network or Internet) through the UPF over the reference point N6.

As further illustrated in FIG. 3*a*, the exemplary system architecture also contains the service-based interfaces such as Nnrf, Nnef, Nausf, Nudm, Npcf, Namf and Nsmf exhibited by NFs such as the NRF, the NEF, the AUSF, the UDM, the PCF, the AMF and the SMF. In addition, FIG. 3*a* also shows some reference points such as N1, N2, N3, N4, N6 and N9, which can support the interactions between NF services in the NFs. For example, these reference points may be realized through corresponding NF service-based interfaces and by specifying some NF service consumers and providers as well as their interactions in order to perform a particular system procedure.

Various NFs shown in FIG. 3*a* may be responsible for functions such as session management, mobility management, authentication, security, etc. The AUSF, AMF, DN, NEF, NRF, NSSF, PCF, SMF, UDM, UPF, AF, UE, (R)AN, SCP may include the functionality for example as defined in clause 6.2 of 3GPP TS23.501 V16.7.0.

FIG. 3*b* schematically shows a system architecture in a 4G network according to an embodiment of the present disclosure, which is the same as Figure 4.2-1a of 3GPP TS 23.682 V16.8.0, the disclosure of which is incorporated by reference herein in its entirety. The system architecture of FIG. 3*b* may comprise some exemplary elements such as Services Capability Server (SCS), Application Server (AS), SCEF (Service Capability Exposure Function), HSS, UE, RAN(Radio Access Network), SGSN (Serving GPRS(General Packet Radio Service) Support Node), MME, MSC (Mobile Switching Centre), S-GW(Serving Gateway), GGSN/P-GW(Gateway GPRS Support Node/PDN(Packet Data Network) Gateway), MTC-IWF(Machine Type Communications-InterWorking Function) CDF/CGF(Charging Data Function/Charging Gateway Function), MTC-AAA (Machine Type Communications-authentication, authorization and accounting), SMS-SC/GMSCAWMSC(Short Message Service-Service Centre/Gateway MSC/InterWorking MSC) IP-SM-GW(Internet protocol Short Message Gateway). The network elements and interfaces as shown in FIG. 3*b* may be same as the corresponding network elements and interfaces as described in 3GPP TS 23.682 V16.8.0.

FIG. 3*b* shows the architecture for a UE used for MTC connecting to the 3GPP network (UTRAN (Universal Terrestrial Radio Access Network), E-UTRAN (Evolved UTRAN), GERAN (GSM EDGE (Enhanced Data rates for GSM Evolution) Radio Access Network), etc.) via the Um/Uu/LTE-Uu interfaces. They also show the 3GPP network service capability exposure to SCS and AS.

As further illustrated in FIG. 3*b*, the exemplary system architecture also contains various reference points.

Tsms: Reference point used by an entity outside the 3GPP network to communicate with UEs used for MTC via SMS (Short Message Service).

Tsp: Reference point used by a SCS to communicate with the MTC-IWF related control plane signalling.

T4: Reference point used between MTC-IWF and the SMS-SC in the HPLMN.

T6a: Reference point used between SCEF and serving MME.

T6b: Reference point used between SCEF and serving SGSN.

T8: Reference point used between the SCEF and the SC S/AS.

S6m: Reference point used by MTC-IWF to interrogate HSS/HLR.

S6n: Reference point used by MTC-AAA to interrogate HSS/HLR.

S6t: Reference point used between SCEF and HSS.

SGs: Reference point used between MSC and MME.

Gi/SGi: Reference point used between GGSN/P-GW and application server and between GGSN/P-GW and SCS.

Rf/Ga: Reference point used between MTC-IWF and CDF/CGF.

Gd: Reference point used between SMS-SC/GMSC/IWMSC and SGSN.

SGd: Reference point used between SMS-SC/GMSC/IWMSC and MME.

E: Reference point used between SMS-SC/GMSC/IWMSC and MSC.

The end-to-end communications, between the MTC Application in the UE and the MTC Application in the external network, uses services provided by the 3GPP system, and optionally services provided by a Services Capability Server (SCS).

The MTC Application in the external network is typically hosted by an Application Server (AS) and may make use of an SCS for additional value added services. The 3GPP system provides transport, subscriber management and other communication services including various architectural enhancements motivated by, but not restricted to, MTC (e.g. control plane device triggering).

Different models are foreseen for machine type of traffic in what relates to the communication between the AS and the 3GPP system and based on the provider of the SCS. The different architectural models that are supported by the Architectural Reference Model of FIG. 3*b* include the following:

Direct Model—The AS connects directly to the operator network in order to perform direct user plane communications with the UE without the use of any external SCS. The Application in the external network may make use of services offered by the 3GPP system;

Indirect Model—The AS connects indirectly to the operator network through the services of a SCS in order to utilize additional value added services for MTC (e.g. control plane device triggering).

Hybrid Model: The AS uses the direct model and indirect models simultaneously in order to connect directly to the operator's network to perform direct user plane communications with the UE while also using a SCS. From the 3GPP network perspective, the direct user plane communication from the AS and any value added control plane related communications from the SCS are independent and have no correlation to each other even though they may be servicing the same MTC Application hosted by the AS.

The link or radio link over which the signals are transmitted between at least two UEs for D2D operation is called herein as the sidelink (SL). The signals transmitted between the UEs for D2D operation are called herein as SL signals. The term SL may also interchangeably be called as D2D link, V2X link, prose link, peer-to-peer link, PC5 link, etc. The SL signals may also interchangeably be called as V2X signals, D2D signals, prose signals, PC5 signals, peer-to-peer signals, etc.

As used herein, the term "at least one of" is used in the description of signaling alternatives between two nodes (i.e., between two UEs, or between a gNB and a UE). This term means that a node may transmit the signaling information to another node using one or more than one alternatives. For the latter case, the node applies several different signaling alternatives to transmit the same information to the other node to improve the transmission reliability.

Though the embodiments of the disclosure are mainly discussed in the context of NR RAT, but they can also be applied to LTE RAT and any other RAT enabling the transmission on two nearby devices without any loss of meaning.

As used herein, the term “remote (RM) UE” may be referred to as the UE that needs to transmit/receive packets from/to the network device (such as the gNB) via an intermediated relay (RL) UE that may be referred to as RL UE.

As used herein, the term “relay traffic” stands for the traffic which is generated by RM UE and transmitted to the network device (such as gNB) via RL UE. The term “local traffic” stands for the traffic which is transmitted between RM UE and RL UE, and not be further forwarded to the network device (such as gNB).

Figure 4A:
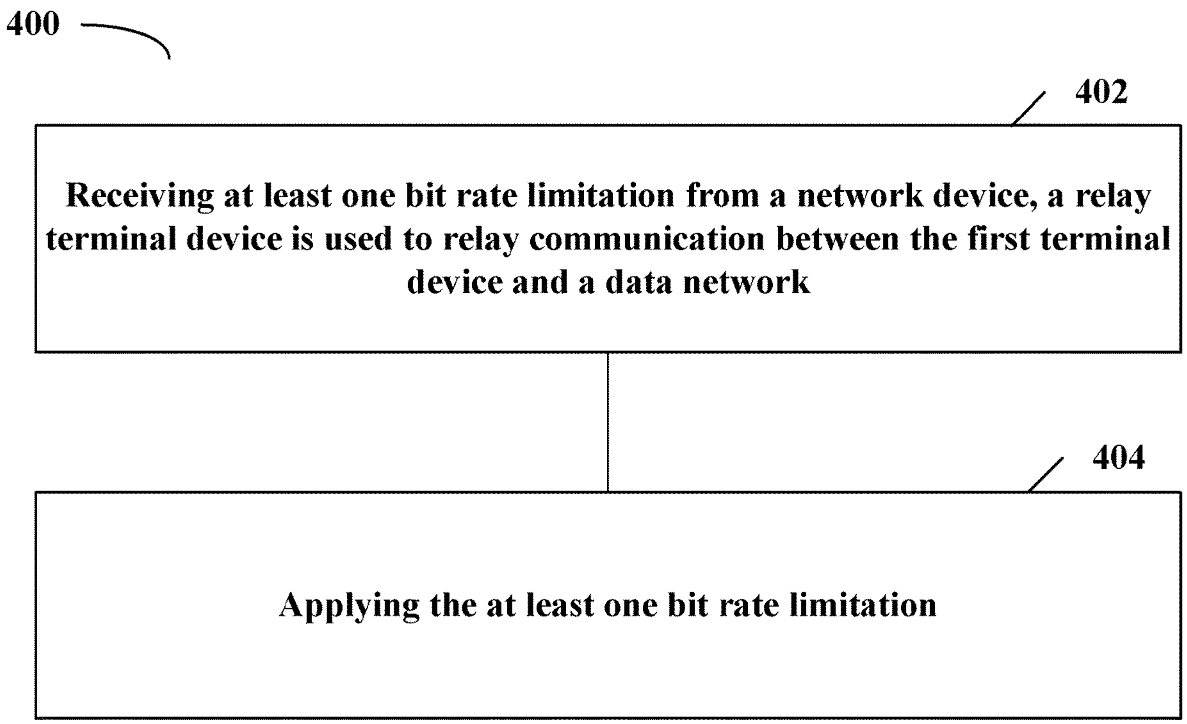
FIG. 4*a* shows a flowchart of a method according to an embodiment of the present disclosure.

FIG. 4*a* shows a flowchart of a method according to an embodiment of the present disclosure, which may be performed by an apparatus implemented in or at or as a first terminal device or communicatively coupled to the first terminal device. As such, the apparatus may provide means or modules for accomplishing various parts of the method 400 as well as means or modules for accomplishing other processes in conjunction with other components.

At block 402, the first terminal device may receive at least one bit rate limitation from a network device. A relay terminal device is used to relay communication between the first terminal device and a data network. For example, the first terminal device may be the RM UE. The network device may be an access network device or a core network device. The relay terminal device may be RL UE.

In an embodiment, the network device comprises at least one of an access network device or access management function. For example, the access network device may be a base station such as eNodeB or gNB. The access management function may be AMF or MME.

The at least one bit rate limitation may be any suitable bit rate limitation such as for the first terminal device, for a service, for a flow, for a session, for a link (such as Uu link or sidelink), etc. The bit rate limitation may be defined for any direction traffic, such as the traffic from the first terminal device to the data network, the traffic from the data network to the first terminal device, the traffic from the first terminal device to the relay terminal device, the traffic from the relay terminal device to the first terminal device, etc.

In an embodiment, the at least one bit rate limitation comprises at least one of a bit rate limitation for traffic transmitted from the first terminal device, a bit rate limitation for traffic received by the first terminal device, a bit rate limitation for traffic from the first terminal device to the data network; a bit rate limitation for traffic from the data network to the first terminal device; a bit rate limitation for traffic from the first terminal device to the relay terminal device; or a bit rate limitation for traffic from the relay terminal device to the first terminal device.

The embodiments of the disclosure are intended for RM UE in case of L2 U2N relay to enforce data rate limitation for PC5 transmissions and/or relayed Uu transmissions. In an embodiment, a bit rate limitation for traffic between the data network and the first terminal device comprises at least one of aggregate maximum bit rate (AMBR) for a session of the first terminal device, aggregate AMBR for all non-guaranteed bit rate (GBR) quality of service (QoS) flows of a user equipment (UE) of the first terminal device, guaranteed flow bit rate (GFBR) of the first terminal device, maximum flow bit rate (MFBR) of the first terminal device, or maximum data burst volume (MDBV) of the first terminal device. GFBR, MFBR and MDBV may be similar to the corresponding terms as described in 3GPP TS 23.501 V16.7.0.

For example, for GBR QoS Flows only, the following additional QoS parameters exist:

Guaranteed Flow Bit Rate (GFBR)—UL and DL;

Maximum Flow Bit Rate (MFBR)—UL and DL.

The GFBR denotes the bit rate that is guaranteed to be provided by the network to the QoS Flow over the Averaging Time Window. The MFBR limits the bit rate to the highest bit rate that is expected by the QoS Flow (e.g. excess traffic may get discarded or delayed by a rate shaping or policing function at the UE, RAN, UPF). Bit rates above the GFBR value and up to the MFBR value, may be provided with relative priority determined by the Priority Level of the QoS Flows (see clause 5.7.3.3 of 3GPP TS 23.501 V16.7.0).

Each GBR QoS Flow with Delay-critical resource type shall be associated with a Maximum Data Burst Volume (MDBV).

MDBV denotes the largest amount of data that the 5G-AN is required to serve within a period of 5G-AN PDB.

Every standardized 5QI (of Delay-critical GBR resource type) is associated with a default value for the MDBV (specified in QoS characteristics Table 5.7.4.1). The MDBV may also be signalled together with a standardized 5QI to the (R)AN, and if it is received, it shall be used instead of the default value.

The MDBV may also be signalled together with a pre-configured 5QI to the (R)AN, and if it is received, it shall be used instead of the pre-configured value.

In an embodiment, a bit rate limitation for traffic between the relay terminal device and the first terminal device comprises at least one of UE-PC5-AMBR of the first terminal device or PC5 link AMBR of the link between the first terminal device and the relay terminal device. PC5 link AMBR denotes AMBR for a PC5 link.

In an embodiment, the traffic between the relay terminal device and the first terminal device may correspond to traffic transmitted/received by the first terminal. In an embodiment, the traffic between the relay terminal device and the first terminal device may include both relayed Uu traffic and PC5 traffic. In an embodiment, the traffic between the relay terminal device and the first terminal device may include only the PC5 traffic (note that the PC5 traffic may be sent to UE(s) other than the relay UE).

The at least one bit rate limitation may be received from the network device via various messages. The at least one bit rate limitation may be received directly from the network device without using the relay terminal device. The at least one bit rate limitation may be received from the network device by using the relay terminal device. In an embodiment, the at least one bit rate limitation is received from the network device via at least one of a non-access stratum (NAS) signaling or a radio resource control (RRC) signaling.

At block 404, the first terminal device may apply the at least one bit rate limitation. For example the first terminal device may apply the at least one bit rate limitation in various ways such that the data rate for the traffic of the first terminal related to a corresponding bit rate limitation does not exceed the corresponding bit rate limitation.

In an embodiment, the network device may maintain at least one queue for traffic of the first terminal related to a corresponding bit rate limitation. The network device may apply the corresponding bit rate limitation for the at least one queue such that aggregated data rate over the at least one queue does not exceed the corresponding bit rate limitation. For example, the network device may apply the corresponding bit rate limitation for the at least one queue such that aggregated data rate over the at least one queue does not exceed the corresponding bit rate limitation, and the aggregated data rate of all non-guaranteed bit rate (GBR) quality of service (QoS) flows of the first terminal also does not exceed the corresponding bit rate limitation.

For example, a queue management (QM) function may be comprised in the first terminal device such as RM UE to manage transmission and reception of its traffic such as Non-GBR Uu traffic. Each queue may be maintained for traffic (such as Non-GBR Uu traffic) delivered in a PDU session or a flow. The QM function is operated by the first terminal device such as RM UE to enforce at least one bit rate limitation (such as the session-AMBR and/or MFBR) for each queue when the queue is maintained per PDU session/flow. The QM function also ensures that the aggregated data rate over all the queues (e.g., the summed session-AMBR or Flow Bit Rate) does not exceed the at least one bit rate limitation (such as UE-AMBR and UE-PC5-AMBR limitation) of the first terminal device such as RM UE.

In an embodiment, the network device may inform a RM UE (i.e., the first terminal device) of UE-AMBR limitation in UL and/or DL of the RM UE. The UE-AMBR limitation in UL and/or DL of the RM UE may be informed by a core NW entity (e.g. AMF) via NAS signaling or by access network device (such as gNB) via RRC signaling. The RM UE then enforces the UE-AMBR in UL and/or DL for its Non-GBR Uu QoS flows.

Figure 4B:
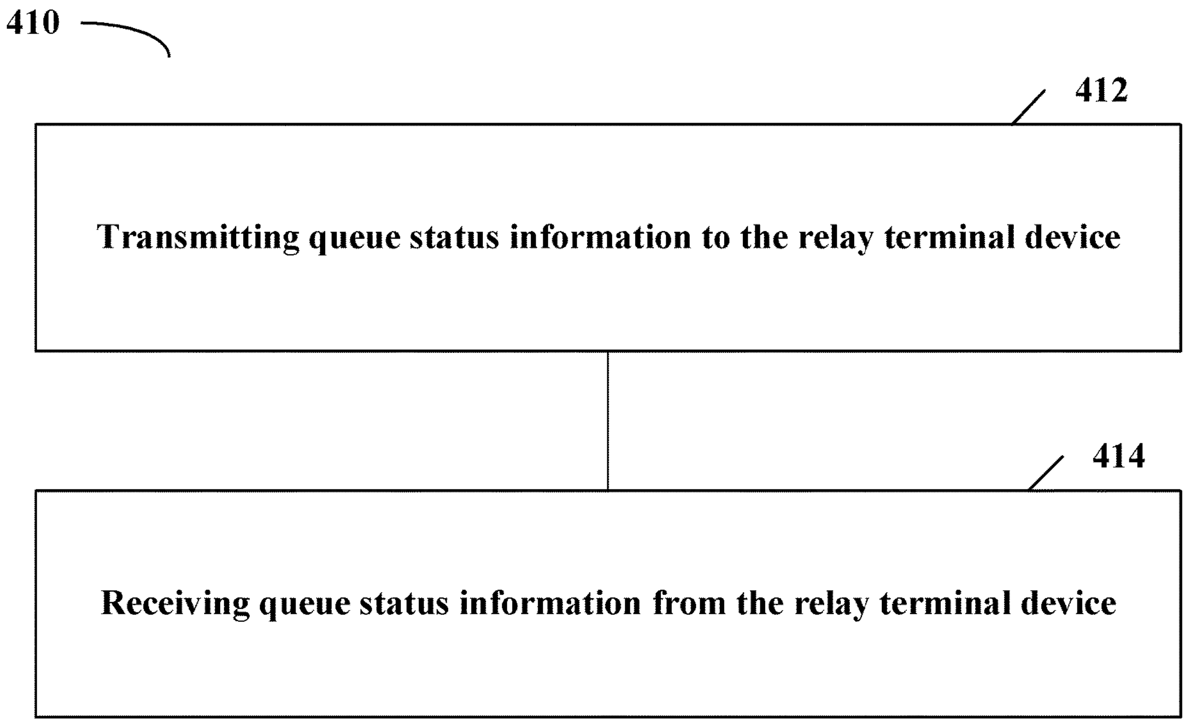
FIG. 4*b* shows a flowchart of a method according to another embodiment of the present disclosure.

FIG. 4*b* shows a flowchart of a method according to another embodiment of the present disclosure, which may be performed by an apparatus implemented in or at or as a first terminal device or communicatively coupled to the first terminal device. As such, the apparatus may provide means or modules for accomplishing various parts of the method 410 as well as means or modules for accomplishing other processes in conjunction with other components. For some parts which have been described in the above embodiments, the description thereof is omitted here for brevity.

At block 412, the first terminal device may transmit queue status information to the relay terminal device.

At block 414, the first terminal device may receive queue status information from the relay terminal device The queue status information may comprise any suitable queue status information. In an embodiment, the queue status information may comprise at least one of a buffer size, a queuing delay, a packet loss, a number of transmitted packets, a number of received packets, a number of transmitted bits, a number of received bits, or an indication of which packets or protocol data units (PDU) have been received successfully.

In an embodiment, the queue status information comprises at least one of queue status information for a terminal device, queue status information for a session, queue status information for a bearer, or queue status information for a flow.

The queue status information can be exchanged between the first terminal device and the relay terminal device via various messages. In an embodiment, the queue status information is exchanged between the first terminal device and the relay terminal device via at least one of PC5-RRC signaling, or control PDUs in an adaptation layer.

The queue status information may be used by the QM function for various purposes such as data rate control and/or resource assignment, etc.

In an embodiment, in case the QM function may be comprised in both the RM UE and the RL UE side, several new types of control PDUs may be defined to exchange status on the queues between the QM functions at the RL and RM UE. The control PDUs may comprise at least one of the following:

- Control PDUs for flow control in terms of e.g., buffer size, queuing delay, packet loss, number of transmitted packets, number of received packets, number of transmitted bits, number of received bits etc.
- Control PDUs for status report, indicating which packets/PDUs have been received successfully.
- The control PDUs may be defined per RM UE or per flow of the RM UE. In case the queue is for per PDU session at the RM UE, the RM UE may include the aggregated per UE information in the control PDUs.

The control PDUs may be transmitted using PC5-RRC signaling and/or in the adaptation layer.

Figure 4C:
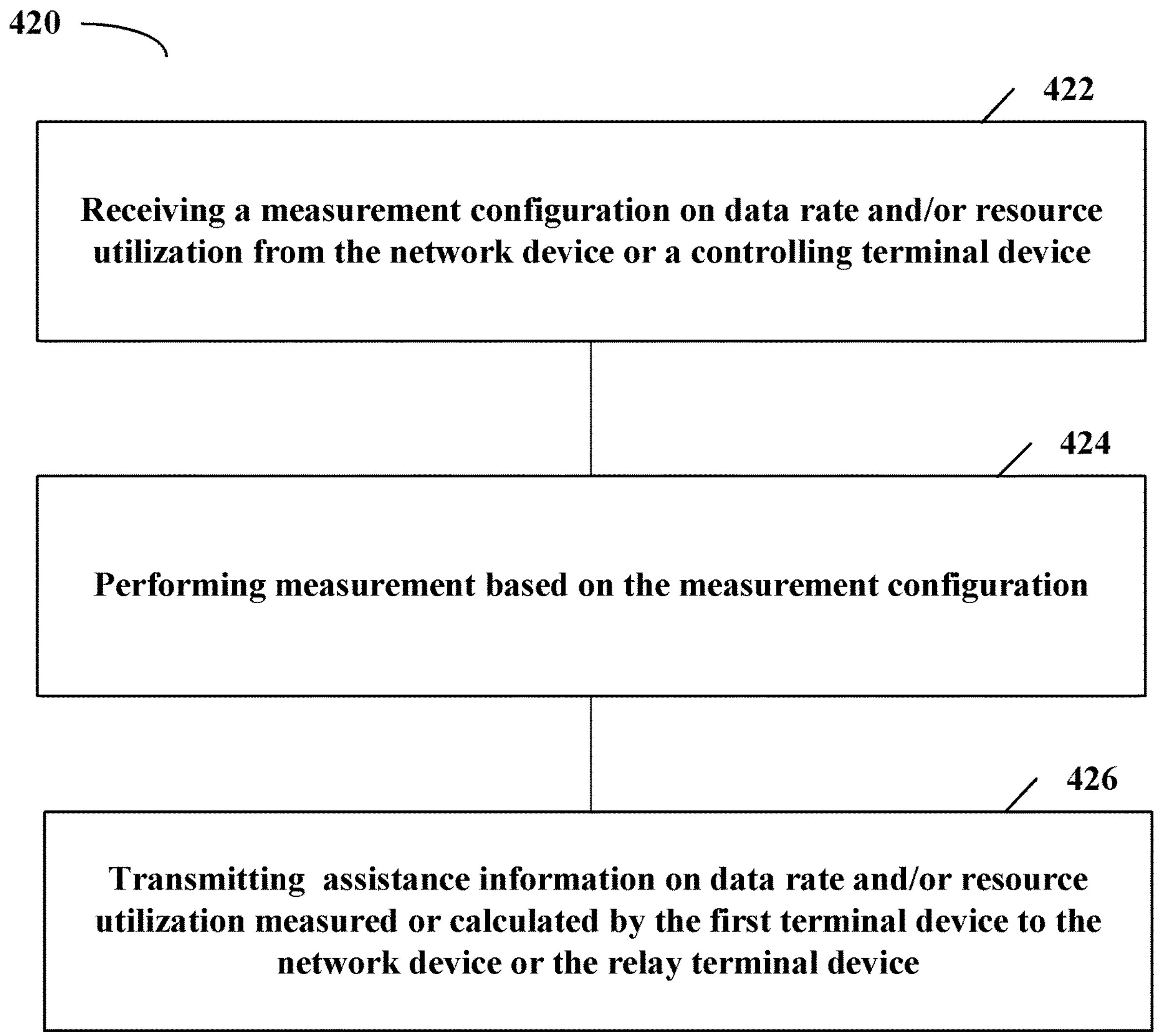
FIG. 4*c* shows a flowchart of a method according to another embodiment of the present disclosure.

FIG. 4*c* shows a flowchart of a method according to another embodiment of the present disclosure, which may be performed by an apparatus implemented in or at or as a first terminal device or communicatively coupled to the first terminal device. As such, the apparatus may provide means or modules for accomplishing various parts of the method 420 as well as means or modules for accomplishing other processes in conjunction with other components. For some parts which have been described in the above embodiments, the description thereof is omitted here for brevity.

At block 422, the first terminal device may receive a measurement configuration on data rate and/or resource utilization from the network device or a controlling terminal device.

At block 424, the first terminal device may perform measurement based on the measurement configuration.

At block 426, the first terminal device may transmit assistance information on data rate and/or resource utilization measured or calculated by the first terminal device to the network device or the relay terminal device.

In an embodiment, the assistance information on data rate and/or resource utilization measured or calculated by the first terminal device comprises at least one of a measured or calculated data rate or data volume, a percentage of PC5 resources that are used to carry uplink traffic among all consumed PC5 resources, or a percentage of resources allocated by a resource allocation mode among all consumed resources used to carry uplink traffic on a PC5 link.

In an embodiment, the resource allocation mode comprises at least one of network-scheduled sidelink transmission, or terminal device autonomously selected sidelink transmission.

In an embodiment, the measured or calculated data rate or data volume comprises at least one of measured or calculated data rate or data volume for a flow, measured or calculated data rate or data volume for a radio bearer, measured or calculated data rate or data volume for a PC5 link, measured or calculated data rate or data volume for relayed Uu traffic, measured or calculated data rate or data volume for PC5 traffic, measured or calculated data rate or data volume for relayed non-GBR Uu traffic, or measured or calculated data rate or data volume for relayed GBR Uu traffic.

In an embodiment, a reporting message is defined to the first terminal device such as RM UE. In the report message, the first terminal device such as RM UE provides assistance information on data rate and/or resource utilization, which for instance may comprise at least one of the following:

- Measured or calculated data rate or data volume
  - The measurement may be performed per flow, RB (radio bearer) or PC5 link, and/or separately for relayed Uu traffic and other PC5 traffic, and/or separately for relayed non-GBR Uu traffic and relayed GBR Uu traffic, while the first terminal device such as RM UE may report a calculated data rate such as aggregated non-GBR Uu data rate (which should be restricted by UE-AMBR) and/or Uu data rate on a certain RB (which should be restricted by MFBR of all flows in that RB) and/or aggregated PC5 data rate (which should be restricted by UE-PC5-AMBR), etc. The calculated data rate may be calculated based on the measured data rate.
- Percentage of PC5 resources that is used to carry UL traffic among all consumed PC5 resources
  - In order to estimate the percentage of PC5 resources in MAC layer, the relayed Uu traffic and PC5 traffic should not be multiplexed in a same medium access control (MAC) service data unit (SDU) or in a same MAC PDU.
- Percentage of resources for Mode 1 resource allocation (or Mode 2 resource allocation) among all consumed resources used to carry UL traffic on the PC5 link In an embodiment, the first terminal device such as RM UE may send the assistance information directly to its serving network device such as gNB, or sends it to the connected relay terminal device which forwards it to the serving network device such as gNB. In one case, the relay terminal device can just forward the assistance information for a first terminal device such as RM UE to the network device such as gNB without any update. In another case, the relay terminal device such as RL UE can merge the assistance information received from a first terminal device such as RM UE with its own assistance information and send it to the network device such as gNB, Similarly, the relay terminal device such as RL UE may send its assistance information to the network device such as gNB. Alternatively, the relay terminal device such as RL UE may merge the assistance information received from a first terminal device such as RM UE with its own assistance information and send it to the network device such as gNB.

Figure 4D:
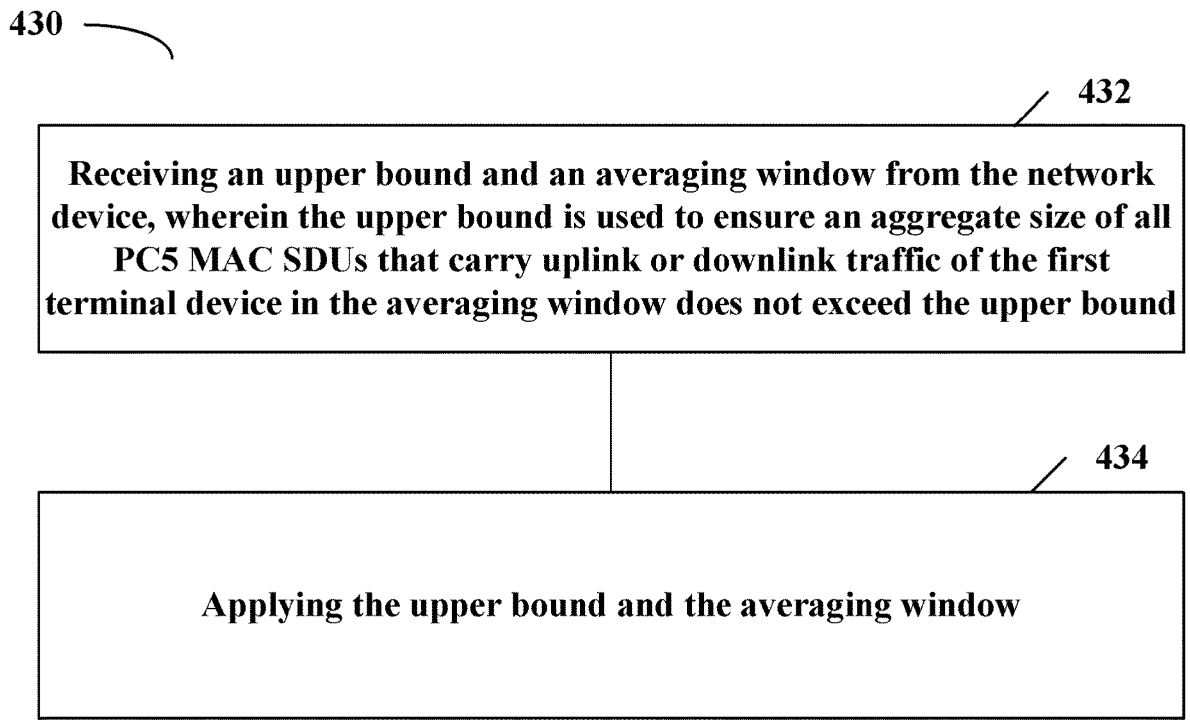
FIG. 4*d* shows a flowchart of a method according to another embodiment of the present disclosure.

FIG. 4*d* shows a flowchart of a method according to another embodiment of the present disclosure, which may be performed by an apparatus implemented in or at or as a first terminal device or communicatively coupled to the first terminal device. As such, the apparatus may provide means or modules for accomplishing various parts of the method 430 as well as means or modules for accomplishing other processes in conjunction with other components. For some parts which have been described in the above embodiments, the description thereof is omitted here for brevity.

At block 432, the first terminal device may receive an upper bound and an averaging window from the network device. The upper bound is used to ensure an aggregate size of all PC5 MAC SDUs that carry uplink or downlink traffic of the first terminal device in the averaging window does not exceed the upper bound. For example, the upper bound is used to ensure an aggregate size of all PC5 MAC SDUs that carry uplink or downlink traffic of the first terminal device that is averaged in the averaging window does not exceed the upper bound.

At block 434, the first terminal device may apply the upper bound and the averaging window. The upper bound may be In an embodiment, the upper bound is decreased when an uplink or downlink bit rate of the first terminal device is higher than an uplink or downlink bit rate limitation.

In an embodiment, the upper bound is increased when the uplink or downlink bit rate of the first terminal device is lower than the uplink or downlink bit rate limitation.

For example, for each RM UE and its connected RL UE, the serving network device such as gNB may configure an upper bound on the allowed aggregate size of all PC5 MAC SDU(s) that carry (non-GBR) UL/DL traffic of the RM UE in an averaging window. The upper bound is decreased/increased for the RM UE if the (averaged) UL/DL UE-AMBR of the RM UE measured by (R)AN or reported by the RM/RL UE becomes higher/lower than the UL/DL UE-AMBR limitation. The upper bound and the averaging window may be informed to the RM UE and the RL UE by using RRC signaling and the RM UE and/or the RL UE make sure that the aggregate size of all PC5 MAC SDU(s) that carry the RM UE's (Non-GBR) UL/DL traffic that is averaged over the averaging window does not exceed the upper bound.

Figure 5A:
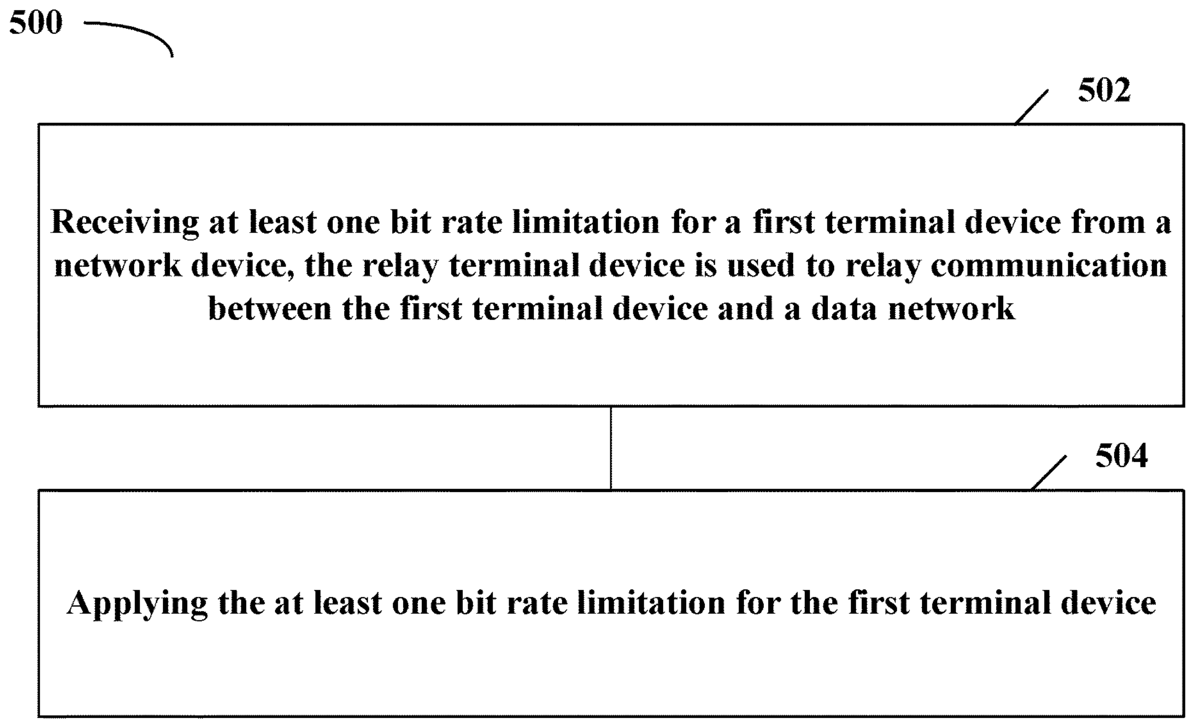
FIG. 5*a* shows a flowchart of a method according to another embodiment of the present disclosure.

FIG. 5*a* shows a flowchart of a method according to another embodiment of the present disclosure, which may be performed by an apparatus implemented in or at or as a relay terminal device or communicatively coupled to the relay terminal device. As such, the apparatus may provide means or modules for accomplishing various parts of the method 500 as well as means or modules for accomplishing other processes in conjunction with other components. For some parts which have been described in the above embodiments, the description thereof is omitted here for brevity.

At block 502, the relay terminal device may receive at least one bit rate limitation for a first terminal device from a network device. The relay terminal device is used to relay communication between the first terminal device and a data network.

At block 504, the relay terminal device may apply the at least one bit rate limitation for the first terminal device.

In an embodiment, the at least one bit rate limitation for the first terminal device comprises at least one of a bit rate limitation for traffic transmitted from the first terminal device, a bit rate limitation for traffic received by the first terminal device, a bit rate limitation for traffic from the first terminal device to the data network; a bit rate limitation for traffic from the data network to the first terminal device; a bit rate limitation for traffic from the first terminal device to the relay terminal device; or a bit rate limitation for traffic from the relay terminal device to the first terminal device.

In an embodiment, a bit rate limitation for traffic between the data network and the first terminal device comprises at least one of aggregate maximum bit rate (AMBR) for a session of the first terminal device, aggregate AMBR for all non-guaranteed bit rate (GBR) quality of service (QoS) flows of a user equipment (UE) of the first terminal device, guaranteed flow bit rate (GFBR) of the first terminal device, maximum flow bit rate (MFBR) of the first terminal device, or maximum data burst volume (MDBV) of the first terminal device.

In an embodiment, a bit rate limitation for traffic between the relay terminal device and the first terminal device comprises at least one of UE-PC5-AMBR of the relay terminal device, UE-PC5-AMBR of the first terminal device, or PC5 link AMBR of the link between the relay terminal device and the first terminal device.

In an embodiment, the network device comprises at least one of an access network device or access management function.

In an embodiment, the at least one bit rate limitation for the first terminal device and/or the relay terminal device is received from the network device via at least one of a non-access stratum (NAS) signaling or a radio resource control (RRC) signaling.

In an embodiment, the relay terminal device may maintain at least one queue for traffic of the first terminal related to a corresponding bit rate limitation and apply the corresponding bit rate limitation for the at least one queue such that aggregated data rate over the at least one queue does not exceed the corresponding bit rate limitation. For example, the QM function may be comprised in the relay terminal device such as RL UE to manage relaying of (Non-GBR) Uu traffic of the connected first terminal device such as RM UE. Each queue may be maintained for (Non-GBR) Uu traffic delivered from/to a connected first terminal device such as RM UE or a flow of the first terminal device such as RM UE. The QM function may ensure that the bit rate for at least one queue (or each queue) does not exceed the corresponding bit rate limitation such as the UE-AMBR limitation and the MFBR limitation of the first terminal device such as RM UE.

Figure 5B:
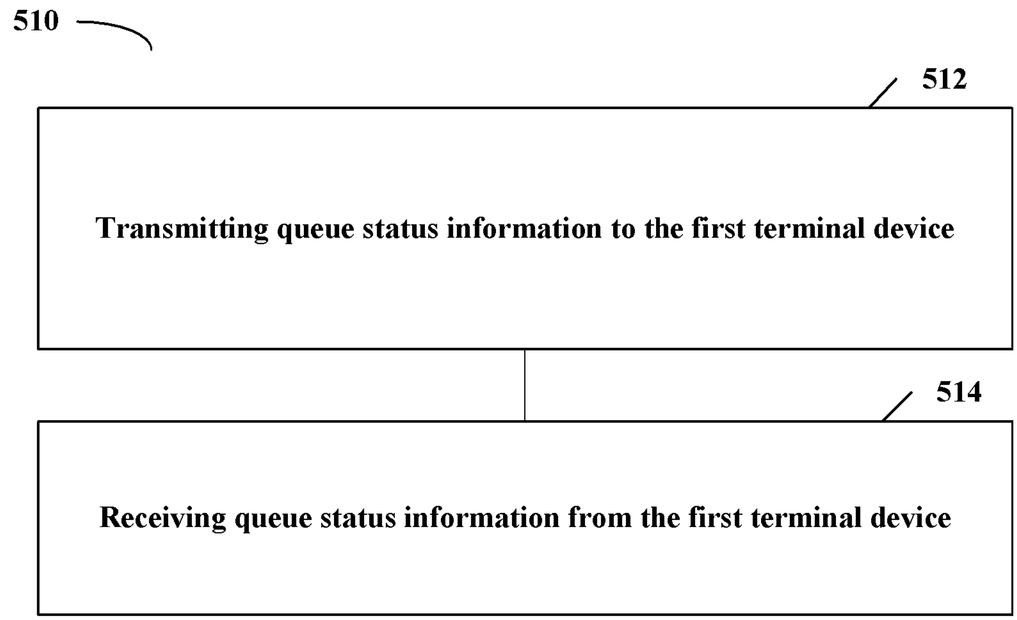
FIG. 5*b* shows a flowchart of a method according to another embodiment of the present disclosure.

FIG. 5*b* shows a flowchart of a method according to another embodiment of the present disclosure, which may be performed by an apparatus implemented in or at or as a relay terminal device or communicatively coupled to the relay terminal device. As such, the apparatus may provide means or modules for accomplishing various parts of the method 510 as well as means or modules for accomplishing other processes in conjunction with other components. For some parts which have been described in the above embodiments, the description thereof is omitted here for brevity.

At block 512, the relay terminal device may transmit queue status information to the first terminal device.

At block 514, the relay terminal device may receive queue status information from the first terminal device.

Figure 5C:
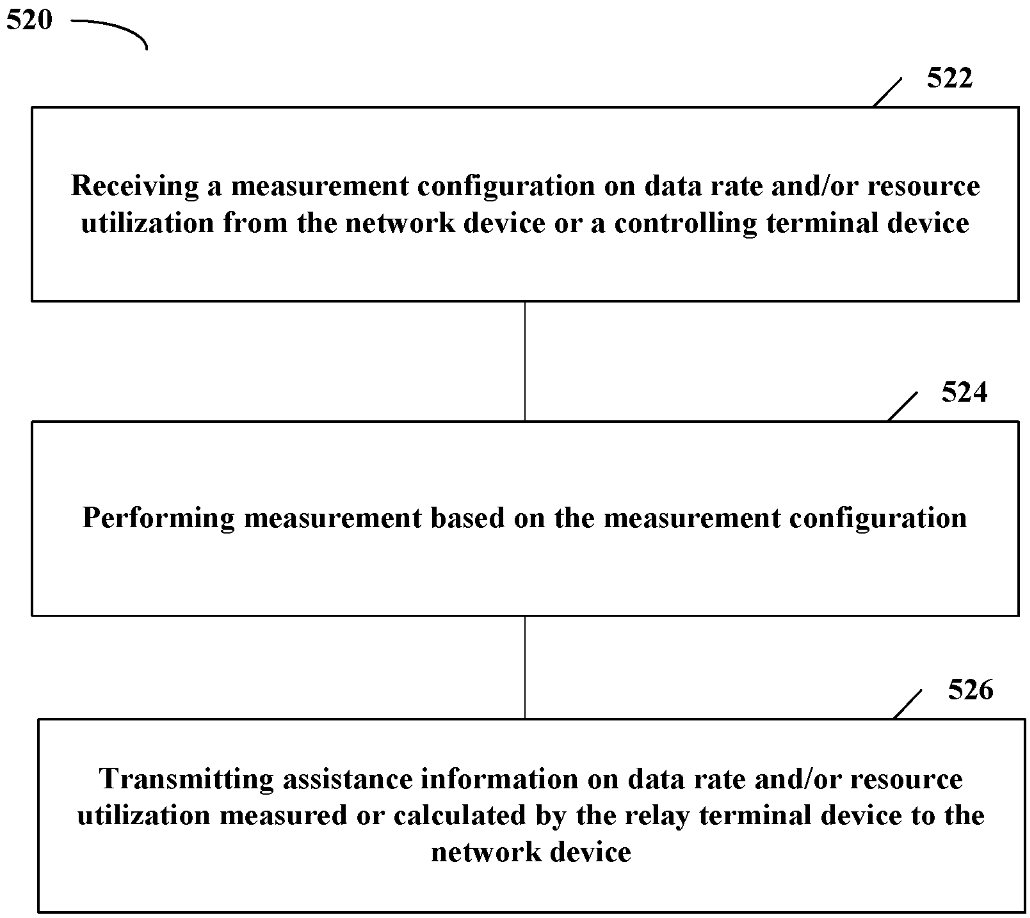
FIG. 5*c* shows a flowchart of a method according to another embodiment of the present disclosure.

FIG. 5*c* shows a flowchart of a method according to another embodiment of the present disclosure, which may be performed by an apparatus implemented in or at or as a relay terminal device or communicatively coupled to the relay terminal device. As such, the apparatus may provide means or modules for accomplishing various parts of the method 520 as well as means or modules for accomplishing other processes in conjunction with other components. For some parts which have been described in the above embodiments, the description thereof is omitted here for brevity.

At block 522, the relay terminal device may receive a measurement configuration on data rate and/or resource utilization from the network device or a controlling terminal device.

At block 524, the relay terminal device may perform measurement based on the measurement configuration.

At block 526, the relay terminal device may transmit assistance information on data rate and/or resource utilization measured or calculated by the relay terminal device to the network device.

In an embodiment, the assistance information on data rate and/or resource utilization measured or calculated by the relay terminal device comprises at least one of a measured or calculated data rate or data volume for the first terminal device, a percentage of PC5 resources that are used to carry downlink traffic among all consumed PC5 resources for the first terminal device, or a percentage of resources allocated by a resource allocation mode among all consumed resources used to carry downlink traffic for the first terminal device on a PC5 link.

In an embodiment, the resource allocation mode comprises at least one of network-scheduled sidelink transmission, or terminal device autonomously selected sidelink transmission.

In an embodiment, the measured or calculated data rate or data volume for the first terminal device comprises at least one of measured or calculated data rate or data volume for a flow for the first terminal device, measured or calculated data rate or data volume for a radio bearer for the first terminal device, measured or calculated data rate or data volume for a PC5 link for the first terminal device, measured or calculated data rate or data volume for relayed Uu traffic for the first terminal device, measured or calculated data rate or data volume for PC5 traffic for the first terminal device, measured or calculated data rate or data volume for relayed non-GBR Uu traffic for the first terminal device, or measured or calculated data rate or data volume for relayed GBR Uu traffic for the first terminal device.

In an embodiment, relayed Uu traffic and PC5 traffic are not multiplexed in a same medium access control (MAC) service data unit (SDU) or in a same MAC PDU.

For example, a similar reporting message may be defined to the relay terminal device such as RL UE. In the report message, the relay terminal device such as RL UE provides assistance information on data rate and/or resource utilization, which for instance may comprise at least one of the following:

- Measured or calculated data rate or data volume
  - The measurement may be performed per flow, RB or PC5 link, and/or separately for relayed Uu traffic and other PC5 traffic for a specific RM UE, and/or separately for relayed non-GBR Uu traffic and relayed GBR Uu traffic for a specific first terminal device such as RM UE, while the RL UE may report a calculated data rate such as aggregated non-GBR Uu data rate for a specific first terminal device such as RM UE (which should be restricted by UE-AMBR) and/or Uu data rate in a RB of a specific first terminal device such as RM UE (which should be restricted by MFBR of all flows in that RB) and/or aggregated PC5 data rate for a specific first terminal device such as RM UE (which should be restricted by PC5 link AMBR), which is calculated based on the measured data rate.
- Percentage of PC5 resources that is used to carry DL traffic among all consumed PC5 resources for a specific first terminal device such as RM UE.
  - In order to estimate percentage of PC5 resources in MAC layer, the relayed Uu traffic and other PC5 traffic should not be multiplexed in the same MAC SDU or not in the same MAC PDU.
- Percentage of resources for Mode 1 resource allocation (or Mode 2 resource allocation) among all consumed resources used to carry DL traffic for a specific first terminal device such as RM UE on the PC5 link.

Figure 5D:
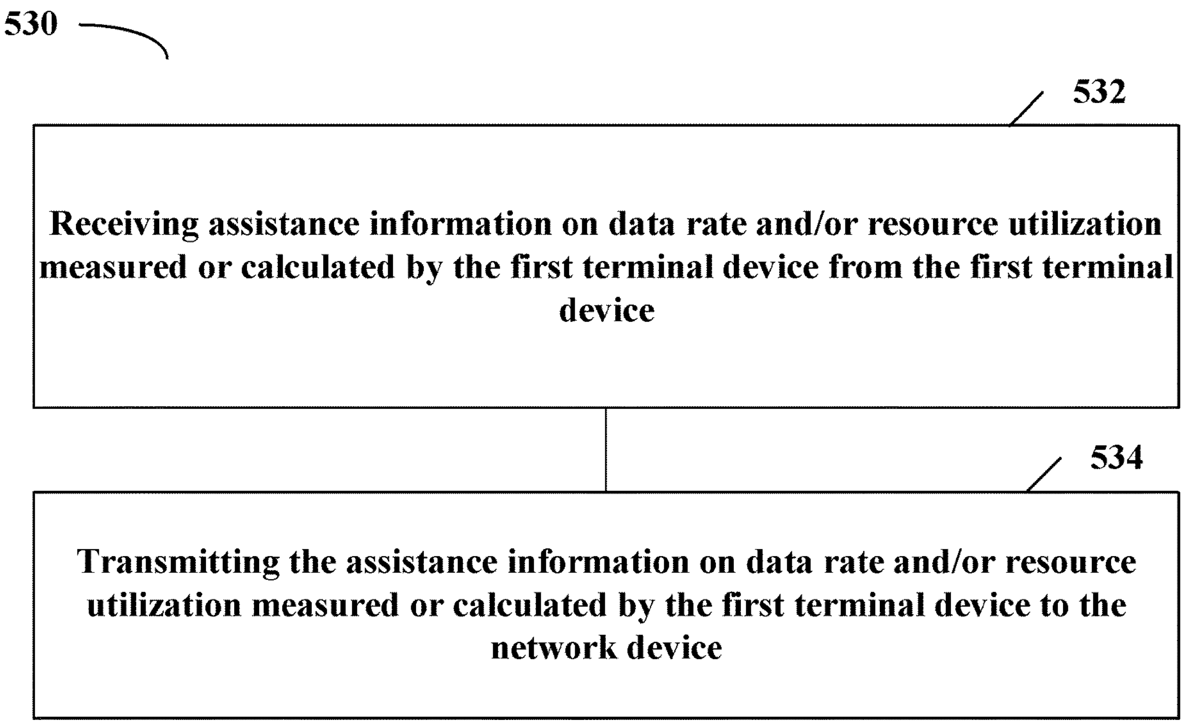
FIG. 5*d* shows a flowchart of a method according to another embodiment of the present disclosure.

FIG. 5*d* shows a flowchart of a method according to another embodiment of the present disclosure, which may be performed by an apparatus implemented in or at or as a relay terminal device or communicatively coupled to the relay terminal device. As such, the apparatus may provide means or modules for accomplishing various parts of the method 530 as well as means or modules for accomplishing other processes in conjunction with other components. For some parts which have been described in the above embodiments, the description thereof is omitted here for brevity.

At block 532, the relay terminal device may receive assistance information on data rate and/or resource utilization measured or calculated by the first terminal device from the first terminal device.

At block 534, the relay terminal device may transmit the assistance information on data rate and/or resource utilization measured or calculated by the first terminal device to the network device.

Figure 5E:
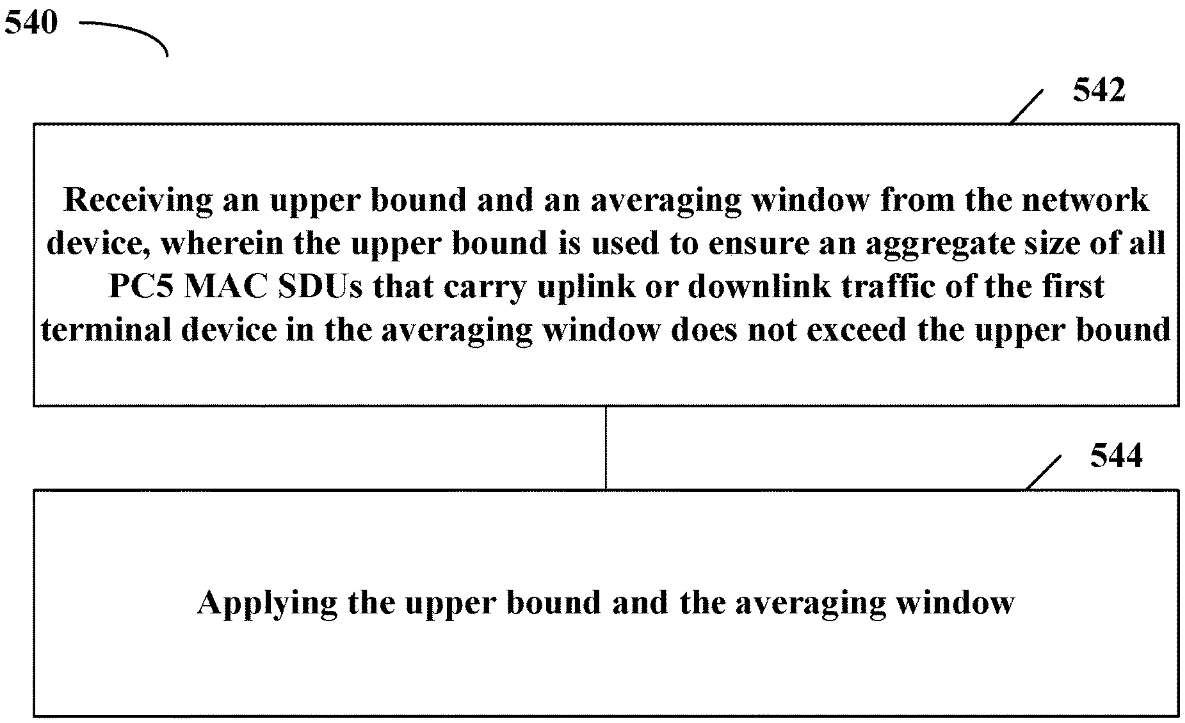
FIG. 5*e* shows a flowchart of a method according to another embodiment of the present disclosure.

FIG. 5*e* shows a flowchart of a method according to another embodiment of the present disclosure, which may be performed by an apparatus implemented in or at or as a relay terminal device or communicatively coupled to the relay terminal device. As such, the apparatus may provide means or modules for accomplishing various parts of the method 540 as well as means or modules for accomplishing other processes in conjunction with other components. For some parts which have been described in the above embodiments, the description thereof is omitted here for brevity.

At block 542, the relay terminal device may receive an upper bound and an averaging window from the network device. The upper bound is used to ensure an aggregate size of all PC5 MAC SDUs that carry uplink or downlink traffic of the first terminal device in the averaging window does not exceed the upper bound.

At block 544, the relay terminal device may apply the upper bound and the averaging window. For example, for each RM UE and its connected RL UE, the serving network device such as gNB may configure an upper bound on the allowed aggregate size of all PC5 MAC SDU(s) that carry (non-GBR) UL/DL traffic of the RM UE in an averaging window. The upper bound is decreased/increased for the RM UE if the (averaged) UL/DL UE-AMBR of the RM UE measured by (R)AN or reported by the RM/RL UE becomes higher/lower than the UL/DL UE-AMBR limitation. The upper bound and the averaging window may be informed to the RM UE and the RL UE by using RRC signaling and the RM UE and/or the RL UE make sure that the aggregate size of all PC5 MAC SDU(s) that carry the RM UE's (Non-GBR) UL/DL traffic that is averaged over the averaging window does not exceed the upper bound.

Figure 5F:
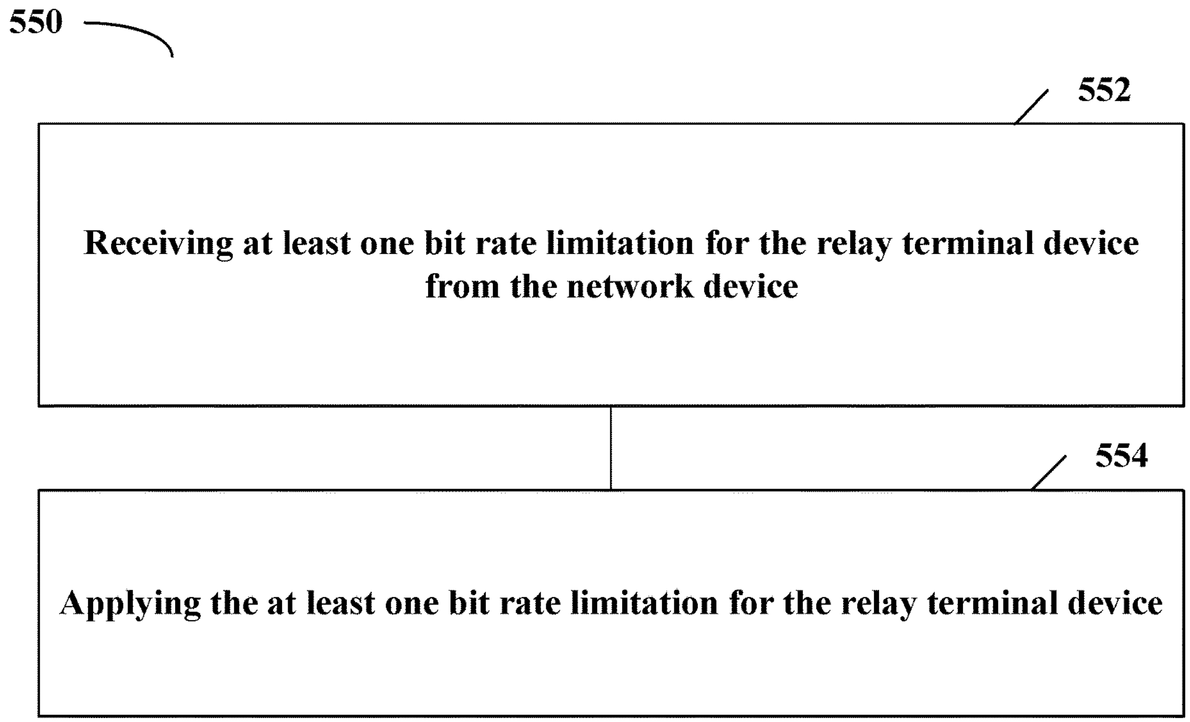
FIG. 5*f* shows a flowchart of a method according to another embodiment of the present disclosure.

FIG. 5*f* shows a flowchart of a method according to another embodiment of the present disclosure, which may be performed by an apparatus implemented in or at or as a relay terminal device or communicatively coupled to the relay terminal device. As such, the apparatus may provide means or modules for accomplishing various parts of the method 550 as well as means or modules for accomplishing other processes in conjunction with other components. For some parts which have been described in the above embodiments, the description thereof is omitted here for brevity.

At block 552, the relay terminal device may receive at least one bit rate limitation for the relay terminal device from a network device. The at least one bit rate limitation for the relay terminal device may be similar to the at least one bit rate limitation for the first terminal device as described above.

At block 554, the relay terminal device may apply the at least one bit rate limitation for the relay terminal device. Similar to the first terminal device, the relay terminal device may apply the at least one bit rate limitation for the relay terminal device.

Figure 6A:
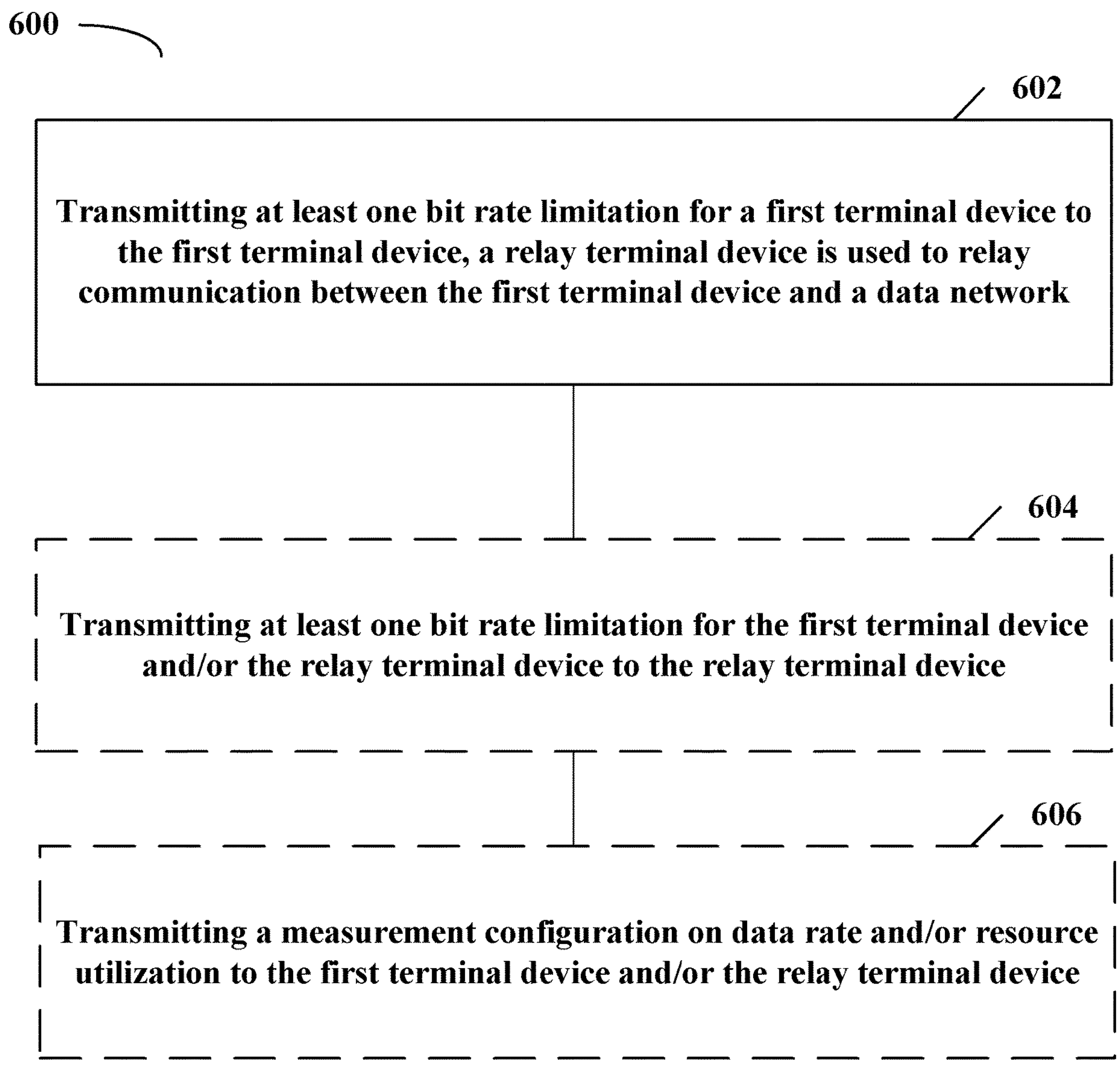
FIG. 6*a* shows a flowchart of a method according to another embodiment of the present disclosure.

FIG. 6*a* shows a flowchart of a method according to another embodiment of the present disclosure, which may be performed by an apparatus implemented in or at or as a network device or communicatively coupled to the network device. As such, the apparatus may provide means or modules for accomplishing various parts of the method 600 as well as means or modules for accomplishing other processes in conjunction with other components. For some parts which have been described in the above embodiments, the description thereof is omitted here for brevity.

At block 602, the network device may transmit at least one bit rate limitation for a first terminal device to the first terminal device. A relay terminal device is used to relay communication between the first terminal device and a data network.

At block 604, optionally, the network device may transmit at least one bit rate limitation for the first terminal device to the relay terminal device.

At block 606, optionally, the network device may transmit a measurement configuration on data rate and/or resource utilization to the first terminal device and/or the relay terminal device.

Figure 6B:
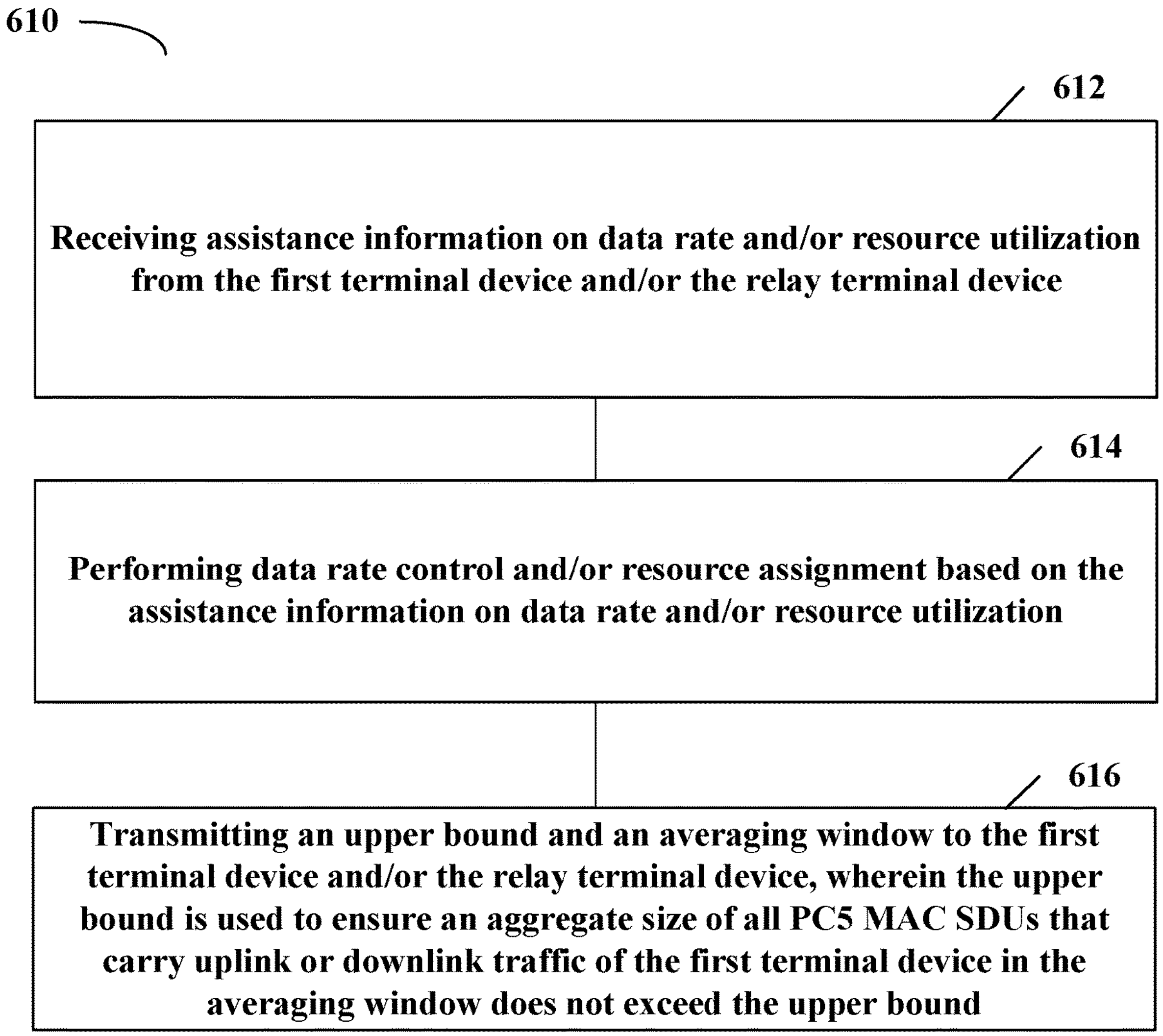
FIG. 6*b* shows a flowchart of a method according to another embodiment of the present disclosure.

FIG. 6*b* shows a flowchart of a method according to another embodiment of the present disclosure, which may be performed by an apparatus implemented in or at or as a network device or communicatively coupled to the network device. As such, the apparatus may provide means or modules for accomplishing various parts of the method 610 as well as means or modules for accomplishing other processes in conjunction with other components. For some parts which have been described in the above embodiments, the description thereof is omitted here for brevity.

At block 612, the network device may receive assistance information on data rate and/or resource utilization from the first terminal device and/or the relay terminal device.

At block 614, the network device may perform data rate control and/or resource assignment based on the assistance information on data rate and/or resource utilization.

In an embodiment, the network device may increase sidelink (SL) resource assignment to the first terminal device and/or prioritized bit rate (PBR) of the first terminal device's SL logical channel carrying non-GBR traffic when the assistance information indicates that aggregate date rate limitation for both relayed Uu uplink traffic and PC5 traffic of the first terminal device is not exceeded.

In an embodiment, the network device may decrease SL resource assignment to the first terminal device and/or PBR of the first terminal device's SL logical channel carrying non-GBR traffic when the assistance information indicates that aggregate date rate limitation for both relayed Uu uplink traffic and PC5 traffic of the first terminal device is exceeded.

In an embodiment, the network device may increase SL resource assignments to the relay terminal device and/or PBR of the relay terminal device's SL logical channel carrying non-GBR traffic if the assistance information indicates that the aggregate date rate limitation for both relayed Uu traffic to each first terminal device connected to the relay terminal device and PC5 traffic of the relay terminal device is not exceeded.

In an embodiment, the network device may decrease SL resource assignments to the relay terminal device and/or PBR of the relay terminal device's SL logical channel carrying non-GBR traffic if the assistance information indicates that the aggregate date rate limitation for both relayed Uu downlink traffic to each first terminal device connected to the relay terminal device and PC5 traffic of the relay terminal device is exceeded.

In an embodiment, the network device may increase PBR of the first terminal device's SL logical channel carrying relayed non-GBR uplink traffic when the assistance information indicates that aggregate AMBR limitation for all non-GBR QoS flows of the UE and uplink MFBR limitation of all flows carrying the relayed non-GBR uplink traffic and mapped to the SL logical channel are not exceeded.

In an embodiment, the network device may decrease PBR of the first terminal device's SL logical channel carrying relayed non-GBR uplink traffic when the assistance information indicates that aggregate AMBR limitation for all non-GBR QoS flows of the UE or uplink MFBR limitation of any flow carrying the relayed non-GBR uplink traffic and mapped to the SL logical channel is exceeded.

In an embodiment, the network device may increase PBR of the first terminal device's SL logical channel carrying relayed GBR uplink traffic if the assistance information indicates that MFBR limitation of all flows carrying the relayed GBR uplink traffic and mapped to the SL logical channel is not exceeded.

In an embodiment, the network device may decrease PBR of the first terminal device's SL logical channel carrying relayed GBR uplink traffic if the assistance information indicates that MFBR limitation of any flows carrying the relayed GBR uplink traffic and mapped to the SL logical channel is exceeded.

In an embodiment, the network device may increase PBR of the first terminal device or the relay terminal device's SL logical channel carrying PC5 traffic when the assistance information indicates that date rate limitation on PC5 traffic is not exceeded.

In an embodiment, the network device may decrease PBR of the first terminal device or the relay terminal device's SL logical channel carrying PC5 traffic when the assistance information indicates that date rate limitation on PC5 traffic is exceeded.

In an embodiment, the resource assignment comprises at least one of a resource assignment for a dynamic grant for network-scheduled sidelink transmission, a resource assignment for a configured grant for network-scheduled sidelink transmission, or a resource assignment for a maximum allowed grant size for terminal device autonomously selected sidelink transmission.

For example, after reception of the assistance information from a terminal device (e.g., RM UE or RL UE), the network device such as gNB may take at least one of the following actions:

Option 1: the network device may increase the SL resource assignments to the RM UE and/or Prioritized Bit Rate (PBR) of RM UE's SL LCH carrying non-GBR traffic if the assistance information indicates that the aggregate date rate limitation for both relayed Uu traffic and other PC5 traffic (e.g. limitation on UL UE-AMBR and UE-PC5-AMBR of RM UE) is not exceeded, otherwise decrease the resource assignments and/or the PBR.

Option 2: the network device may increase the SL resource assignments to the RL UE and/or PBR of RL UE's SL LCH carrying non-GBR traffic if the assistance information indicates that the aggregate date rate limitation for both relayed Uu traffic to each of the connected RM UE and other PC5 traffic (e.g. limitation on DL UE-AMBR of each connected RM UE and UE-PC5-AMBR of RL UE) is not exceeded, otherwise decrease the resource assignments and/or the PBR.

Option 3: the network device may increase Prioritized Bit Rate (PBR) of RM UE's SL LCH carrying relayed non-GBR UL traffic if the assistance information indicates that the UE-AMBR limitation and the UL MFBR limitation is not exceeded, otherwise decrease the PBR.

Option 4: the network device may increase Prioritized Bit Rate (PBR) of RM UE's SL LCH carrying relayed GBR UL traffic if the assistance information indicates that the MFBR limitation is not exceeded, otherwise decrease the PBR.

Option 5: the network device may increase Prioritized Bit Rate (PBR) of the RM/RL UE's SL LCH carrying PC5 traffic if the assistance information indicates that the date rate limitation on PC5 traffic (e.g. UE-PC5-AMBR) is not exceeded, otherwise decrease the PBR.

Adjustment (i.e., increase or decrease) to the resource assignments may comprise at least one of the following:

Adjust a dynamic grant for mode 1

Adjust a configured grant for mode 1

Adjust the maximum allowed grant size for mode 2

In an embodiment, UE-PC5-AMBR of the RL/RM UE is shared by both the relayed (non-GBR) Uu traffic of the RM UE and the other (non-GBR) PC5 traffic, in which case the summed data rate of both the relayed (non-GBR) Uu traffic of the RM UE and the other (non-GBR) PC5 traffic should be compared to the UE-PC5-AMBR.

In an embodiment, UE-PC5-AMBR of the RL/RM UE is not shared by both the relayed (non-GBR) Uu traffic of the RM UE and the other (non-GBR) PC5 traffic, in which case the aggregated data rate of relayed (non-GBR) Uu traffic of the RM UE and that of the other PC5 traffic are compared to UE-AMBR and UE-PC5-AMBR respectively.

At block 616, the network device may transmit an upper bound and an averaging window to the first terminal device and/or the relay terminal device. The upper bound is used to ensure an aggregate size of all PC5 MAC SDUs that carry uplink or downlink traffic of the first terminal device in the averaging window does not exceed the upper bound.

According to various embodiments, there is provided a mechanism to enforce rate limitation such as UE-AMBR and UE-PC5-AMBR for remote UE. The remote UE transmits and/or receives Uu traffic via L2 UE-to-NW relay and other PC5 traffic over PC5.

According to various embodiments, the network device may inform UE-AMBR to a remote UE. The remote UE may perform UE-AMBR enforcement for its Uu Non-GBR traffic based on the UE-AMBR.

According to various embodiments, a queue management (QM) function is implemented at the remote UE and optionally implemented at the relay UE to manage transmission of the remote UE's traffic and enforce the rate limitation for the remote UE's traffic.

According to various embodiments, when the QM function is implemented at both the remote UE and the relay UE, a new control PDUs may be defined to exchange queue status information between the QM functions implemented at both the remote UE and the relay UE.

According to various embodiments, the remote UE and/or the relay UE provide assistance information on data rate and/or resource utilization to the network device such as gNB. The network device such as gNB may adjust the SL resource assignments and/or the Prioritized Bit Rate (PBR) of SL LCH for the remote UE and/or the relay UE based on the assistance information on data rate and/or resource utilization.

According to various embodiments, the network device such as gNB configures to a remote UE and/or the connected relay UE an upper bound on the allowed aggregate size of all PC5 MAC SDU(s) that carry (non-GBR) UL and/or DL traffic of the remote UE in an averaging window. The remote UE and/or the connected relay UE ensure that the aggregate size of all PC5 MAC SDU(s) that carry the RM UE's (Non-GBR) UL/DL traffic that is averaged over the averaging window does not exceed the upper bound.

Embodiments herein may provide many advantages, of which a non-exhaustive list of examples follows. In some embodiments herein, the rate limitation such as UE-AMBR of remote UE and UE-PC5-AMBR of remote UE and relay UE could be enforced properly. In some embodiments herein, the system resource could be used more efficiently and properly. In some embodiments herein, the system performance could be improved. The embodiments herein are not limited to the features and advantages mentioned above. A person skilled in the art will recognize additional features and advantages upon reading the following detailed description.

Figure 7:
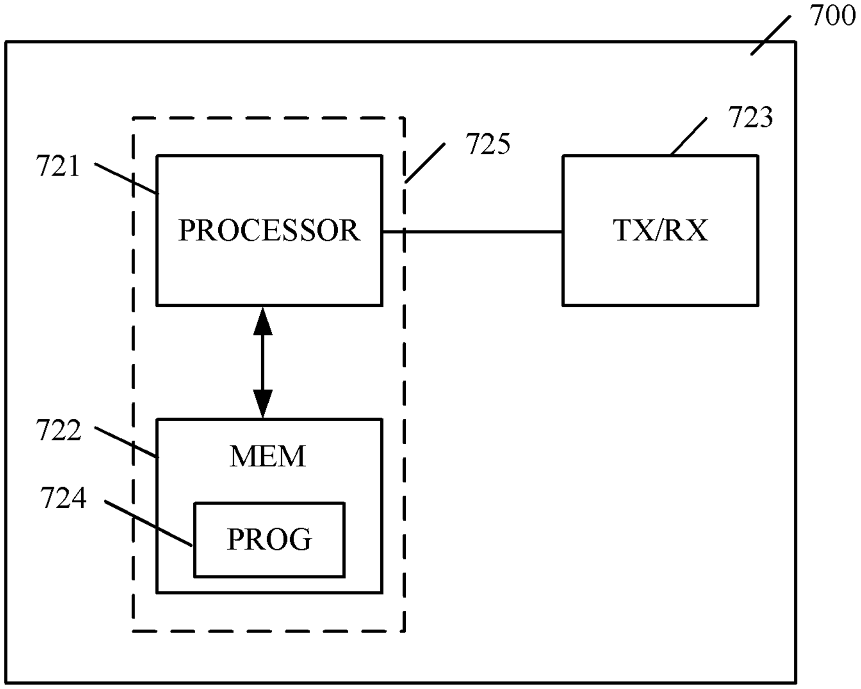
FIG. 7 is a block diagram showing an apparatus suitable for practicing some embodiments of the disclosure.

FIG. 7 is a block diagram showing an apparatus suitable for practicing some embodiments of the disclosure. For example, any one of the first terminal device, the relay terminal device and the network device described above may be implemented as or through the apparatus 700.

The apparatus 700 comprises at least one processor 721, such as a digital processor (DP), and at least one memory (MEM) 722 coupled to the processor 721. The apparatus 700 may further comprise a transmitter TX and receiver RX 723 coupled to the processor 721. The MEM 722 stores a program (PROG) 724. The PROG 724 may include instructions that, when executed on the associated processor 721, enable the apparatus 700 to operate in accordance with the embodiments of the present disclosure. A combination of the at least one processor 721 and the at least one MEM 722 may form processing means 725 adapted to implement various embodiments of the present disclosure.

Various embodiments of the present disclosure may be implemented by computer program executable by one or more of the processor 721, software, firmware, hardware or in a combination thereof.

The MEM 722 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 721 may be of any type suitable to the local technical environment, and may include one or more of general purpose computers, special purpose computers, microprocessors, digital signal processors (DSPs) and processors based on multicore processor architecture, as non-limiting examples.

In an embodiment where the apparatus is implemented as or at the first terminal device, the memory 722 contains instructions executable by the processor 721, whereby the first terminal device operates according to any of the methods related to the first terminal device as described above.

In an embodiment where the apparatus is implemented as or at the relay terminal device, the memory 722 contains instructions executable by the processor 721, whereby the relay terminal device operates according to any of the methods related to the relay terminal device as described above.

In an embodiment where the apparatus is implemented as or at the network device, the memory 722 contains instructions executable by the processor 721, whereby the network device operates according to any of the methods related to the network device as described above.

Figure 8A:
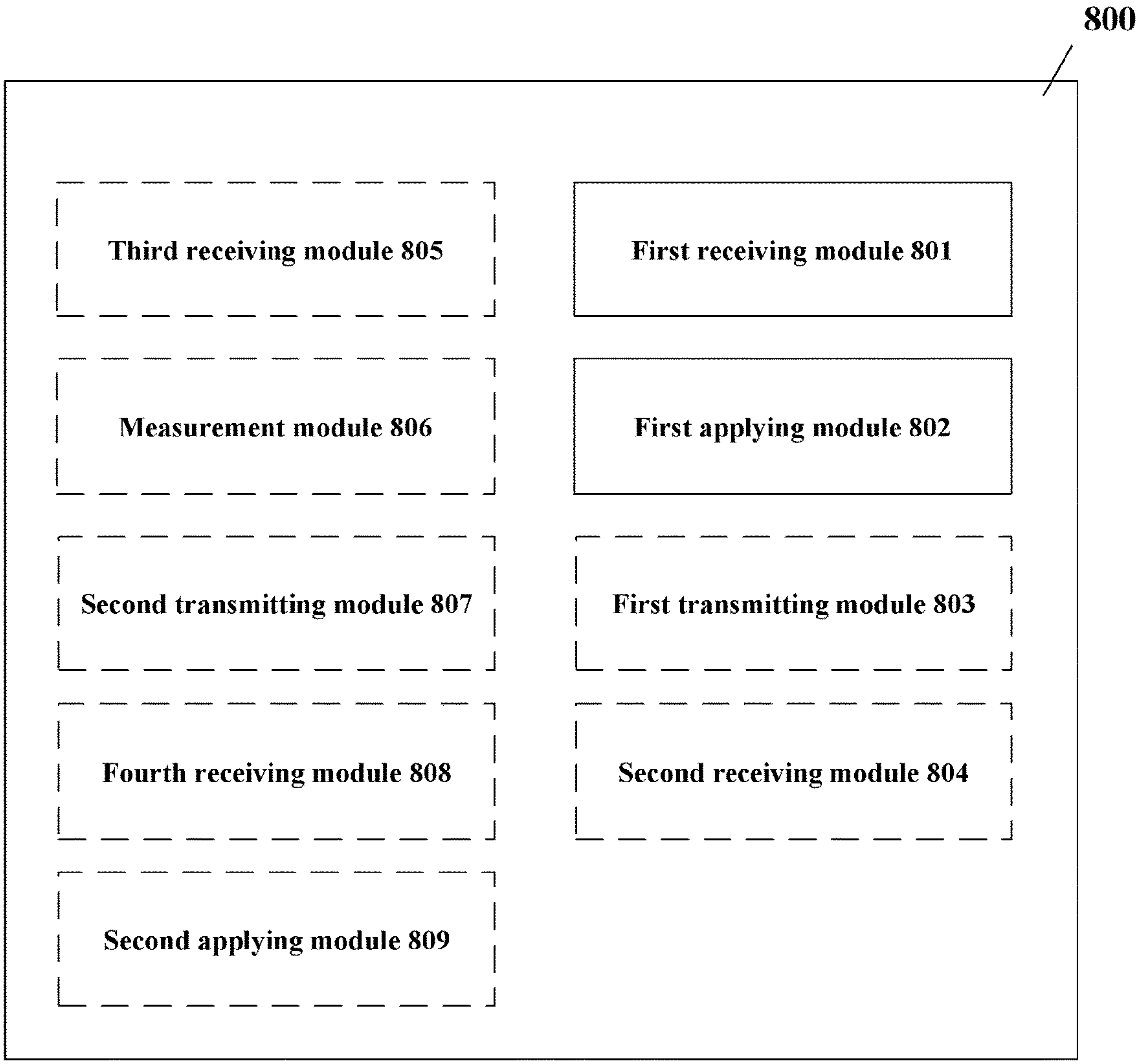
FIG. 8*a* is a block diagram showing a first terminal device according to an embodiment of the disclosure.

FIG. 8*a* is a block diagram showing a first terminal device according to an embodiment of the disclosure. As shown, the first terminal device 800 comprises a first receiving module 801 and a first applying module 802. The first receiving module 801 may be configured to receive at least one bit rate limitation from a network device. The first applying module 802 may be configured to apply the at least one bit rate limitation. A relay terminal device is used to relay communication between the first terminal device and a data network.

In an embodiment, the first terminal device 800 may further comprise a first transmitting module 803 configured to transmit queue status information to the relay terminal device.

In an embodiment, the first terminal device 800 may further comprise a second receiving module 804 configured to receive queue status information from the relay terminal device.

In an embodiment, the first terminal device 800 may further comprise a third receiving module 805 configured to receive a measurement configuration on data rate and/or resource utilization from the network device or a controlling terminal device.

In an embodiment, the first terminal device 800 may further comprise a measurement module 806 configured to perform measurement based on the measurement configuration.

In an embodiment, the first terminal device 800 may further comprise a second transmitting module 807 configured to transmit assistance information on data rate and/or resource utilization measured or calculated by the first terminal device to the network device or the relay terminal device.

In an embodiment, the first terminal device 800 may further comprise a fourth receiving module 808 configured to receive an upper bound and an averaging window from the network device. The upper bound is used to ensure an aggregate size of all PC5 MAC SDUs that carry uplink or downlink traffic of the first terminal device in the averaging window does not exceed the upper bound.

In an embodiment, the first terminal device 800 may further comprise a second applying module 809 configured to apply the upper bound and the averaging window.

Figure 8B:
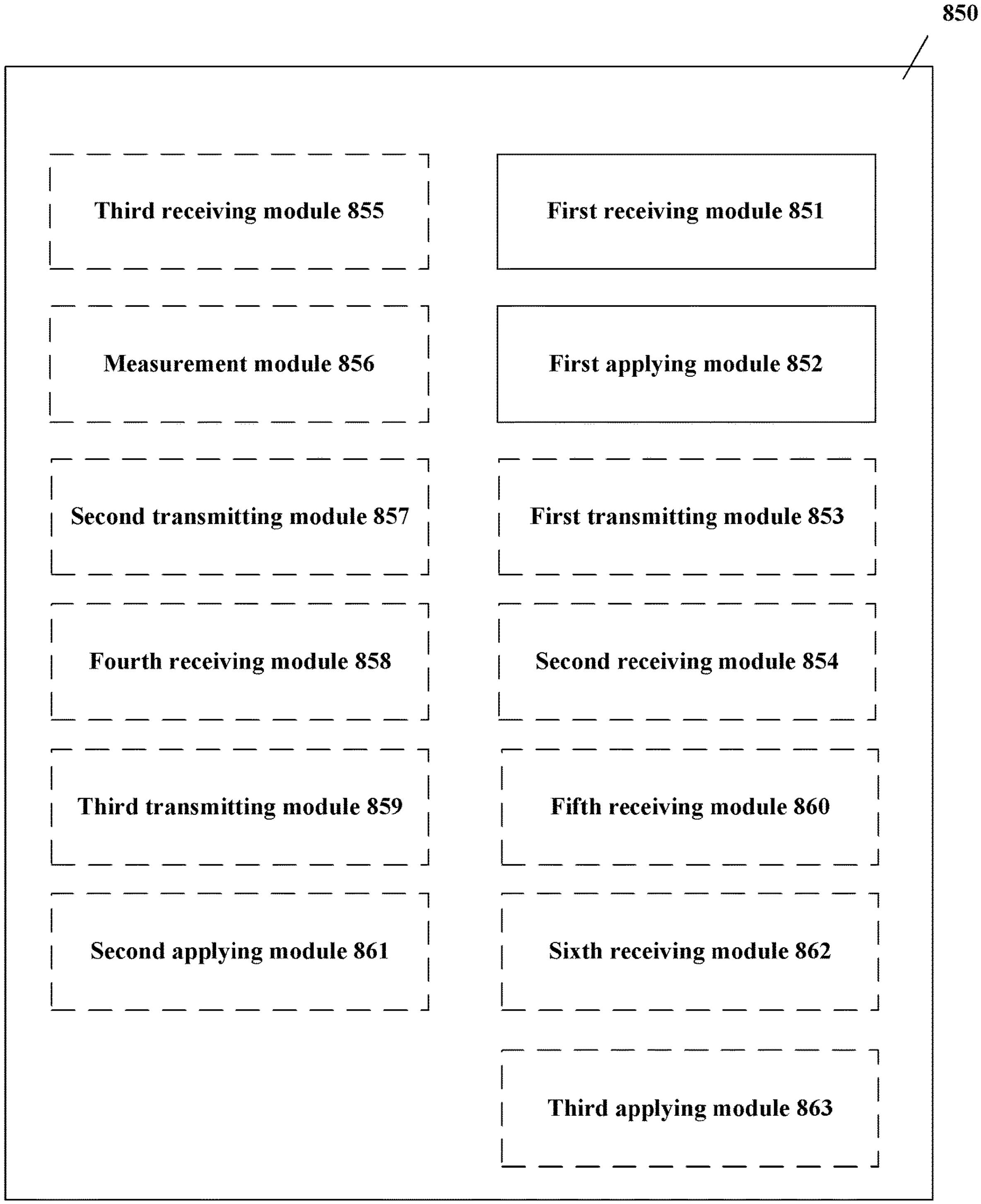
FIG. 8*b* is a block diagram showing a relay terminal device according to an embodiment of the disclosure.

FIG. 8*b* is a block diagram showing a relay terminal device 850 according to an embodiment of the disclosure. As shown, the relay terminal device 850 comprises a first receiving module 851 and a first applying module 852. The first receiving module 851 may be configured to receive at least one bit rate limitation for a first terminal device from a network device. The first applying module 852 may be configured to apply the at least one bit rate limitation for the first terminal device. A relay terminal device is used to relay communication between the first terminal device and a data network.

In an embodiment, the relay terminal device 850 may further comprise a first transmitting module 853 configured to transmit queue status information to the first terminal device.

In an embodiment, the relay terminal device 850 may further comprise a second receiving module 854 configured to receive queue status information from the first terminal device.

In an embodiment, the relay terminal device 850 may further comprise a third receiving module 855 configured to receive a measurement configuration on data rate and/or resource utilization from the network device or a controlling terminal device.

In an embodiment, the relay terminal device 850 may further comprise a measurement module 856 configured to perform measurement based on the measurement configuration.

In an embodiment, the relay terminal device 850 may further comprise a second transmitting module 857 configured to transmit assistance information on data rate and/or resource utilization measured or calculated by the relay terminal device to the network device.

In an embodiment, the relay terminal device 850 may further comprise a fourth receiving module 858 configured to receive assistance information on data rate and/or resource utilization measured or calculated by the first terminal device from the first terminal device.

In an embodiment, the relay terminal device 850 may further comprise a third transmitting module 859 configured to transmit the assistance information on data rate and/or resource utilization measured or calculated by the first terminal device to the network device.

In an embodiment, the relay terminal device 850 may further comprise a fifth receiving module 860 configured to receive an upper bound and an averaging window from the network device. The upper bound is used to ensure an aggregate size of all PC5 MAC SDUs that carry uplink or downlink traffic of the first terminal device in the averaging window does not exceed the upper bound.

In an embodiment, the relay terminal device 850 may further comprise a second applying module 861 configured to apply the upper bound and the averaging window.

In an embodiment, the relay terminal device 850 further comprises a sixth receiving module 862 and a third applying module 863. The sixth receiving module 862 may be configured to receive at least one bit rate limitation for the relay terminal device from the network device. The third applying module 863 may be configured to apply the at least one bit rate limitation for the relay terminal device.

Figure 8C:
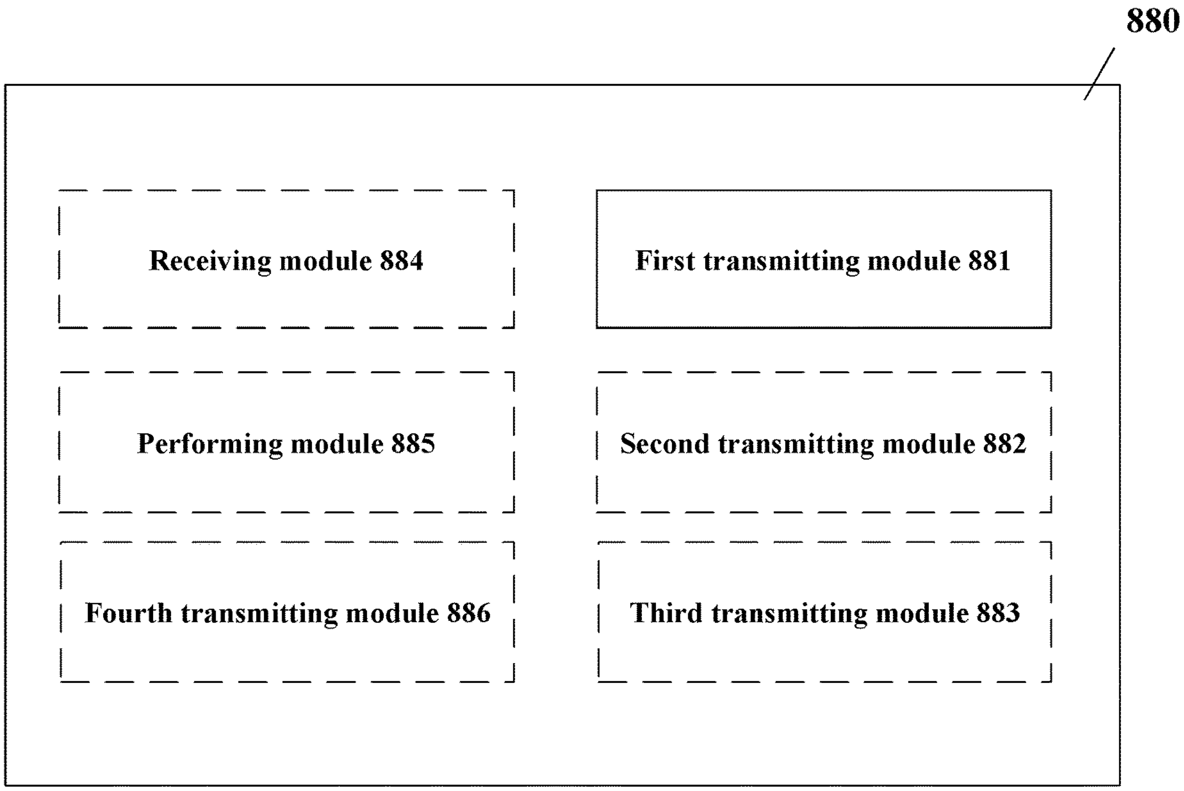
FIG. 8*c* is a block diagram showing a network device according to an embodiment of the disclosure.

FIG. 8*c* is a block diagram showing a network device according to an embodiment of the disclosure. As shown, the network device 880 comprises a first transmitting module 881. The first transmitting module 881 may be configured to transmit at least one bit rate limitation for a first terminal device to the first terminal device. A relay terminal device is used to relay communication between the first terminal device and a data network.

In an embodiment, the network device 880 may further comprise a second transmitting module 882 may be configured to transmit the at least one bit rate limitation for the first terminal device to the relay terminal device.

In an embodiment, the network device 880 may further comprise a third transmitting module 883 may be configured to transmit a measurement configuration on data rate and/or resource utilization to the first terminal device and/or the relay terminal device.

In an embodiment, the network device 880 may further comprise a receiving module 884 may be configured to receive assistance information on data rate and/or resource utilization from the first terminal device and/or the relay terminal device.

In an embodiment, the network device 880 may further comprise a performing module 885 may be configured to perform data rate control and/or resource assignment based on the assistance information on data rate and/or resource utilization.

In an embodiment, the network device 880 may further comprise a fourth transmitting module 886 may be configured to transmit an upper bound and an averaging window to the first terminal device and/or the relay terminal device. The upper bound is used to ensure an aggregate size of all PC5 MAC SDUs that carry uplink or downlink traffic of the first terminal device in the averaging window does not exceed the upper bound.

The following detailed description describes methods and devices for the AMBR control for Layer-3 UE-to-network relay. In the following detailed description, numerous specific details such as logic implementations, types and interrelationships of system components, etc. are set forth in order to provide a more thorough understanding of the present disclosure. It should be appreciated, however, by one skilled in the art that the present disclosure may be practiced without such specific details. In other instances, control structures, circuits and instruction sequences have not been shown in detail in order not to obscure the present disclosure. Those of ordinary skill in the art, with the included descriptions, will be able to implement appropriate functionality without undue experimentation.

References in the specification to "one embodiment", "an embodiment", "an example embodiment" etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the present disclosure. However, such notation should not be taken to mean that these are the only options or optional operations, and/or that blocks with solid borders are not optional in certain embodiments of the present disclosure.

In the following detailed description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other forms of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on, that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interfaces to establish network connections (to transmit and/or receive code and/or data using propagating signals) with other electronic devices. One or more parts of an embodiment of the present disclosure may be implemented using different combinations of software, firmware, and/or hardware.

The link or radio link over which the signals are transmitted between at least two UEs for Device To Device (D2D) operation is referred to herein as a side link (SL). The signals transmitted between the UEs for D2D operation are referred to herein as SL signals. The term SL may also interchangeably be referred to as D2D link, Vehicle To Everything (V2X) link, prose link, peer-to-peer link, PC5 link, etc. The SL signals may also interchangeably be referred to as V2X signals, D2D signals, prose signals, PC5 signals, peer-to-peer signals etc.

In the below embodiments, the wording "at least one of" is used in the description of signaling alternatives between two nodes (i.e., between two UEs, or between a gNB and a UE). This wording means that a node may transmit the signaling information to another node using one or more than one alternative. For the latter case, the node applies several different signaling alternatives to transmit the same information to the other node to improve the transmission reliability.

The methods and devices disclosed below involve the NR RAT but may also be applied to LTE RAT or any other RAT enabling the transmission on two nearby devices without any loss of meaning.

Furthermore, we refer to remote (RM) UE as a UE that needs to transmit/receive packets to/from the gNB via an intermediate relay UE that we refer to as RL UE.

In the first embodiment, a queue management (QM) function is defined for RM UE. Each queue is maintained for each flow. This function is operated by RM UE to enforce QoS requirements for PC5 transmissions and/or subsequent relay transmissions. The QoS requirements may contain at least one of the following:

- Session AMBR
- PC5 link AMBR
- UE-PC5-AMBR
- UE-AMBR
- Guaranteed Flow Bit Rate (GFBR)
- Maximum Flow Bit Rate (MFBR)
- Flow priority e.g., PQI or 5QI
- Packet delay budget (PDB)
- Packet error rate (PER)
- Maximum Data Burst Volume (MDBV).

In addition, other inputs such as indicators of link radio channel quality (PC5 and/or Uu of RL UE), data volume of flows/services, indicators of link congestion/load (PC5 and/or Uu of RL UE) may be considered by the QM function.

In the second embodiment, the QM function operates at RM UE side with the QoS requirements as described in the first embodiment as inputs, without requiring an acknowledge or status report message from RL UE as additional inputs.

In this case, a control entity of the QM function manages each queue to meet the QoS requirements. If there are multiple bit rate limitations, RM UE needs to take a minimum value of all limitations as an input to the QM function. Meanwhile, fairness among flows may also be considered. On the PC5 link towards the RL UE, the control entity ensures that each service flow provides data to lower layers limited by the bit rate limitations.

In the third embodiment, the QM function operates at RL UE side with the QoS requirements as described in the first embodiment as inputs. Meanwhile, fairness among flows is also considered.

The QM function is also operated at the PC5 interface towards RM UE.

On the PC5 link towards RM UE, the control entity ensures that each service flow provides data to lower layers limited by the bit rate limitations.

The QM function may be also operated at the Uu interface towards gNB.

On the Uu link towards the gNB, the control entity ensures that each service flow provides data to lower layers limited by the bit rate limitations.

In the fourth embodiment, the QM function is added to RLC layer.

In the fifth embodiment, the QM function is added to SDAP layer.

In the sixth embodiment, the QM function is managed at PC5 interface.

In the seventh embodiment, for a UE pair including an RM UE and an RL UE, in the case that the QM function is operated at both sides (i.e., the RM UE and also the RL UE), several new types of control PDUs may be defined so that both sides can exchange status report on the queues. The control PDUs may comprise at least one of the following:

- Control PDUs for flow control in terms of for example, buffer size, queuing delay, packet loss, number of transmitted packets, number of received packets, number of transmitted bits, number of received bits etc.,
- there may be separated control PDUs for flow control feedback and pooling respectively,
- Control PDUs for status report, indicating which packets/PDUs have been received successfully.

In the eighth embodiment, the queues in the RL UE could be classic weighted round robin queues or interleaved round robin queues.

In an example, an RL UE maintains queues according to RM UEs' session AMBRs and RM UE's PC5-LINK-AMBRs and session-AMBR of each PDU session of the RL UE which is used to carry the relay traffic of RM UEs. A queue control entity ensures that each queue provides data to lower layers limited by the bit rate limitations. (For example, RM UEs' session AMBRs and RM UE's PC5-LINK-AMBRs and session-AMBR of each PDU session of the RL UE which is used to carry the relay traffic of RM UEs. In this case, for each RM UE, the bit rate limitation takes a minimum value of all three limitations.)

Figure 8D:
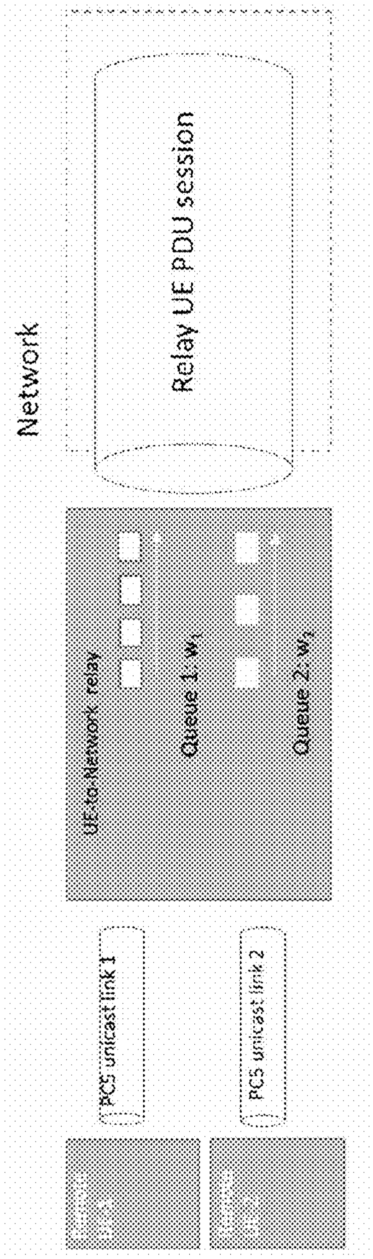
FIG. 8*d* is a diagram illustrating an example of queues at a relay UE.

FIG. 8*d* illustrates an example of the queuing mechanism.

The total UL traffic from the RL UE to the network shall not be over Relay-session-AMBR. The RL UE makes a queue for each RM UE. For each queue i, a weight W_i is determined according to the following formula (1):

$$w_i = \frac{\text{session\_AMBR}_i}{\sum \text{session\_AMBR}_i} \quad (1)$$

where $\text{session\_AMBR}_i$ demotes session AMBR of RM UE i.

Figure 2A:
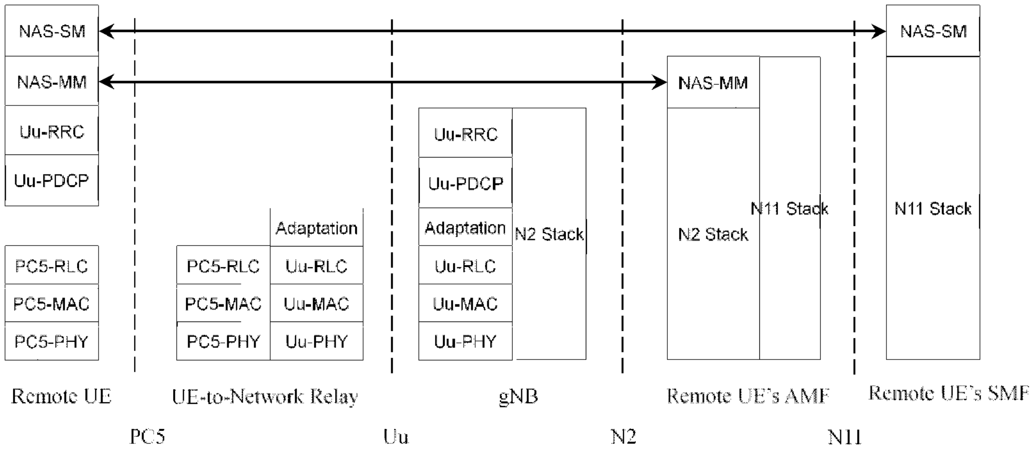
FIG. 2*a* shows a protocol stack of a control plane for L2 UE to NW relay UE according to an embodiment of the present disclosure.
Figure 2B:
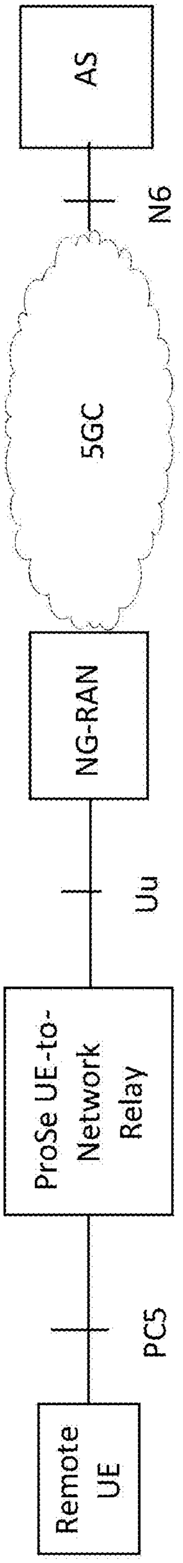
FIG. 2*b* is a diagram illustrating an architecture model using a ProSe 5G UE-to-Network Relay.
Figure 2C:
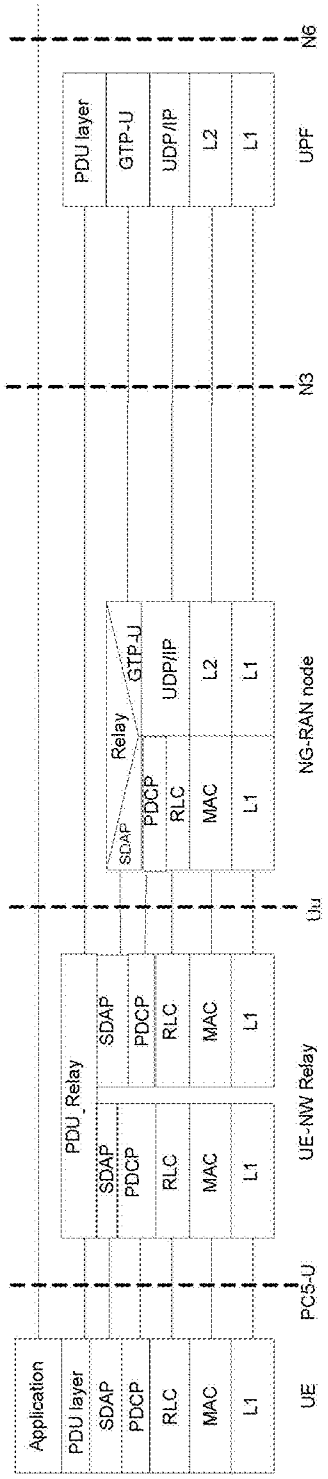
FIG. 2*c* is a diagram illustrating a protocol stack for Layer-3 UE-to-Network Relays.
Figure 2D:
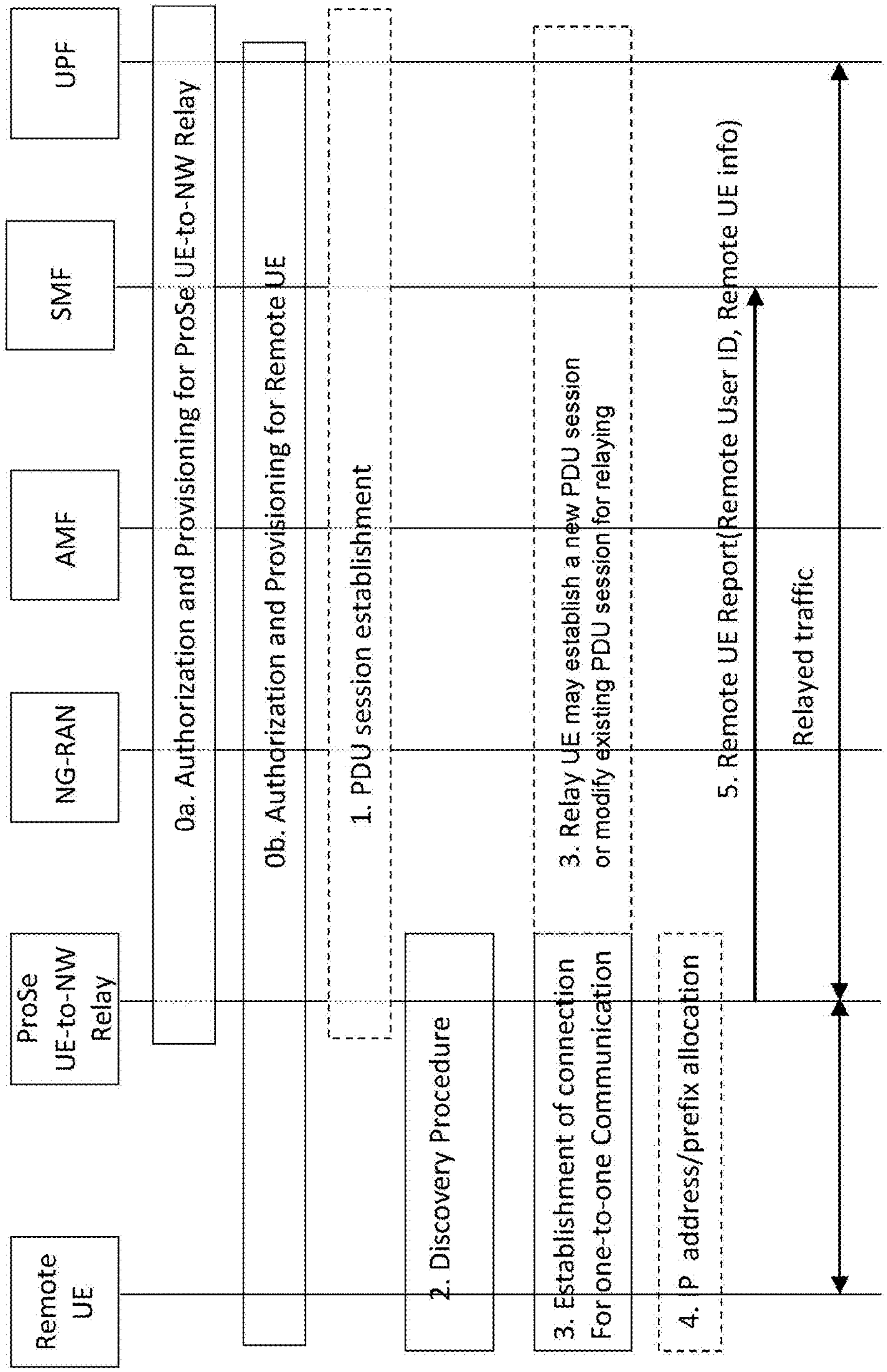
FIG. 2*d* is a sequence diagram illustrating a procedure for the ProSe 5G UE-to-Network Relay.

In the ninth embodiment, an RL UE gets the session-AMBR and the PC5-LINK-AMBR of an RM UE from the Core Network (CN) when it reports the RM UE info to the CN, e.g. step 5 in FIG. 2*d*. RL UE's AMF may get the session-AMBR and the PC5-LINK-AMBR from the RM UE's UDM and provide the info to the RL UE via an N1 message.

In the tenth embodiment, if an RM UE has its session-AMBR and PC5-LINK-AMBR, e.g. the RM UE gets the info during its registration procedure as defined in clause 6.5 of TS 23.287, then the RM UE may include information on its session-AMBR and PC5-LINK-AMBR during the PC5 link establishment procedure, e.g., in step 4 in clause 6.3.3.1 of TS 23.287. In this way, the RL UE will be aware of this information on the RM UE.

In the eleventh embodiment, an RL UE controls the bit rates of the PC5 link to an RM UE according tp the remote UE's session-AMBR and PC5-LINK AMBR and the RL UE's PC5-LINK_AMBR. E.g. the bit rates of the PC5 link with the RM UE cannot exceed min {remote UE's session-AMBR, PC5-LINK-AMBR, relay UE's PC5-LINK-AMBR}.

In the twelfth embodiment, RL UE's SMF provides the RM UE info (e.g. Remote UE IP info) and the corresponding session-AMBR to the RL UE's UPF. The RL UE's UPF performs a rate limitation for all non-GBR traffic transmitted from/to an RM UE (identified based on the RM UE info) so that the aggregated data rate averaged in the AMBR average window does not exceed the RM UE's session-AMBR. The RL UE's UPF may inform the relay UE's SMF of whether or not session-AMBR for a certain RM UE is exceeded, either periodically or when the rate status changes from "session-AMBR exceeded" to "session-AMBR not exceeded" and vice versa. The RL UE's SMF may further inform this to the RL UE, and then the RL UE may further inform this to the corresponding RM UE. The QM function in the RL UE and/or the RM UE may then adjust the rate limitation for the RM UE accordingly.

FIG. **8*e* is a flow chart illustrating a method 560** implemented on a first terminal device according to some embodiments of the present disclosure. As an example, operations of this flow chart may be performed by a first UE, but they are not limited thereto. The operations in this and other flow charts will be described with reference to the exemplary embodiments of the other figures. However, it should be appreciated that the operations of the flow charts may be performed by embodiments of the present disclosure other than those discussed with reference to the other figures, and the embodiments of the present disclosure discussed with reference to these other figures may perform operations different than those discussed with reference to the flow charts.

In one embodiment, the first UE may operate a QM function, controlling queues for each flow (block 561). The QM function may then receive QoS requirements for PC5 transmissions and/or subsequent relay transmissions for controlling the queues for each flow (block 562).

As an example, the QoS requirements may include at least one of:

session AMBR;
PC5 link AMBR;
UE-PC5-AMBR;
UE-AMBR;
GFBR;
MFBR;
flow priority;
PDB;
PER; and
MDBV.

As an example, the method 560 may further comprise:

receiving, by the QM function, indicators of link radio channel quality, data volume of flows or services, and/or indicators of link congestion or load.

As an example, the first UE may be a remote UE.

As a further example, the method 560 may further comprise:

determining, by the QM function, in the case that there are a plurality of bit rate limitations, a minimum value of the bit rate limitations.

As a further example, a control entity of the QM function may cause each service flow to provide data to lower layers limited by the bit rate limitations on a PC5 link towards a relay UE.

As a further example, the method may further comprise:

incorporating information on a session AMBR and a PC5 link AMBR of the first UE into a PC5 link establishment procedure so that a relay UE will be aware of the information.

As a further example, the method may further comprise:

transmitting or receiving all non-GBR traffic for which a rate limitation is performed so that an aggregated data rate does not exceed a session AMBR of the first UE.

As a further example, the method may further comprise:

receiving information about whether the session AMBR of the first UE is exceeded from a relay UE.

As a further example, the QM function of the first UE and/or a QM function of the relay UE may adjust a rate limitation for the first UE based on the information.

As an example, the first UE may be a relay UE.

As a further example, the QM function may be operated at a PC5 interface towards a remote UE.

As a further example, a control entity of the QM function may cause each service flow to provide data to lower layers limited by bit rate limitations on a PC5 link towards the remote UE.

As a further example, the QM function may be operated at a Uu interface towards a gNB.

As a further example, a control entity of the QM function may cause each service flow to provide data to lower layers limited by bit rate limitations on a Uu link towards the gNB.

As a further example, queues in the first UE may be classic weighted round robin queues or interleaved round robin queues.

As a further example, the queues may be maintained based on bit rate limitations including session AMBRs and PC5 link AMBRs of remote UEs associated with the first UE and a session AMBR of each of PDU sessions between the first UE and the remote UEs.

As a further example, a queue control entity of the QM function may cause each queue to provide data to lower layers limited by the bit rate limitations.

As a further example, for each of the remote UEs, a minimum value of the bit rate limitations may be a minimum value of the session AMBR of the remote UE, the PC5 link AMBR of the remote UE and the session AMBR of the PDU session between the first UE and the remote UE.

As a further example, for a queue made for one of remote UEs associated with the first UE, a weight may be determined by dividing the session AMBR of this remote UE by a sum of the session AMBRs of all of the remote UEs associated with the first UE.

As a further example, the method 560 may further comprise:

obtaining a session AMBR and a PC5 link AMBR of a remote UE associated with the first UE from a core network when reporting remote UE information to the core network.

As a further example, the session AMBR and the PC5 link AMBR of the remote UE may be transmitted from a UDM associated with the remote UE to an AMf associated with the first UE, and provided to the first UE via an N1 message.

As a further example, the method 560 may further comprise:

controlling bit rates of a PC5 link to a remote UE based on a session AMBR and a PC5 link AMBR of the remote UE and a PC5 link AMBR of the first UE.

As a further example, the method 560 may further comprise:

receiving information about whether a session AMBR of a remote UE is exceeded from a control node associated with the first UE; and transmitting the information to the remote UE.

As a further example, the QM function of the first UE and/or a QM function of the remote UE may adjust a rate limitation for the remote UE based on the information.

As a further example, the control node may be an SMF.

As an example, the QM function may be added to an RLC layer.

As an example, the QM function may be added to an SDAP layer.

As an example, the QM function may be managed at a PC5 interface.

As an example, in the case that the QM function is operated at both the first UE and its paired UE, a plurality of types of control PDUs may be defined so that both the first UE and its paired UE can exchange status reports on queues.

As a further example, the control PDUs may comprise at least one of:

control PDUs for flow control; and control PDUs for status reports.

As a further example, the control PDUs for flow control may further comprise separated control PDUs for flow control feedback and for pooling.

As a further example, the control PDUs for status reports may indicate which PDUs have been received successfully.

Furthermore, the present disclosure provides a first terminal device which is adapted to perform the method 560.

Figure 8E:
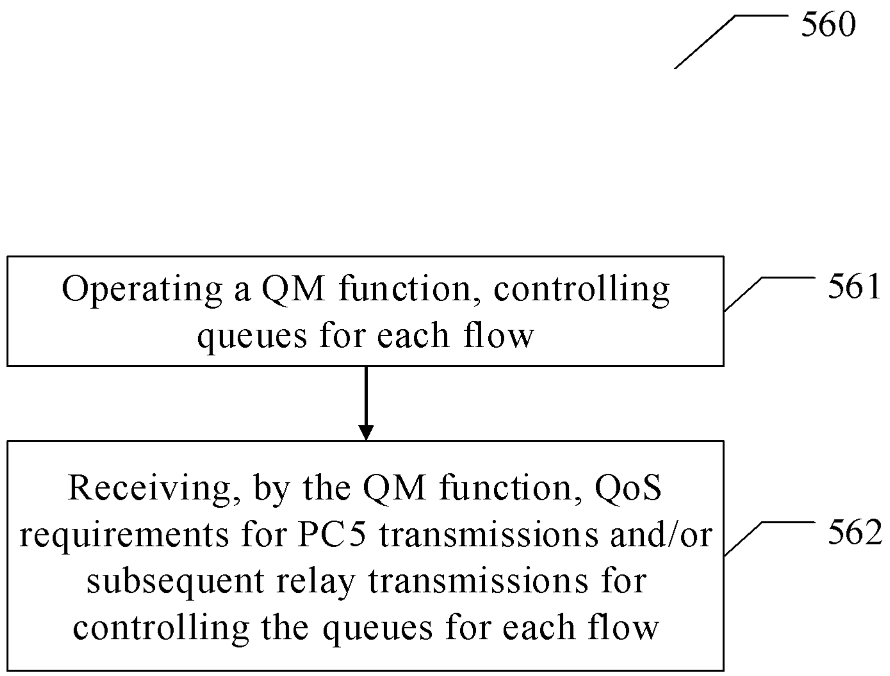
FIG. 8*e* a flow chart illustrating a method implemented on a first terminal device according to some embodiments of the present disclosure.
Figure 8F:
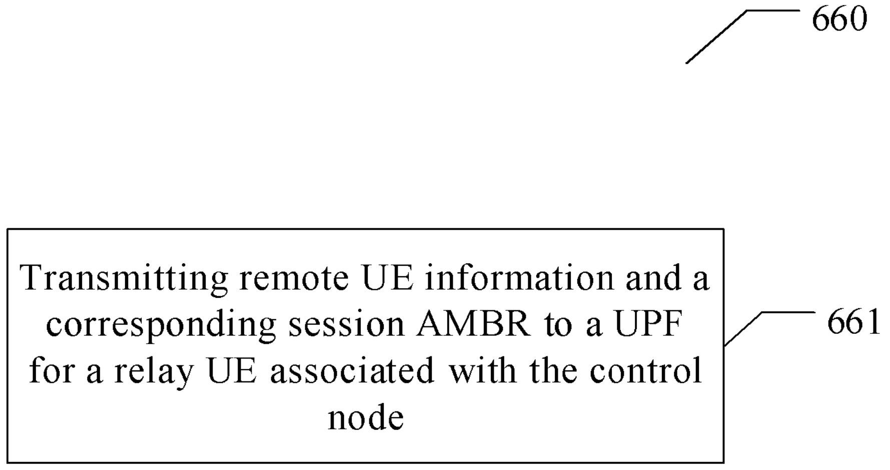
FIG. 8*f* is a flow chart illustrating a method implemented on a control node according to some embodiments of the present disclosure.

FIG. 8*f* is a flow chart illustrating a method 660 implemented on control node according to some embodiments of the present disclosure. As an example, operations of this flow chart may be performed by a control node which may support procedures for the remote UE report.

In one embodiment, the control node may transmit remote UE information and a corresponding session AMBR to a UPF for a relay UE associated with the control node (block 661).

As an example, the method 660 may further comprise:

receiving information about whether the session AMBR of a remote UE identified based on the remote UE information is exceeded from the UPF; and transmitting the information to the relay UE.

As a further example, the information may be received periodically or when a rate status changes between a status of session AMBR being exceeded and a status of session AMBR not being exceeded.

As an example, the control node may be an SMF.

Furthermore, the present disclosure provides a control node which is adapted to perform the method 660.

Figure 8G:
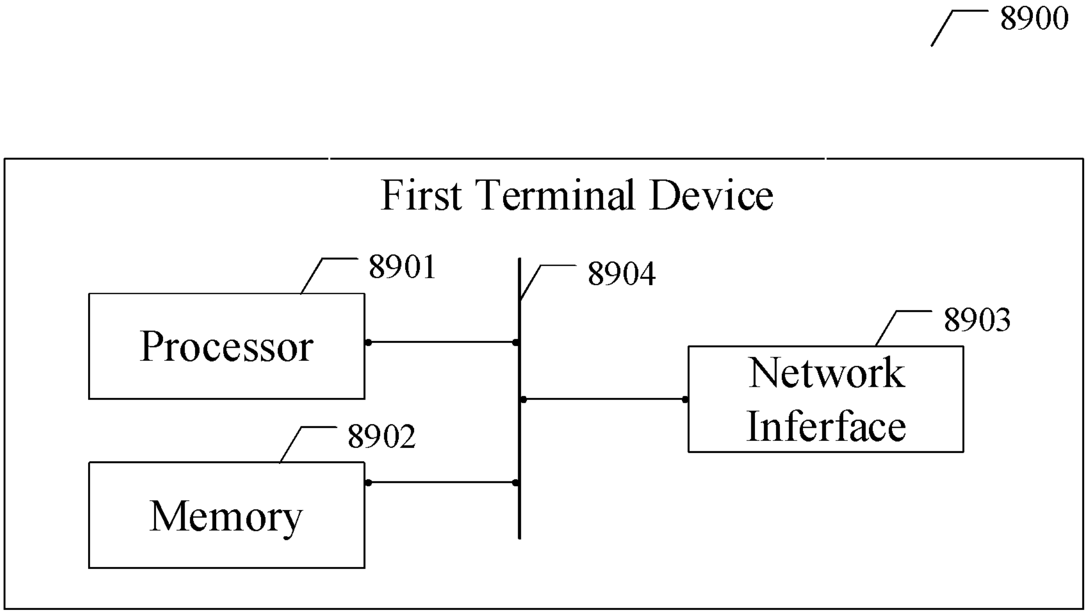
FIG. 8*g* is a block diagram illustrating a first terminal device according to some embodiments of the present disclosure.

FIG. 8*g* is a block diagram illustrating a first terminal device 8900 according to some embodiments of the present disclosure. As an example, the first terminal device 8900 may act as a first UE, but it is not limited thereto. It should be appreciated that the first terminal device 8900 may be implemented using components other than those illustrated in FIG. 8*g*.

With reference to FIG. 8*g*, the first terminal device 8900 may comprise at least a processor 8901, a memory 8902, a network interface 8903 and a communication medium 8904. The processor 8901, the memory 8902 and the network interface 8903 may be communicatively coupled to each other via the communication medium 8904.

The processor 8901 may include one or more processing units. A processing unit may be a physical device or article of manufacture comprising one or more integrated circuits that read data and instructions from computer readable media, such as the memory 8902, and selectively execute the instructions. In various embodiments, the processor 8901 may be implemented in various ways. As an example, the processor 8901 may be implemented as one or more processing cores. As another example, the processor 8901 may comprise one or more separate microprocessors. In yet another example, the processor 8901 may comprise an application-specific integrated circuit (ASIC) that provides specific functionality. In still another example, the processor 8901 may provide specific functionality by using an ASIC and/or by executing computer-executable instructions.

The memory 8902 may include one or more computer-usable or computer-readable storage medium capable of storing data and/or computer-executable instructions. It should be appreciated that the storage medium is preferably a non-transitory storage medium.

The network interface 8903 may be a device or article of manufacture that enables the first terminal device 8900 to send data to or receive data from other devices. In different embodiments, the network interface 8903 may be implemented in different ways. As an example, the network interface 8903 may be implemented as an Ethernet interface, a token-ring network interface, a fiber optic network interface, a network interface (e.g., Wi-Fi, WiMax, etc.), or another type of network interface.

The communication medium 8904 may facilitate communication among the processor 8901, the memory 8902 and the network interface 8903. The communication medium 8904 may be implemented in various ways. For example, the communication medium 8904 may comprise a Peripheral Component Interconnect (PCI) bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing System Interface (SCSI) interface, or another type of communications medium.

In the example of FIG. 8*g*, the instructions stored in the memory 8902 may include those that, when executed by the processor 8901, cause the first terminal device 8900 to implement the method described with respect to FIG. 8*e*.

Figure 8H:
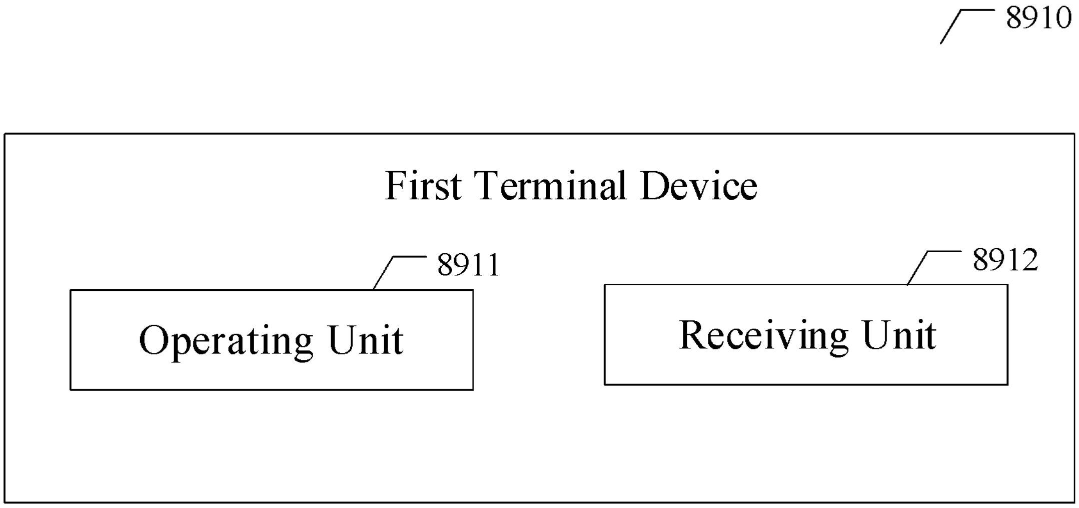
FIG. 8*h* is another block diagram illustrating a first terminal device according to some embodiments of the present disclosure.

FIG. 8*h* is another block diagram illustrating a first terminal device 8910 according to some embodiments of the present disclosure. As an example, the first terminal device 8910 may act as a first UE, but it is not limited thereto. It should be appreciated that the first terminal device 8910 may be implemented using components other than those illustrated in FIG. 8*h*.

With reference to FIG. 8*h*, the first terminal device 8910 may comprise at least an operation unit 8911 and a receiving unit 8912. The operation unit 8911 may be adapted to perform at least the operation described in the block 561 of FIG. 8*e*. The receiving unit 8912 may be adapted to perform at least the operation described in the block 562 of FIG. 8*e*.

Figure 8I:
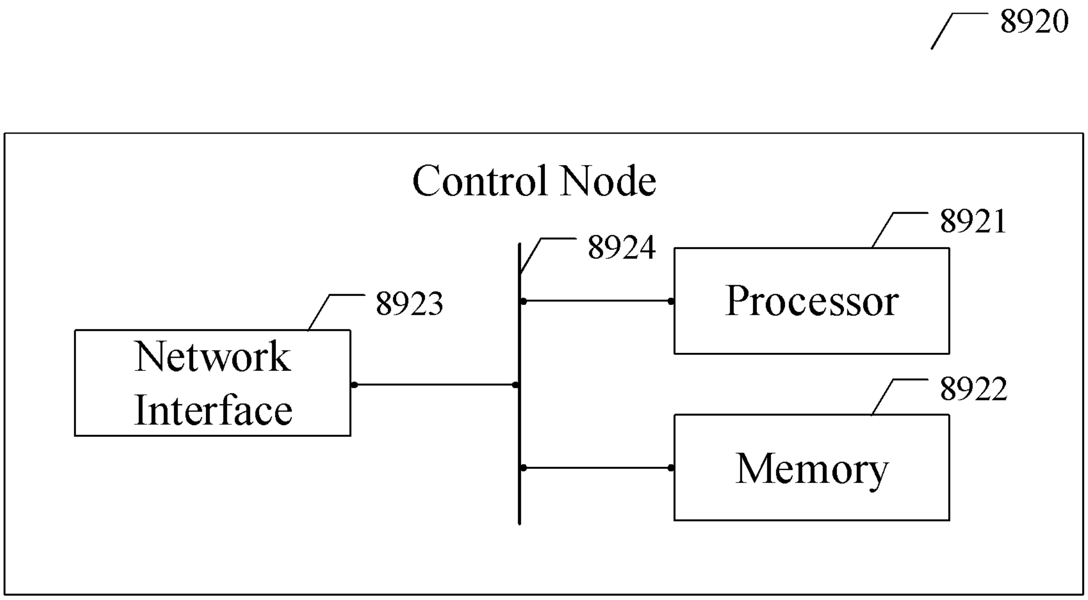
FIG. 8*i* is a block diagram illustrating a control node according to some embodiments of the present disclosure.

FIG. 8*i* is a block diagram illustrating a control node 8920 according to some embodiments of the present disclosure. As an example, the control node 8920 may be an SMF which supports the remote UE report, but it is not limited thereto. It should be appreciated that the control node 8920 may be implemented using components other than those illustrated in FIG. 8*i*.

With reference to FIG. 8*i*, the control node 8920 may comprise at least a processor 8921, a memory 8922, a network interface 8923 and a communication medium 8924. The processor 8921, the memory 8922 and the network interface 8923 are communicatively coupled to each other via the communication medium 8924.

The processor 8921, the memory 8922, the network interface 8923 and the communication medium 8924 are structurally similar to the processor 8921, the memory 8922, the network interface 8923 and the communication medium 8924 respectively, and will not be described herein in detail.

In the example of FIG. 8*i*, the instructions stored in the memory 8922 may include those that, when executed by the processor 8921, cause the control node 8920 to implement the method described with respect to FIG. 8*f*.

Figure 8J:
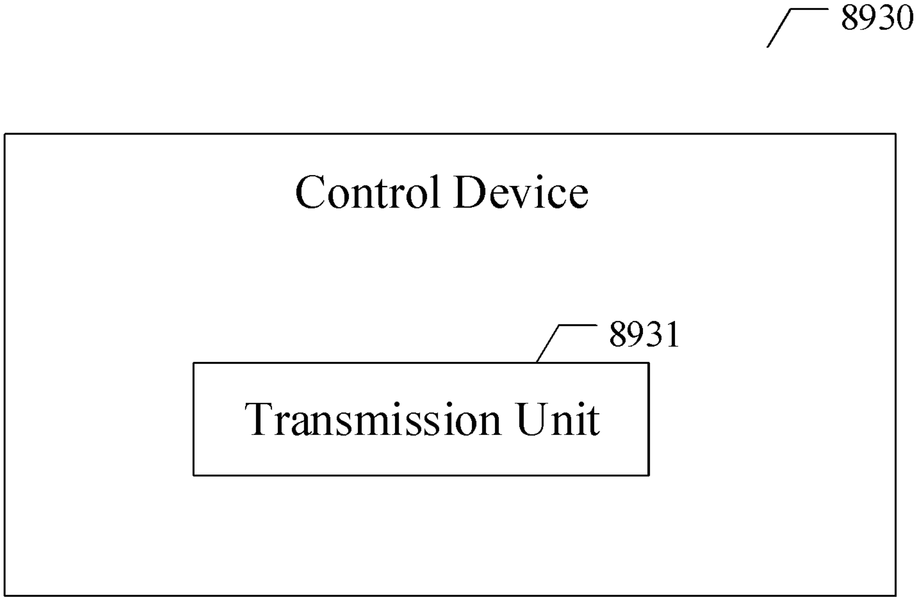
FIG. 8*j* is another block diagram illustrating a control node according to some embodiments of the present disclosure.

FIG. 8*j* is another block diagram illustrating a control node 8930 according to some embodiments of the present disclosure. As an example, the control node 8930 may be an SMF which support the remote UE report, but it is not limited thereto. It should be appreciated that the control node 8930 may be implemented using components other than those illustrated in FIG. 8*j*.

With reference to FIG. 8*j*, the control node 8930 may comprise at least a transmission unit 8931. The transmission unit 8931 may be adapted to perform at least the operation described in the block 661 of FIG. 8*f*.

The units shown in FIGS. 8*h* and 8*j* may constitute machine-executable instructions embodied within a machine, e.g., readable medium, which when executed by a machine will cause the machine to perform the operations described. Besides, any of these units may be implemented as hardware, such as an application specific integrated circuit (ASIC), Digital Signal Processor (DSP), Field Programmable Gate Array (FPGA) or the like.

Moreover, it should be appreciated that the arrangements described herein are set forth only as examples. Other arrangements (e.g., more controllers or more detectors, etc.) may be used in addition to or instead of those shown, and some units may be omitted altogether. Functionality and cooperation of these units are correspondingly described in more detail with reference to FIGS. 8*e* and 8*f*.

Figure 8K:
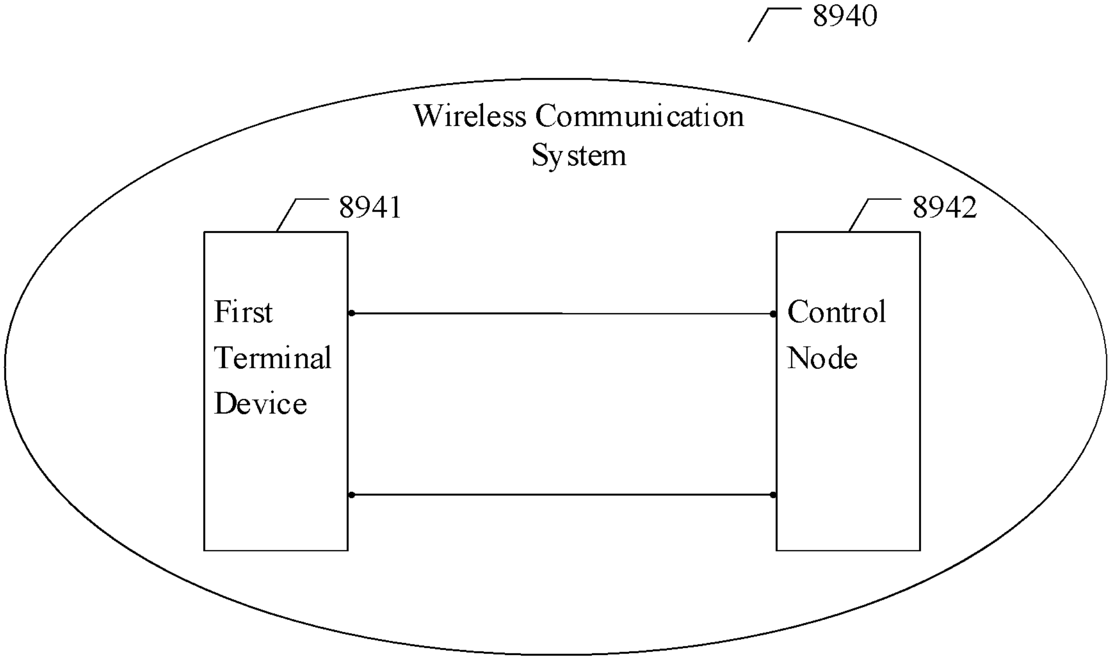
FIG. 8*k* is a block diagram illustrating a wireless communication system 8940 according to some embodiments of the present disclosure.

FIG. 8*k* is a block diagram illustrating a wireless communication system 8940 according to some embodiments of the present disclosure. The wireless communication system 8940 comprises at least a first terminal device 8941 and a control node 8942. In one embodiment, the first terminal device 8941 may act as the first terminal device 8900 or 8910 as depicted in FIG. 8*g* or 8*h*, and the control node 8942 may act as the control node 8920 or 8930 as depicted in FIG. 8*i* or 8*j*. In one embodiment, the first terminal device 8941 and the control node 8942 may communicate with each other.

The term unit or module may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, the first terminal device, the control node, the relay terminal device and the network device may not need a fixed processor or memory, any computing resource and storage resource may be arranged from the first terminal device, the control node, the relay terminal device and the network device in the communication system. The introduction of virtualization technology and network computing technology may improve the usage efficiency of the network resources and the flexibility of the network.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

Further, the exemplary overall commutation system including the terminal device and the network node will be introduced as below.

Embodiments of the present disclosure provide a communication system including a host computer including: processing circuitry configured to provide user data; and a communication interface configured to forward the user data to a cellular network for transmission to a terminal device. The cellular network includes a base station such as the network device above mentioned, and/or the terminal device such as the first terminal device and the relay terminal device above mentioned.

In embodiments of the present disclosure, the system further includes the terminal device, wherein the terminal device is configured to communicate with the base station.

In embodiments of the present disclosure, the processing circuitry of the host computer is configured to execute a host application, thereby providing the user data; and the terminal device includes processing circuitry configured to execute a client application associated with the host application.

Embodiments of the present disclosure also provide a communication system including a host computer including: a communication interface configured to receive user data originating from a transmission from a terminal device; a base station. The transmission is from the terminal device to the base station. The base station is above mentioned, and/or the terminal device is above mentioned.

In embodiments of the present disclosure, the processing circuitry of the host computer is configured to execute a host application. The terminal device is configured to execute a client application associated with the host application, thereby providing the user data to be received by the host computer.

Figure 9:
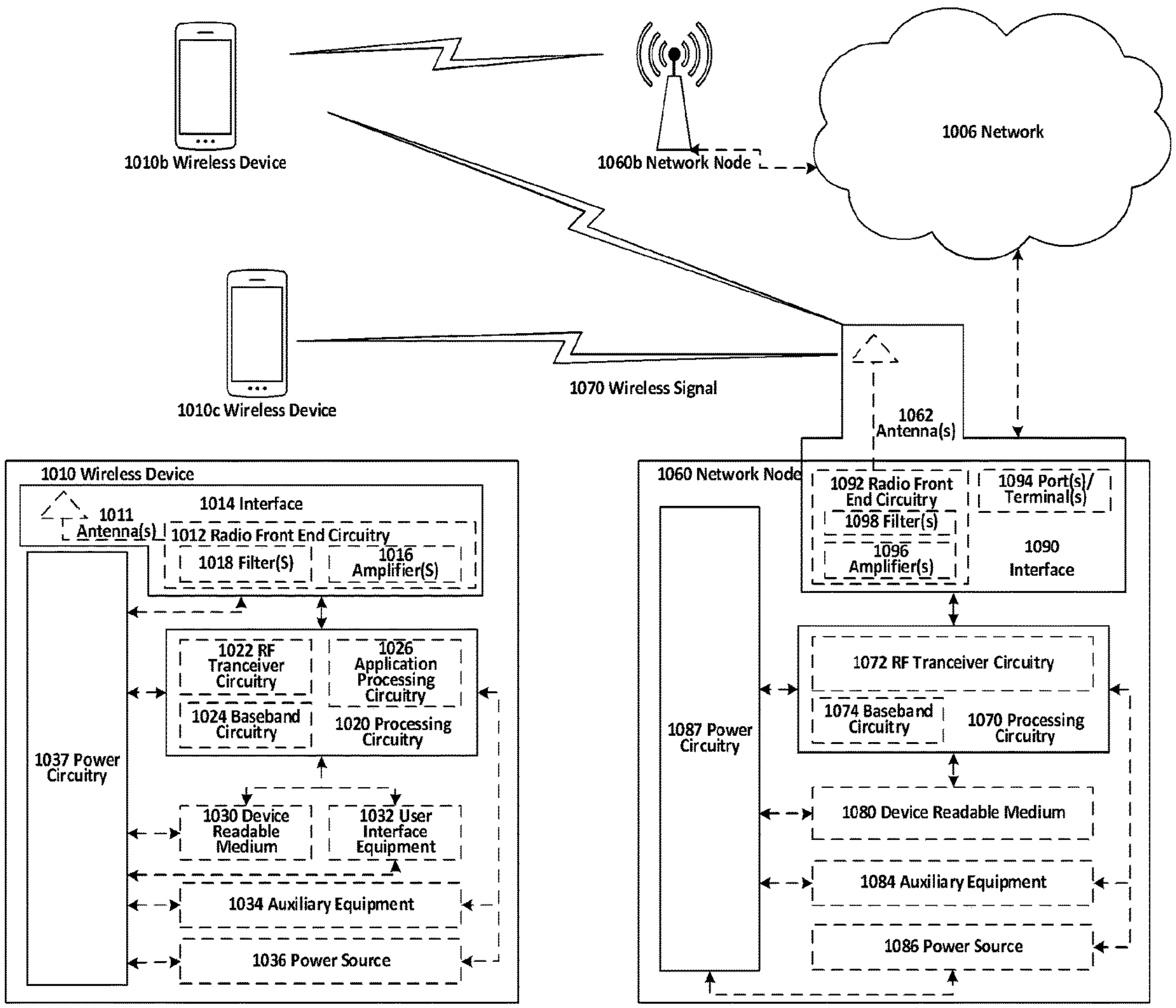
FIG. 9 is a schematic showing a wireless network in accordance with some embodiments.

FIG. 9 is a schematic showing a wireless network in accordance with some embodiments.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 1006, network nodes 1060 (corresponding to network side node) and 1060*b*, and WDs (corresponding to terminal device) 1010, 1010*b*, and 1010*c*. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 9 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 10:
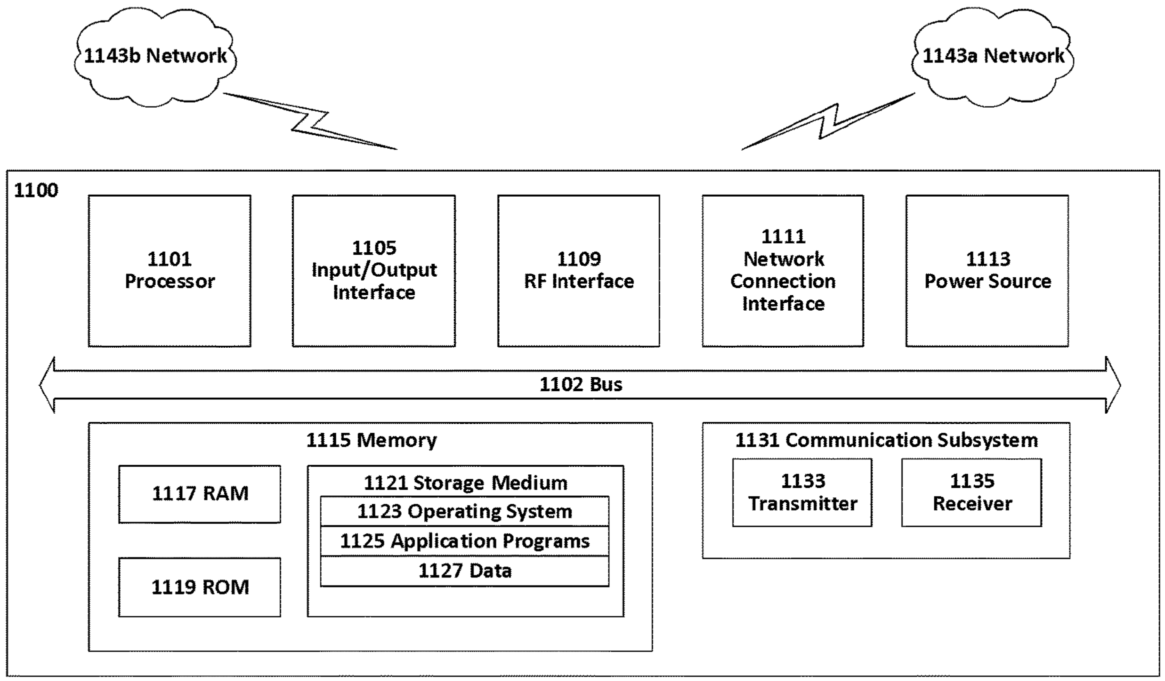
FIG. 10 is a schematic showing a user equipment in accordance with some embodiments.

FIG. 10 is a schematic showing a user equipment in accordance with some embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the 3rd Generation Partnership Project (3GPP), including a NB-IoT UE, a machine type communication (MTC) UE, and/or an enhanced MTC (eMTC) UE. UE 1100, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1109 may be configured to provide a communication interface to RF components such as a transmitter, a receiver, and an antenna. Network connection interface 1111 may be configured to provide a communication interface to network **1143*a*. Network 1143*a* may encompass wired and/or wireless networks such as a local-area network (LAN), a wide-area network (WAN), a computer network, a wireless network, a telecommunications network, another like network or any combination thereof. For example, network 1143*a* may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111** may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 10, processing circuitry 1101 may be configured to communicate with network **1143*b* using communication subsystem 1131. Network 1143*a* and network 1143*b* may be the same network or networks or different network or networks. Communication subsystem 1131 may be configured to include one or more transceivers used to communicate with network 1143*b*. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135** of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network **1143*b* may encompass wired and/or wireless networks such as a local-area network (LAN), a wide-area network (WAN), a computer network, a wireless network, a telecommunications network, another like network or any combination thereof. For example, network 1143*b* may be a cellular network, a Wi-Fi network, and/or a near-field network. Power source 1113 may be configured to provide alternating current (AC) or direct current (DC) power to components of UE 1100**.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 11:
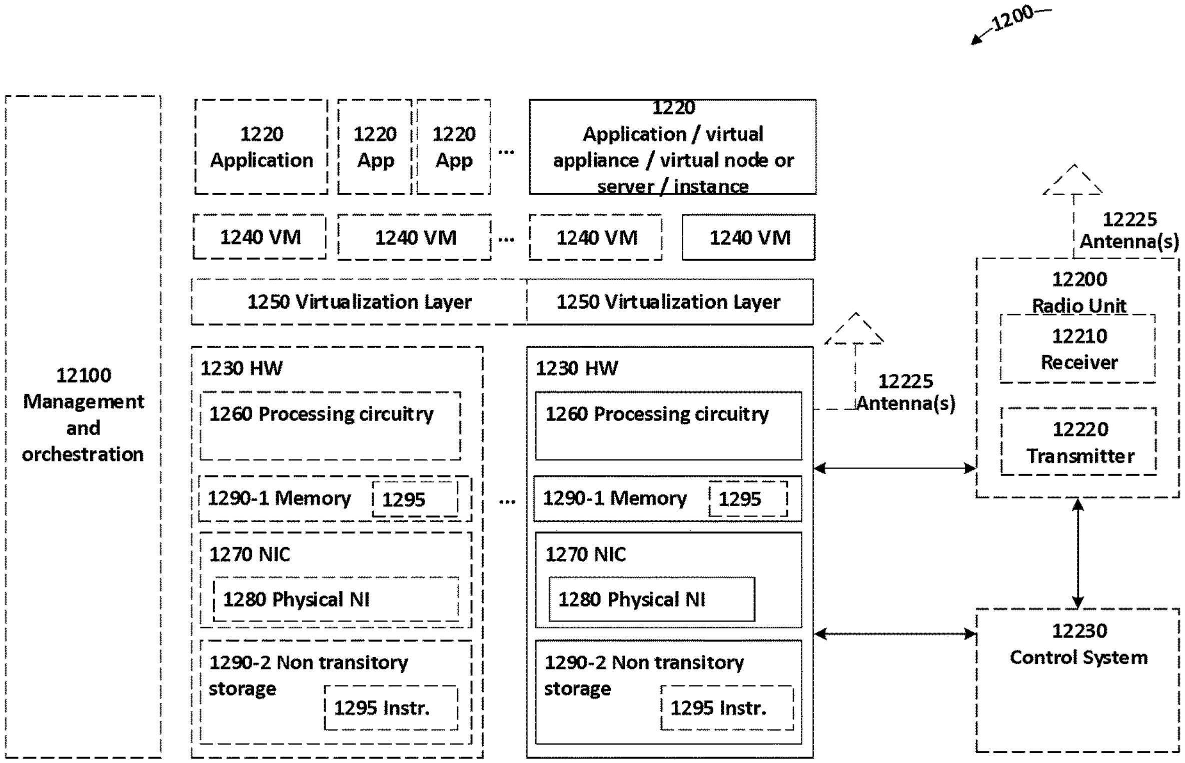
FIG. 11 is a schematic showing a virtualization environment in accordance with some embodiments.

FIG. 11 is a schematic showing a virtualization environment in accordance with some embodiments.

FIG. 11 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290-1. Memory 1290-1 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 11, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 11.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 12:
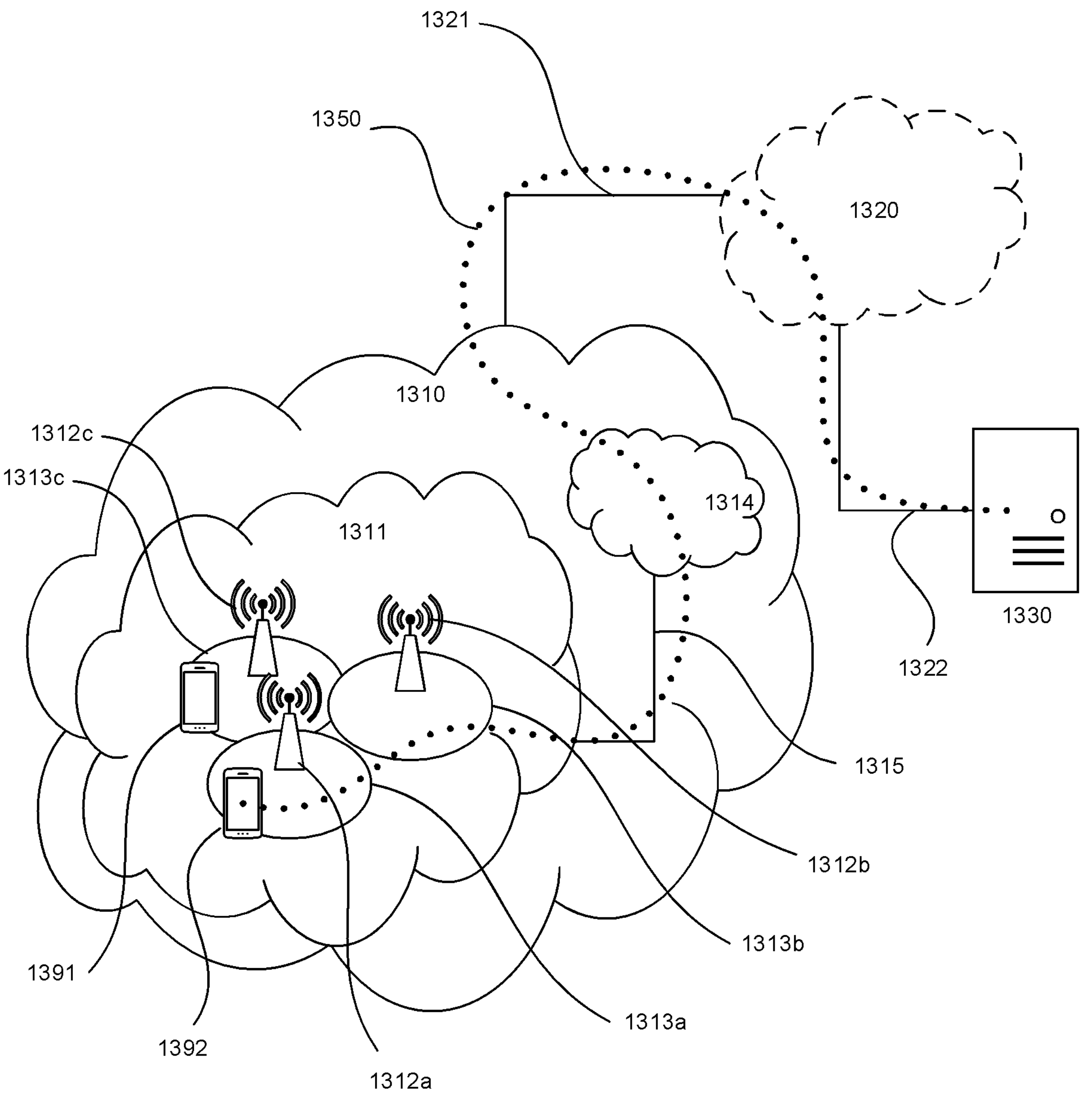
FIG. 12 is a schematic showing a telecommunication network connected via an intermediate network to a host computer in accordance with some embodiments.

FIG. 12 is a schematic showing a telecommunication network connected via an intermediate network to a host computer in accordance with some embodiments.

With reference to FIG. 12, in accordance with an embodiment, a communication system includes telecommunication network 1310, such as a 3GPP-type cellular network, which comprises access network 1311, such as a radio access network, and core network 1314. Access network 1311 comprises a plurality of base stations 1312*a*, 1312*b*, 1312*c*, such as NBs, eNBs, gNBs or other types of wireless access points, each defining a corresponding coverage area 1313*a*, 1313*b*, 1313*c*. Each base station 1312*a*, 1312*b*, 1312*c* is connectable to core network 1314 over a wired or wireless connection 1315. A first UE 1391 located in coverage area 1313*c* is configured to wirelessly connect to, or be paged by, the corresponding base station 1312*c*. A second UE 1392 in coverage area 1313*a* is wirelessly connectable to the corresponding base station 1312*a*. While a plurality of UEs 1391, 1392 are illustrated in this example, the disclosed embodiments are equally applicable to a situation where a sole UE is in the coverage area or where a sole UE is connecting to the corresponding base station 1312*a* or 1312*b* or 1312*c*.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 12 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signalling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312*a* or 1312*b* or 1312*c* may not or need not be informed about the past routing of an incoming downlink communication with data originating from host computer 1330 to be forwarded (e.g., handed over) to a connected UE 1391. Similarly, base station 1312*a* or 1312*b* or 1312*c* need not be aware of the future routing of an outgoing uplink communication originating from the UE 1391 towards the host computer 1330.

Figure 13:
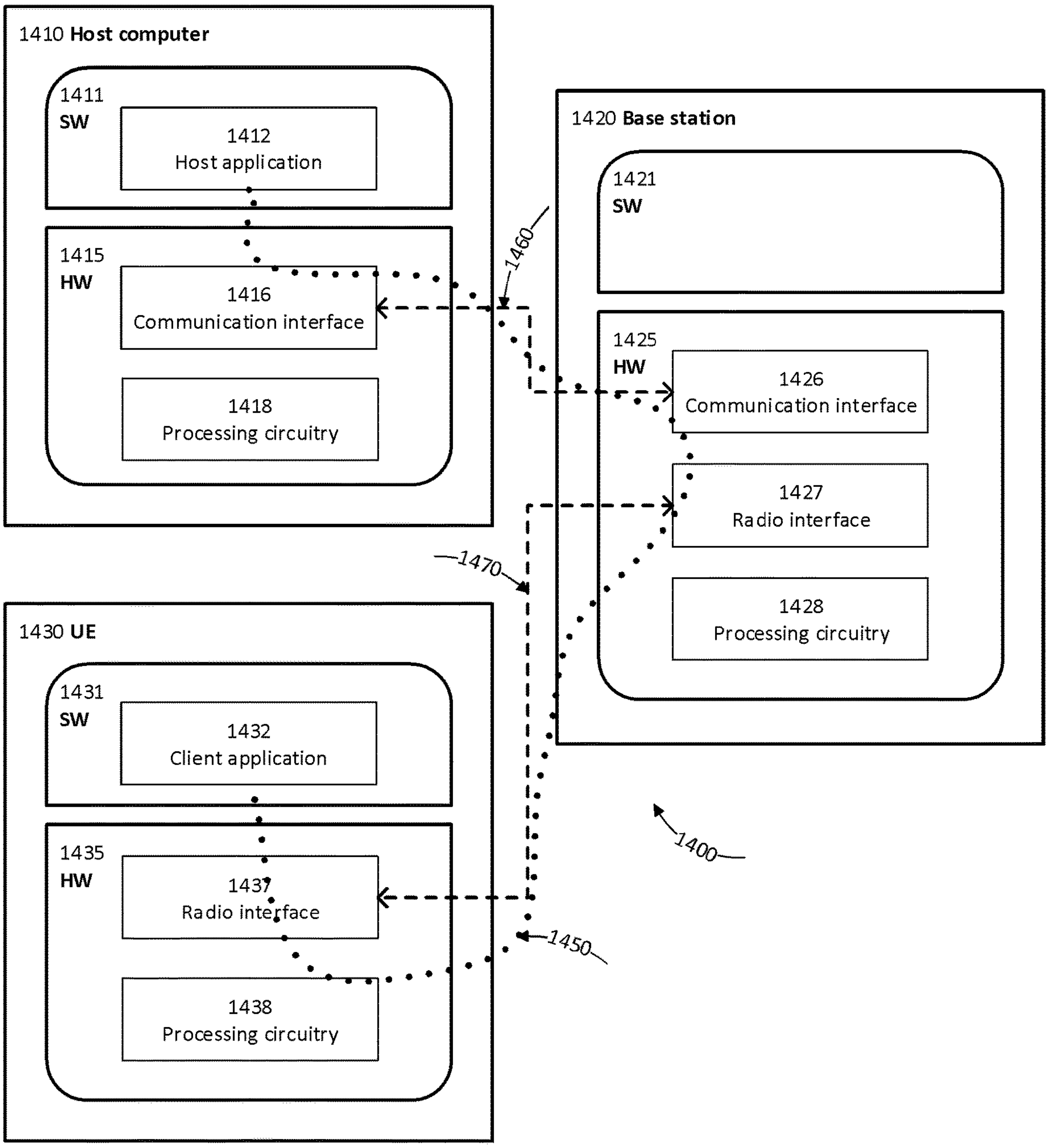
FIG. 13 is a schematic showing a host computer communicating via a base station with a user equipment over a partially wireless connection in accordance with some embodiments.

FIG. 13 is a schematic showing a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 13. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 13) served by base station 1420. Communication interface 1426 may be configured to facilitate connection 1460 to host computer 1410. Connection 1460 may be direct or it may pass through a core network (not shown in FIG. 13) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 13 may be similar or identical to host computer 1330, one of base stations 1312*a*, 1312*b*, 1312*c* and one of UEs 1391, 1392 of FIG. 12, respectively. This is to say, the inner workings of these entities may be as shown in FIG. 13 and independently, the surrounding network topology may be that of FIG. 12.

In FIG. 13, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the latency, and power consumption for a reactivation of the network connection, and thereby provide benefits, such as reduced user waiting time, enhanced rate control.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signalling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 14:
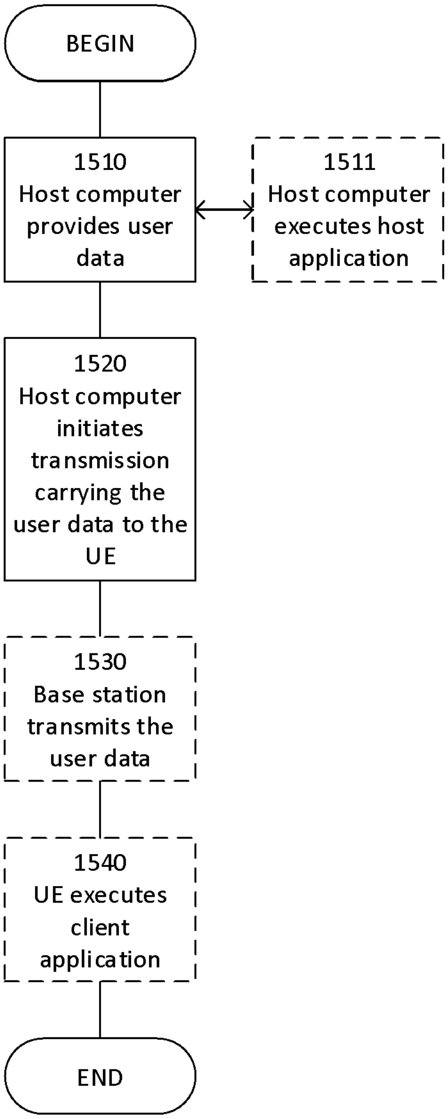
FIG. 14 is a schematic showing methods implemented in a communication system including a host computer, a base station and a user equipment in accordance with some embodiments.

FIG. 14 is a schematic showing methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 15:
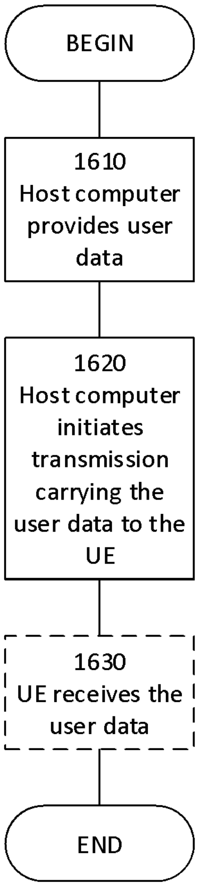
FIG. 15 is a schematic showing methods implemented in a communication system including a host computer, a base station and a user equipment in accordance with some embodiments.

FIG. 15 is a schematic showing methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the LIE receives the user data carried in the transmission.

Figure 16:
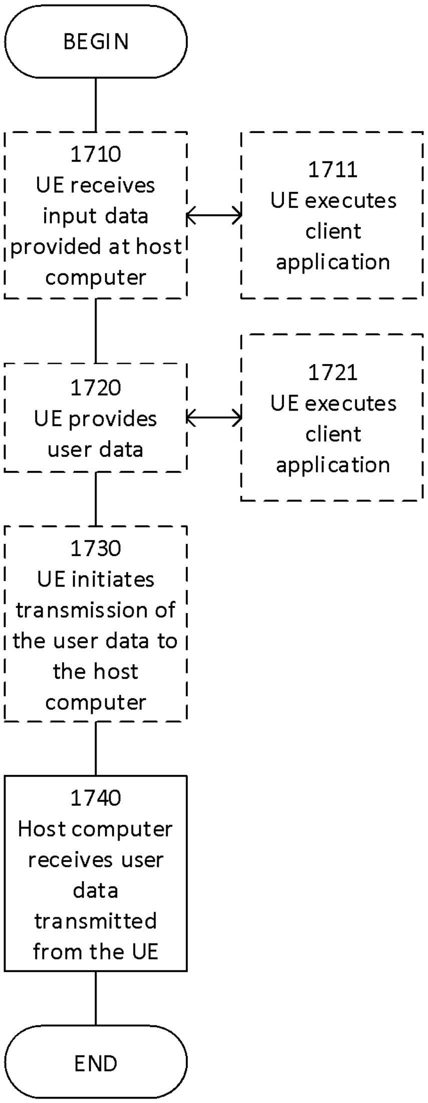
FIG. 16 is a schematic showing methods implemented in a communication system including a host computer, a base station and a user equipment in accordance with some embodiments.

FIG. 16 is a schematic showing methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 17:
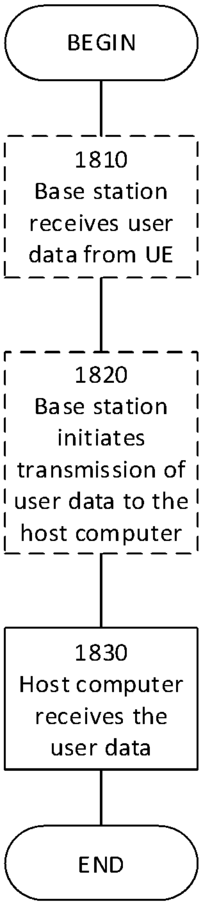
FIG. 17 is a schematic showing methods implemented in a communication system including a host computer, a base station and a user equipment in accordance with some embodiments.

FIG. 17 is a schematic showing methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

Some portions of the foregoing detailed description have been presented in terms of algorithms and symbolic representations of transactions on data bits within a computer memory. These algorithmic descriptions and representations are ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be appreciated, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to actions and processes of a computer system, or a similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present disclosure are not described with reference to any particular programming language. It should be appreciated that a variety of programming languages may be used to implement the teachings of embodiments of the present disclosure as described herein.

An embodiment of the present disclosure may be an article of manufacture in which a non-transitory machine-readable medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hard-wired circuit components.

In the foregoing detailed description, embodiments of the present disclosure have been described with reference to specific exemplary embodiments thereof. It will be evident that various modifications may be made thereto without departing from the spirit and scope of the present disclosure as set forth in the following claims. The specification and drawings are, accordingly, to be regarded in an illustrative sense rather than a restrictive sense.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Throughout the description, some embodiments of the present disclosure have been presented through flow diagrams. It should be appreciated that the order of transactions and transactions described in these flow diagrams are only intended for illustrative purposes and not intended as a limitation of the present disclosure. One having ordinary skill in the art would recognize that variations can be made to the flow diagrams without departing from the spirit and scope of the present disclosure as set forth in the following claims.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a first terminal device, the method comprising:

receiving at least one bit rate limitation from a network device, the at least one bit rate limitation comprising at least one of: (i) an aggregate maximum bit rate (AMBR) for a session of the first terminal device, or (ii) an aggregate AMBR for all non-guaranteed bit rate (non-GBR) quality of service (QoS) flows of the first terminal device; and applying the at least one bit rate limitation to control a data rate of only non-GBR traffic of the first terminal device that is relayed through a relay terminal device, by:

maintaining at least one traffic queue for the non-GBR traffic, wherein the non-GBR traffic is associated with a protocol data unit (PDU) session and at least one QoS flow of the first terminal device; and controlling the at least one traffic queue such that an aggregated data rate of the non-GBR traffic associated with the at least one traffic queue does not exceed the at least one bit rate limitation; and wherein the method further comprises:

transmitting, to the relay terminal device, first queue status information indicative of a buffer status of the at least one traffic queue maintained for the non-GBR traffic at the first terminal device;

receiving, from the relay terminal device, second queue status information indicative of a relay-side buffer status for the non-GBR traffic relayed through the relay terminal device; and controlling the at least one traffic queue based at least in part on at least one of the first queue status information or the second queue status information such that the aggregated data rate of the non-GBR traffic does not exceed the at least one bit rate limitation.

2. The method according to claim 1, wherein the network device comprises at least one of:

an access network device; or an access management function.

3. The method according to claim 1, wherein the at least one bit rate limitation is received from the network device via at least one of:

a non-access stratum (NAS) signaling; or a radio resource control (RRC) signaling.

4. The method according to claim 1, wherein the queue status information comprises at least one of:

a buffer size, a queuing delay, a packet loss, a number of transmitted packets, a number of received packets, a number of transmitted bits, a number of received bits, or an indication of which packets or protocol data units (PDU) have been received successfully.

5. The method according to claim 1, wherein the queue status information comprises at least one of:

queue status information for a terminal device, queue status information for a session, queue status information for a bearer, or queue status information for a flow.

6. The method according to claim 1, wherein the queue status information is exchanged between the first terminal device and the relay terminal device via at least one of:

PC5-RRC signaling, or control PDUs in an adaptation layer.

7. The method according to claim 1, further comprising:

receiving a measurement configuration on data rate and/or resource utilization from the network device or a controlling terminal device;

performing measurements based on the measurement configuration to obtain at least one measured data rate and/or resource utilization for the non-GBR traffic relayed through the relay terminal device; and controlling the at least one traffic queue based at least in part on the at least one measured data rate and/or resource utilization to enforce the at least one bit rate limitation.

8. The method according to claim 1, further comprising:

transmitting, to at least one of the network device or the relay terminal device, assistance information indicative of data rate and/or resource utilization measured or calculated for the non-GBR traffic relayed through the relay terminal device;

wherein the assistance information enables determining, updating, and/or enforcing the at least one bit rate limitation for the non-GBR traffic.

9. The method according to claim 8, wherein the assistance information on data rate and/or resource utilization measured or calculated by the first terminal device comprises at least one of:

a measured or calculated data rate or data volume, a percentage of PC5 resources that are used to carry uplink traffic among all consumed PC5 resources, or a percentage of resources allocated by a resource allocation mode among all consumed resources used to carry uplink traffic on a PC5 link.

10. The method according to claim 9, wherein the resource allocation mode comprises at least one of:

network-scheduled sidelink transmission, or terminal device autonomously selected sidelink transmission.

11. The method according to claim 9, wherein the measured or calculated data rate or data volume comprises at least one of:

measured or calculated data rate or data volume for a flow, measured or calculated data rate or data volume for a radio bearer, measured or calculated data rate or data volume for a PC5 link, measured or calculated data rate or data volume for relayed Uu traffic, measured or calculated data rate or data volume for PC5 traffic, measured or calculated data rate or data volume for relayed non-GBR Uu traffic, or measured or calculated data rate or data volume for relayed GBR Uu traffic.

12. The method according to claim 1, wherein the non-GBR traffic of the first terminal device that is relayed through a relay terminal device and PC5 traffic between the first terminal device and the relay terminal device are not multiplexed in a same medium access control (MAC) service data unit (SDU) or in a same MAC PDU.

13. The method according to claim 1, further comprising:

receiving an upper bound and an averaging window from the network device, wherein the upper bound is used to ensure an aggregate size of all PC5 MAC SDUs that carry only the non-GBR traffic of the first terminal device that is related through the relay terminal device in the averaging window does not exceed the upper bound; and applying the upper bound and the averaging window.

14. The method according to claim 13, wherein the upper bound is decreased when an uplink or downlink bit rate of the first terminal device for the non-GBR traffic relayed through the relay terminal device is higher than the at least one bit rate limitation, and the upper bound is increased when the uplink or downlink bit rate of the first terminal device for the non-GBR traffic relayed through the relay terminal device is lower than the at least one bit rate limitation.

15. A first terminal device, comprising:

a processor; and a memory coupled to the processor, said memory containing instructions executable by said processor, whereby said first terminal device is operative to:

receive at least one bit rate limitation from a network device, the at least one bit rate limitation comprising at least one of: (i) an aggregate maximum bit rate (AMBR) for a session of the first terminal device, or (ii) an aggregate AMBR for all non-guaranteed bit rate (non-GBR) quality of service (QoS) flows of the first terminal device; and apply the at least one bit rate limitation to control a data rate of only non-GBR traffic of the first terminal device that is relayed through a relay terminal device, by:

maintaining at least one traffic queue for the non-GBR traffic, wherein the non-GBR traffic is associated with a protocol data unit (PDU) session and at least one QoS flow of the first terminal device; and controlling the at least one traffic queue such that an aggregated data rate of the non-GBR traffic associated with the at least one traffic queue does not exceed the at least one bit rate limitation; and whereby the first terminal device is further operative to:

transmit, to the relay terminal device, first queue status information indicative of a buffer status of the at least one traffic queue maintained for the non-GBR traffic at the first terminal device;

receive, from the relay terminal device, second queue status information indicative of a relay-side buffer status for the non-GBR traffic relayed through the relay terminal device; and control the at least one traffic queue based at least in part on at least one of the first queue status information or the second queue status information such that the aggregated data rate of the non-GBR traffic does not exceed the at least one bit rate limitation.

* * * * *